United States Patent [19]
Taniguchi et al.

[11] Patent Number: 6,110,069
[45] Date of Patent: Aug. 29, 2000

[54] AUTOMATIC TRANSMISSION FOR VEHICLE

[75] Inventors: Takao Taniguchi; Kazumasa Tsukamoto; Masahiro Hayabuchi; Masaaki Nishida; Satoru Kasuya; Akitoshi Kato; Hiroshi Kato, all of Anjo, Japan

[73] Assignee: Aisin AW Co., Ltd., Anjo, Japan

[21] Appl. No.: 09/325,568

[22] Filed: Jun. 4, 1999

[30] Foreign Application Priority Data

| Jun. 5, 1998 | [JP] | Japan | 10-173899 |
| Sep. 1, 1998 | [JP] | Japan | 10-262313 |
| Nov. 27, 1998 | [JP] | Japan | 10-353907 |
| Mar. 31, 1999 | [JP] | Japan | 11-094401 |

[51] Int. Cl.$^7$ ...................................................... F16H 3/62
[52] U.S. Cl. ..................... 475/330; 475/271; 475/275; 475/284; 475/325
[58] Field of Search ..................... 475/275, 284, 475/285, 288, 323, 324, 325, 311, 312, 313, 271, 296, 329, 330

[56] References Cited

U.S. PATENT DOCUMENTS

| 4,347,765 | 9/1982 | Leonard et al. | |
| 5,106,352 | 4/1992 | Lepelletier | 475/280 |
| 5,342,257 | 8/1994 | Hotta et al. | 475/275 |
| 5,495,778 | 3/1996 | Mochizuki | 475/285 X |
| 5,716,298 | 2/1998 | Beim et al. | 475/275 |
| 5,876,300 | 3/1999 | Moroto et al. | 475/275 |
| 5,951,432 | 9/1999 | Wehking et al. | 475/284 |

*Primary Examiner*—Sherry L. Estremsky
*Attorney, Agent, or Firm*—Oliff & Berridge, PLC

[57] ABSTRACT

An automatic transmission includes a planetary gear set inputted a decelerated rotation and a non-decelerated rotation and outputting a plurality of shift rotations, a reduction planetary gear, an input shaft, first and third clutches which are able to engage/disengage for connecting the input shaft through the reduction planetary gear to two different decelerated rotation input elements of the planetary gear set individually, and a second clutch which is able to engage/disengage for connecting the input shaft to a non-decelerated rotation input element. The first clutch, the third clutch and the reduction planetary gear are arranged together, and the second clutch is arranged in the other side of the planetary gear set.

36 Claims, 28 Drawing Sheets

|  | C-1 | C-2 | C-3 | B-1 | B-2 | F-1 | Gear ratio | Step |
|---|---|---|---|---|---|---|---|---|
| P |  |  |  |  |  |  |  |  |
| REV |  |  | ○ |  | ○ |  | 3.389 |  |
| N |  |  |  |  |  |  |  |  |
| 1ST | ○ |  |  |  | (○) | ○ | 4.067 | ) 1.73 |
| 2ND | ○ |  |  | ○ |  |  | 2.354 | ) 1.51 |
| 3RD | ○ |  | ○ |  |  |  | 1.564 | ) 1.35 |
| 4TH | ○ | ○ |  |  |  |  | 1.161 | ) 1.35 |
| 5TH |  | ○ | ○ |  |  |  | 0.857 | ) 1.25 |
| 6TH |  | ○ |  | ○ |  |  | 0.684 |  |

FIG. 25

| | C-1 | C-2 | C-3 | B-1 | B-2 | B-3 | F-1 | F-2 | Gear ratio | Step |
|---|---|---|---|---|---|---|---|---|---|---|
| P | | | | | | | | | | |
| R | | | O | | | O | | | 3.394 | |
| N | | | | | | | | | | |
| 1st | O | | | | | △ | | O | 4.148 | 1.75 |
| 2nd | O | | | △ | | O | O | | 2.370 | 1.52 |
| 3rd | O | | O | | O | | | | 1.556 | 1.35 |
| 4th | O | O | | | ● | | | | 1.155 | 1.34 |
| 5th | | O | O | | ● | | | | 0.859 | 1.25 |
| 6th | | O | | O | ● | | | | 0.686 | |

AUTOMATIC TRANSMISSION FOR VEHICLE

BACKGROUND OF THE INVENTION

1. Field of Invention

The invention relates to an automatic transmission mounting on a vehicle. More specifically, it relates to the arrangement of the each transmission structural element in the gear train.

2. Description of Related Art

An automatic transmission comprises a planetary gear set, and frictional elements, which are clutches and brakes, for changing a transmission route of a power through the planetary gear set. Conventionally, the automatic transmission is required to multiply the gear ratios for an improvement in driving performance and fuel consumption. Recently, an automatic transmission, which establishes gear ratios of five forward speeds and one reverse speed, has been developed. To avoid complications in control, in which more than three engagement elements are needed to simultaneously engage/disengage (that is clutch to clutch operation) in a shift up/down between certain gear ratios, based on an increase in the number of engagement elements, and enlargement of the gear train, U.S. Pat. No. 5,342,257 describes a gear train in which one of three sets of planetary gears is a double pinion type, five speeds are achieved with three clutches and two brakes, and a clutch to clutch operation between more than three frictional elements is not needed.

In the aforementioned conventional transmission, a decelerated rotation decelerated from an input rotation, which is achieved from a double planetary gear, is inputted to a certain element of a planetary gear through a clutch so that the multistage is established with few engagement elements. But, in this transmission, there is a problem. To improve fuel consumption and driving performance, it is necessary to broaden a gear ratio breadth in the entire transmission mechanism in addition to the multiplying. However, in the conventional transmission, it is difficult to achieve a greatly decelerated rotation, that is, it is difficult to broaden the breadth between the gear ratios because the first speed is established by inputting the input rotation through a clutch to a predetermined element and fixing another element by a brake. A transmission solving the aforementioned problem, a gear train, which achieves six forward speeds and one reverse speed with three clutches and two bakes, is suggested in U.S. Pat. No. 5,106,352. In the gear train, six speeds are achieved by a rotation decelerated from the input rotation is inputted to two shift elements of a ravegneaux type planetary gear set and a non-decelerated rotation is inputted to another shift element. In the conventional transmission, a first speed established by the decelerated rotation is inputted through a clutch to a predetermined element and another element is fixed by a brake. Therefore, a relatively large decelerated rotation is achieved. As a result, a multiplied automatic shift having a broaden gear ratio breadth is achieved.

In the gear train in the just discussed conventional transmission, the gear ratio breadth is broad and the six speeds have proper gear ratio steps. However, two power transmission routes, which need a high strength for transmitting a high torque increased by a deceleration at the reduction planetary gear, are needed. Therefore; the transmission routes are needed to be compactly structured to avoid an increase in the size and weight of the transmission. To address this point, in the conventional transmission, the reduction planetary gear and a clutch for transitting a non-reduction torque are arranged between two clutches for transmitting reduction torque and a planetary gear set. Therefore, there is no particular consideration according to the high torque transmission.

SUMMARY OF THE INVENTION

In view of the above problems associated with the prior art, an object of the invention is to provide an automatic transmission, having multiple gear stages, in which a gear train is lightened and made compact against a number of achieved gear stages by shortening a high torque transmission route to a planetary gear set.

Clutches as engagement elements are structured from frictional members structuring power transmission routes, drums and hubs as input/output connecting members of the frictional members, and hydraulic servos for engagement/disengagement control. Each frictional member has a large degree of freedom for arrangement position. The hydraulic servo must be directly or indirectly supported on a shaft or on an automatic transmnission case for connecting to a hydraulic path because the hydraulic servo needs to have a hydraulic pressure applied. Therefore, the arrangement position of the each hydraulic servo is constrained. According to the resulting relationship and a fixing method for a reaction element of the reduction planetary gear, the mere integration of arrangement positions of the two deceleration rotation input clutches and the reduction planetary gear causes the size of the mechanism to increase because of a complicated arrangement of the members. As a result, a goal of a compact gear train, in which the number of engagement elements is reduced, is degraded.

Therefore, a specific object of the invention is to provide an arrangement of a gear train that prevents an increase in the size of the mechanism according to an integration of arrangement positions of the reduction planetary gear and the two decelerated rotation input clutches. Further, a specific object of the invention is to solve various problems occurring when the gear train arrangement is applied to various specific types of automatic transmissions.

To achieve the aforementioned object, an automatic transmission comprising a planetary gear set inputted with a decelerated rotation and a non-decelerated rotation and outputting plural shift rotation, a reduction planetary gear arranged on one axial side of the planetary gear set, an input shaft arranged in the inner position side of the planetary gear set, first and third clutches which are able to engage/disengage for connecting the input shaft through the reduction planetary gear to two different decelerated rotation input elements of the planetary gear set individually, and a second clutch which is able to engage/disengage for connecting the input shaft to a non-decelerated rotation input element of the planetary gear set. In the automatic transmission, the first clutch, the third clutch and the reduction planetary gear are arranged together, and the second clutch is arranged in the other side of the planetary gear set.

In the aforementioned structure, it is effective that each clutch comprises a frictional element and a hydraulic servo individually, the reduction planetary gear is arranged so that one element of the reduction planetary gear is fixed on an end of a boss portion axially extended from a wall of a transmission case, the hydraulic servo of the third clutch is arranged on the boss portion and between the wall and the reduction planetary gear, and the hydraulic servo of the first clutch is arranged in the out space of the input shaft and on the opposite side to the hydraulic servo of the third clutch against the reduction planetary gear.

It is possible to structure the gear train such that each clutch comprises a frictional element and a hydraulic servo individually, the reduction planetary gear is arranged so that one element of the reduction planetary gear is fixed on an end of a boss portion axially extended from a wall of a transmission case; the hydraulic servo of the first clutch is arranged on the boss portion, between the wall and the reduction planetary gear, and in a reduction planetary gear side; and the hydraulic servo of the third clutch is arranged on the boss portion, between the wall and the reduction planetary gear, and in a wall side.

It is possible to structure the gear train such that each clutch comprises a frictional element and a hydraulic servo individually, the reduction planetary gear is arranged so that one element of the reduction planetary gear is fixed on an end of a boss portion axially extended from a wall of a transmission case, the hydraulic servo of the first clutch is arranged on the boss portion and between the wall and the reduction planetary gear, another wall is axially aligned with the reduction planetary gear, the hydraulic servo of the third clutch is arranged between the another wall and the reduction planetary gear, and the first clutch and the third clutch are connected to the planetary gear set between the boss portion and the another wall.

It is effective that the frictional element of the third clutch and the frictional engagement of the first clutch are arranged at the radial outer side of one of the hydraulic servo of the first clutch, the hydraulic servo of the third clutch, and the reduction planetary gear.

It is possible to structure the gear train such that the frictional element of the third clutch is arranged in the radial outer side of the reduction planetary gear, and the frictional element of the first clutch is arranged in the radial outer side of the hydraulic servo of the first clutch.

It is possible to structure the gear train such that the first clutch comprises a drum which is integrated with the hydraulic servo, the drum is connected to the decelerated rotation input element of the planetary gear set and arranged so that the cylinder of the hydraulic servo opens to the reduction planetary gear side, and the outer surface of the frictional element of the first clutch is engaged with the drum and the inner surface of the frictional element of the first clutch is connected to the output element of the reduction planetary gear.

It is possible to structure the gear train such that the third clutch comprises a drum which is integrated with the hydraulic servo, the drum is connected to the decelerated rotation input element of the planetary gear set and arranged so that the cylinder of the hydraulic servo opens to the reduction planetary gear side, and the outer surface of the frictional element of the third clutch is engaged with the drum and the inner surface of the frictional element of the third clutch is connected to the output element of the reduction planetary gear through a common hub with the frictional element of the first clutch.

It is effective that a brake is arranged to engage the decelerated rotation input element of the planetary gear set with the transmission case, and the brake is a band brake, an engagement surface of the brake band is on the outer surface of the drum of the third clutch.

It is effective that the first clutch comprises a drum which is integrated with the hydraulic servo, the drum is connected to the output element of the reduction planetary gear and arranged so that the cylinder of the hydraulic servo opens to the opposite side against the reduction planetary gear side.

It is possible to structure the gear train such that the frictional element of the first clutch is arranged in the radial outer side of the reduction planetary gear, and the frictional element of the third clutch is arranged in the radial outer side of the hydraulic servo of the first clutch.

It is effective that the first clutch comprises a drum which is integrated with the hydraulic servo, the drum is connected to the output element of the reduction planetary gear and arranged so that the cylinder of the hydraulic servo opens to the reduction planetary gear side, and the outer surface of the frictional element of the first clutch is engaged with the drum and the inner surface of the frictional element of the first clutch is connected to the decelerated rotation input element of the planetary gear set.

It is effective that the third clutch comprises a drum which is integrated with the hydraulic servo, the drum is connected to the decelerated rotation input element of the planetary gear set and arranged so that the cylinder of the hydraulic servo opens to the side of the hydraulic servo of the first clutch, and the outer surface of the frictional element of the third clutch is engaged with the drum and the inner surface of the frictional element of the third clutch is connected to the drum of the first clutch.

It is effective that a brake is arranged for engaging the decelerated rotation input element of the planetary gear set with the transmission case, and the brake is structured from a band brake which has an engagement surface of the brake band on the outer surface of the drum of the third clutch.

It is effective that the reduction planetary gear is axially aligned with the planetary gear set, the frictional element of the first clutch is arranged in the radial outer side of the reduction planetary gear, and the frictional element of the third clutch is arranged in the radial outer side of the planetary gear set.

It is effective that the cylinder of the hydraulic servo of the third clutch is formed on the back surface of the cylinder of the hydraulic servo which is integrated with the drum of the first clutch, and the piston of the hydraulic servo of the third clutch is engaged with the drum of the first clutch, so that rotation is impossible, and inserted in the cylinder formed on the back surface.

It is effective that the outer surface of the frictional element of the third clutch is engaged with the drum which is the piston of the hydraulic servo of the third clutch, the inner surface of the frictional element of the third clutch is connected to the decelerated rotation input element of the planetary gear set, and the frictional element of the third clutch is able to engage/disengage by pushing/pulling against the drum of the first clutch.

It is effective that the drum of the third clutch is connected to the decelerated rotation input element of the planetary gear set and arranged so that the cylinder of the hydraulic servo, which is integrated with the drum of the third clutch, opens to the reduction planetary gear side, and the outer surface of the frictional element of the third clutch is engaged with the drum of the third clutch and the inner surface of the frictional element of the third clutch is connected to the drum integrated with the hydraulic servo of the first clutch.

It is effective that the drum of the third clutch is rotatably supported, through the hydraulic servo which is integrated with the drum of the third clutch, by a boss portion extended from the another wall, and a brake structured from a band brake, which has an engagement surface of the brake band on the outer surface of the drum of the third clutch, is arranged for engaging the decelerated rotation input element of the planetary gear set with the transmission case.

It is possible to structure the gear train to include a counter drive gear connected to the output element of the planetary gear set and arranged in the outer space of the input shaft, a counter shaft which is arranged in parallel with the input shaft and on which a counter driven gear engaging with the counter drive gear is arranged, and a differential unit which is rotationally driven by the counter shaft and arranged in parallel with the counter shaft.

It is effective that the counter drive gear is arranged between the first clutch, the third clutch and the reduction planetary gear and the planetary gear set.

It is able to structure the gear train such that the counter drive gear is arranged between the second clutch and the planetary gear set.

It is possible to structure so that the counter drive gear is arranged in the opposite position to the second clutch against the planetary gear set.

It is effective that the first clutch, the third clutch and reduction planetary gear are arranged in an engine connecting side of the transmission, and the second clutch is arranged in the rear end side of the transmission.

It is possible to structure the gear train such that the second clutch is arranged in an engine connecting side of the transmission, and the first clutch, the third clutch and reduction planetary gear are arranged in the rear end side of the transmission.

It is effective that the each clutch comprises a hydraulic servo, and the hydraulic servo of the first clutch, the reduction planetary gear and the hydraulic servo of the third clutch are arranged in order against the planetary gear set.

It is possible to structure the gear train such that each clutch comprises a hydraulic servo, the reduction planetary gear, the hydraulic servo of the first clutch and the hydraulic servo of the third clutch are arranged in order against the planetary gear set.

It is possible to structure the gear train such that each clutch comprises a hydraulic servo, and the hydraulic servo of the third clutch, the reduction planetary gear and the hydraulic servo of the first clutch are arranged in order against the planetary gear set.

It is possible to structure the gear train such that an output shaft connected to the output element of the planetary gear set is arranged, and the output shaft is coaxial with the input shaft.

It is effective that the first clutch, the third clutch and reduction planetary gear are arranged in an engine connecting side of the transmission, the second clutch is arranged in the rear end side of the transmission, and the output element of the planetary gear set is connected to the output shaft through the outer surface side of the second clutch.

It is effective that each clutch comprises a hydraulic servo, the hydraulic servo of the first clutch, the reduction planetary gear and the hydraulic servo of the third clutch are arranged in order against the planetary gear set.

It is possible to structure the gear tram such that each clutch comprises a hydraulic servo, the reduction planetary gear, the hydraulic servo of the first clutch and the hydraulic servo of the third clutch are arranged in order against the planetary gear set.

It is possible to structure the gear train such that each clutch comprises a hydraulic servo, the hydraulic servo of the third clutch, the reduction planetary gear and the hydraulic servo of the first clutch are arranged in order against the planetary gear set.

According to the above described structure the planetary gear set is arranged between the second clutch and the reducing planetary gear. Therefore, the reduction planetary gear, the first clutch and the third clutch can be arranged in a position close to the planetary gear set. Then, the high torque transmission members, which connect the output side of the reduction planetary gear to the input sides of both clutches and connect the output sides of both clutches to the decelerated rotation input element of the planetary gear set which needs a strength for an increased torque transmission, can be shortened. Therefore, a light and compact transmission can be structured.

The connecting member of the third clutch is consequently positioned in the outer position of the first clutch. The diameter of the frictional member of the first clutch is limited compared with the frictional member of the third clutch. But the capacity of the first clutch is maintained by increasing the pressure receiving area of the hydraulic servo of the first clutch. The pressure receiving area is increased because the hydraulic servo is supported on the input shaft. Therefore, an increase in the axial size of the transmission is prevented.

The hydraulic servos of the first and third clutches are applied hydraulic pressure from the boss portion which is a stationary member on the transmission case. Therefore, there is one portion, which rotates relatively, in the hydraulic paths for applying the hydraulic to the hydraulic servos of the first and third clutches individually. Therefore, a pair of seal rings is needed for sealing at the relatively rotating portion individually so that the number of seal rings, which is a slide load, can be reduced.

Further, the connecting member of the another clutch does not pass through outer space surrounding the first and third clutches. Therefore, because both clutches have little limitation on the diameter of the frictional members, the capacities are achieved by setting a sufficient diameter. As a result, an increase in the axial size of the transmission, which is caused by increasing the number of frictional members for achieving capacity, is prevented so that the transmission is effectively axially shortened.

Then, the frictional members of the first and third clutches are arranged in the outer position of the another member so that the axial size of the transmission is reduced. Further, as a result, the high torque transmission route is shortened.

Further, the hydraulic servo of the third clutch is arranged on the boss portion so that it is difficult to enlarge the pressure receiving area in the radial inner direction However, the frictional member of the third clutch is arranged in the outer position of the reduction planetary gear so that the limitation for enlarging the hydraulic servo of the third clutch in the radial outer direction is alleviated and it is easy to obtain enough pressure receiving area by extending the diameter. For the hydraulic servo of the first clutch, it is difficult to obtain enough pressure receiving area by extending the diameter in the radial outer direction because the frictional member is arranged in the outer position. However, the diameter can be extended in the radial inner direction because the hydraulic servo is supported on the input shaft. Therefore, both hydraulic servos of the first and third clutches can have enough pressure receiving area so that it is unnecessary to increase the number of plates of the frictional engagement member to obtain the torque transmission capacity. As a result, an increase in the axial size of the transmission is prevented.

Further, the output side of the frictional member of the first clutch is connected to the clutch drum and the input side is directly connected to the output element of the reduction planetary gear so that a particular connecting member, which is arranged only for transmitting a torque from the frictional member and radially extended, is not needed. Therefore, the axial size of the transmission is reduced. As a result, the high torque transmission members are further shortened.

Further, the first and third clutches have a common hub so that the drum of the first clutch is axially aligned with the drum of the third clutch. As a result, the axial size of the transmission and the high torque transmission members are further shortened.

In addition, the brake, which is needed to engage the high torque transmission member, is structured as a band brake. Thus, it does not need a large diameter space, so that the diameters of the first and third clutches can be extended. Therefore, the axial sizes of the clutches are reduced and the high torque transmission members are shortened. Further, the support for the brake drum for the band brake can be common to the support for the drum of the third clutch.

Further, the decelerated rotation input element of the planetary gear set, which is connected to the first clutch, rotates at a high speed at high speed gear ratios. Therefore, in case, especially, the first clutch is enlarged for applying the mechanism to a high power engine, it is effective for an axis waggling by connecting the drums to the output side of the reduction planetary gear which rotates at a low speed.

The frictional member is arranged at the outer position of the another member so that the axial size of the transmission is reduced. Further, the high torque transmission route is shortened.

The cylinder, which is integrated with the drum of one of the clutches, is the common cylinder, the pistons are arranged in the inner and outer position of the cylinder individually, and the pistons are able to be operated individually. Therefore, the clutch to clutch control between the two clutches is possible. Further, the space for arranging both hydraulic servos becomes compact.

Further, the drum of the first clutch is used for inputting the rotation to the frictional element of the third clutch, so that the number of rotational members is reduced. Therefore, the axial size of the transmission and the high torque transmission members are further shortened.

The brake, which is needed to engage the high torque transmission member, is structured as a band brake so that the diameters of the first and third clutches can be extended. Therefore, the axial sizes of the clutches are reduced and the high torque transmission members are shortened. Further, the support for the brake drum for the band brake can be in common be with the support for the drum of the third clutch.

Further, the frictional member is arranged at an outer position of the another member so that the axial size of the transmission is reduced.

Further, the drum of the third clutch is in common with the drum of the first clutch so that the axial size of the transmission and the high torque transmission members are further shortened.

The structure for the combination of the first and third clutches is simplified.

Further, the frictional member of the third clutch is directly engaged with the drum of the first clutch so that a connecting member for connecting the clutches is not needed. Therefore, the structure of the clutches is compact because the structural members of the clutches are partly in common.

Further, the brake, which is needed to engage the high torque transmission member, is structured as a band brake so that the diameter of the first clutch can be extended. Therefore, the axial size of the clutch is shortened and the high torque transmission members are shortened. Further, the support for the brake drum for the band brake can be in common with the support for the drum of the third clutch.

Further, the transverse type multistage automatic transmission for the front engine/front drive vehicle or rear engine/rear drive vehicle is compact.

Further, in the transverse type multistage automatic transmission, the axial length of the counter shaft is shortened resulting in a weight reduction.

Further, in the transverse type multistage automatic transmission, the high torque transmission members are mostly shortened.

Further, in the transverse type multistage automatic transmission, in addition to the mostly shortening of the high torque transmission members, a support wall is not needed because the end wall of the transmission case is used for supporting the counter drive gear. Thus, the axial size of the transmission is reduced.

Further, the high torque transmission members are arranged at the side of the connection to the engine because the usual shift mechanism has a large diameter at that side due to a mounting limitation on space within the vehicle. As a result, the axial size of the transmission is reduced.

Further, in the transverse type multistage automatic transmission, the differential ring gear is arranged in a position which is at the end portion of the engine connecting side of the shift mechanism, and the second clutch, having a relatively small capacity, is arranged in the radial position of the differential ring gear. Therefore, the distance between the differential axis and the main axis is shortened.

Further, the hydraulic servos of the first and third clutches are arranged at both sides of the reduction planetary gear. Therefore, the reduction planetary gear, which is at the inside, is connected through the frictional member to the planetary gear set, which is at the outside, with a simple connecting structure. Further, the high torque transmission members are shortened.

The hydraulic servo of the first clutch is aligned with the hydraulic servo of the third clutch. Therefore, the arrangement positions of the frictional members are relatively freely set in the area from the outer position of the reduction planetary gear through the outer position of the hydraulic servo of the third clutch.

Further, the parallel type multistage automatic transmission for a front engine/rear drive vehicle is compact.

Further, the high torque transmission members, arranged at the engine connecting side according to the usual shift mechanism, have a large diameter because of a mounting limitation on a vehicle. As a result, the axial size of the transmission is reduced.

Further, in case where the structure is applied to the parallel type multistage automatic transmission, the hydraulic servos of the first and third clutches are arranged at both sides of the reduction planetary gear so that the reduction planetary gear, which is at the inside, is connected through the frictional member to the planetary gear set, which is at the outside, with a simple connecting structure, and the high torque transmission members are shortened.

Further, in the case where the structure is applied to the parallel type multistage automatic transmission, the hydraulic servo of the first clutch is axially aligned with the hydraulic servo of the third clutch, so that the arrangement positions of the frictional members against the hydraulic servos are relatively freely set in the area from the outer position of the reduction planetary gear through the outer position of the hydraulic servo of the third clutch.

Further, the input side member of the first clutch, which always rotates with the output rotation of the reduction planetary gear, is arranged at the outer side of the shift mechanism so that the input rotation speed for shift control is easily detected.

BRIEF DESCRIPTION OF THE DRAWINGS

The invention will be described in conjunction with the following drawings in which like features are designated with like reference characters, and wherein:

FIG. 25 is a table showing the operation of the gear train, the established gear ratios and the gear ratio steps;

DETAILED DESCRIPTION OF PREFERRED EMBODIMENTS

Figure 1:
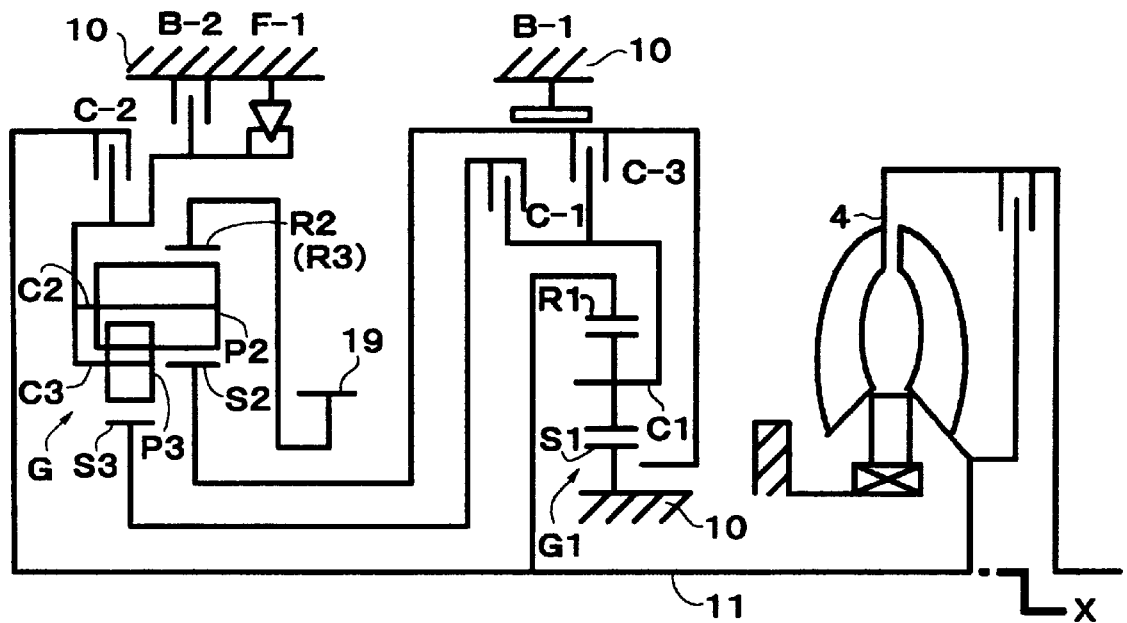
FIG. 1 is a schematic diagram illustrating a gear train of a first embodiment of an automatic transmission of the invention.
Figure 1:
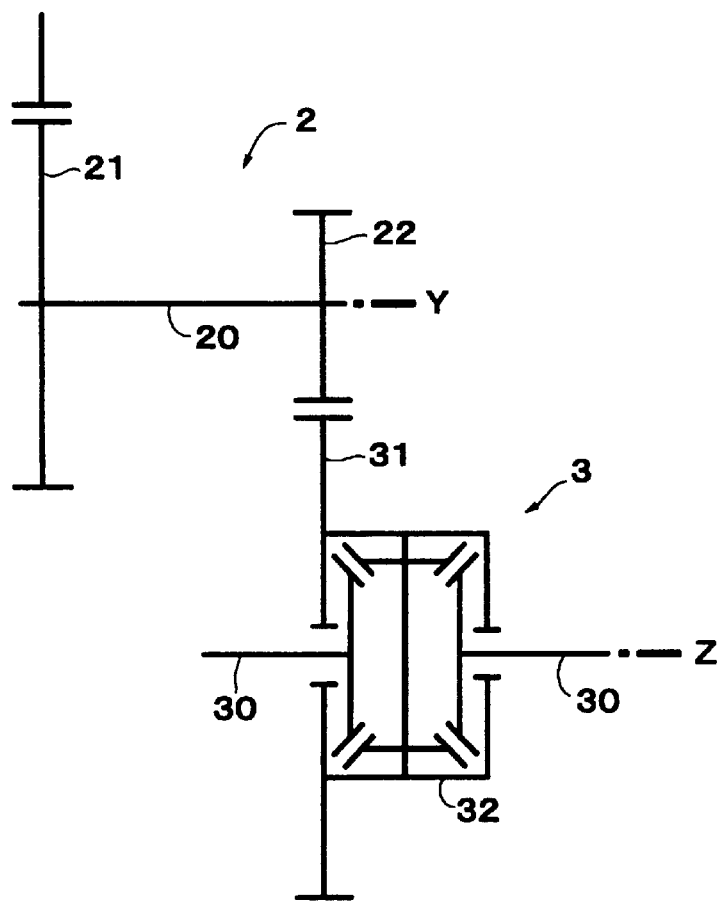
Figures 2, 3:
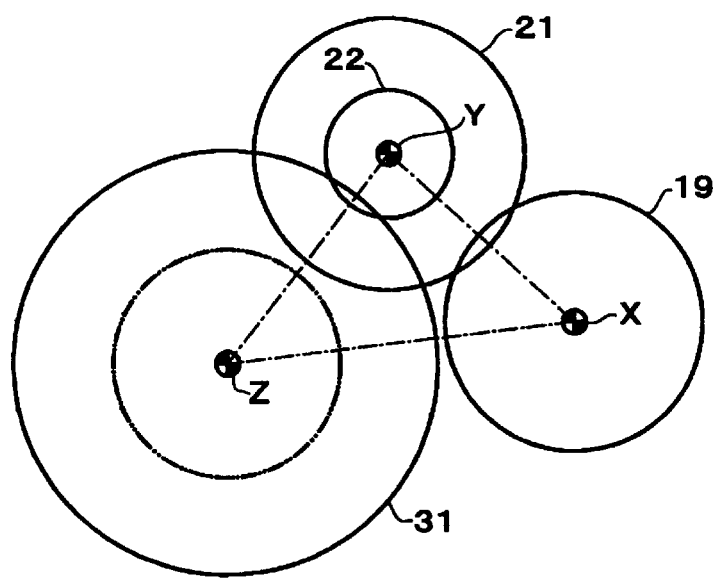
FIG. 2 is an axial direction end-surface diagram illustrating an actual positional relationship between three axis of the gear train.
FIG. 3 is a table showing the operation of the gear train, the established gear ratios and the gear ratio steps.

The invention will become more apparent from a detailed description of preferred embodiments with reference to the accompanying drawings. FIG. 1 schematically illustrates a gear train of one of the embodiments of the automatic transmission applying the invention. In the figure, the axes are deployed in a common plane. FIG. 2 illustrates an actual positional relationship between the axes when the automatic transmission is viewed from the end surface. The automatic transmission comprises a planetary gear set G inputted a decelerated rotation and a non-decelerated rotation and outputting a plurality of shift rotations, a reduction planetary gear G1 arranged to be axially parallel with the planetary gear set G, an input shaft 11 passing the inner position of the planetary gear set G, first and third clutches (C-1, C-3) engaged/disengaged for selectively connecting the input shaft 11 through the reduction planetary gear G1 to two different decelerated rotation input elements S2, S3 individually, and a second clutch C-2 engaged/disengaged for selectively connecting the input shaft 11 to a non-decelerated rotation input element C2 (C3) of the planetary gear set G. Then, the first clutch C-1 and the third clutch C-3 are integrally arranged in a position close to the reduction planetary gear G1, and the second clutch C-2 is arranged in the other side of the planetary gear set G.

A further specific gear train structure of the automatic transmission will be described. This transmission is a transverse type transaxle for a front engine/front drive (FF) or rear engine/rear drive (RR) vehicle. As illustrated in FIGS. 1 and 2, the transaxle is structured from three axis which comprises a main axis X, a counter axis Y and a differential axis Z arranged in parallel with each other (FIG. 1), and each element of a shift mechanism is arranged on one of the axis. The shift mechanism, which comprises the planetary gear set having four shift elements S2, S3, C2 (C3), R2 (R3), the reduction planetary gear G1, two brakes (B-1, B-2) and three clutches (C-1, C-2, C-3), is arranged in the outer position of the input shaft 11 which is on the main axis X. In this gear train, one of the decelerated rotation input elements S3 of the planetary gear set G is connected through the first clutch C-1 and the reduction planetary gear G1 to the input shaft 11, the other input element S2 is connected through the third clutch C-3 and the reduction planetary gear G1 to the input shaft 11 and can be engaged with a transmission case 10 by the first brake B-1, a non-decelerated rotation input element C2 (C3) is connected through the second clutch C-2 to the input shaft 11 and can be engaged with the transmission case 10 by the second brake B-2, and a remaining shift element R2 (R3) as an output element is connected to a counter drive gear 19 as an output element on the main axis X.

In the gear train in the figure, in addition to the aforementioned structures, a one-way clutch F-1 is arranged as an engagement element in parallel with the brake B-2. The one-way clutch F-1, which is automatically released according to the engagement of the brake B-2, is used for preventing a complicated hydraulic control for a clutch to clutch operation between the brake B-2 and the brake B-1, which is operated in 1-2 shift mentioned later, and for simplifying the disengagement control of the brake B-2. The one-way clutch F-1 is substantially equal with the brake B-2 except for the aforementioned transitional functions.

A torque converter 4 having a lock-up clutch and transmitting a rotation of an engine, not shown, to the input shaft 11 is arranged on the main axis X. A counter gear 2 is arranged on the counter axis Y. The counter gear 2 comprises a counter driven gear 21 having large diameter, engaging with the counter drive gear 19, which is the output element on the main axis X, and fixed on the counter shaft 20, and a differential drive pinion gear 22, which is an output element on the counter axis Y, having small diameter, and fixed on the counter shaft 20. By these, the output from the main axis side is reduced, inverted and transmitted to a differential unit 3 so that final reduction speed ratios are achieved, and the rotational direction of the input shaft 11 is accommodated with the rotational direction of the output from the differential unit 3. The differential unit 3 is arranged on the differential axis Z. The differential unit 3 is connected to the counter shaft 20 by engaging a differential ring gear 31 fixed on a differential case 32 with the differential drive pinion gear 22. A differential rotation of a differential gear arranged in the case 32 is outputted to left and right shafts 30, then the outputted rotation is a final wheel driving force.

The planetary gear set G is structured from a ravegneaux type gear set which comprises a large sun gear S2 having large diameter, a small sun gear S3 having small diameter, a carrier C2 (C3) supporting a long pinion P2 and a short pinion P3 which are engaged with each other, and a ring gear R2 (R3), and in which the long pinion P2 engages with the large sun gear S2 and the ring gear R2 and the short pinion P3 engages with the small sun gear S3. It should be noted that there are two ring gears theoretically, but substantially, there is one ring gear positioned in the outer position of either of the sun gears. Therefore, the ring gear is denoted with the notation R2 or R3 according to the position against the sun gears S2, S3. In this embodiment, the large sun gear S3 and the small sun gear S2 are the decelerated rotation input elements, the carrier C2 (C3) is the non-decelerated rotation input element, and the ring gear R2 is the output element. The small sun gear S3 of the planetary gear set G is connected to the clutch C-1, and the large sun gear S2 is connected to the clutch C-3 and can be engaged with the transmission case 10 by the brake B-1. The carrier C2 (C3) is connected through the clutch C-2 to the input shaft 11, can be engaged with the transmission case 10 by the brake B-2, and can be stopped from rotating in the one direction by engaging with the transmission case 10 using the one-way clutch (F-1). The ring gear R2 is connected to the counter drive gear 19.

In the reduction planetary gear G1, a sun gear S1 is fixed on the transmission case 10, a ring gear R1, as the input element, is connected to the input shaft 11, and a carrier C1, as the output element, is connected through the clutch C-1 and the clutch C-3 to the planetary gear set G with the aforementioned relationship of connection.

Figure 4:
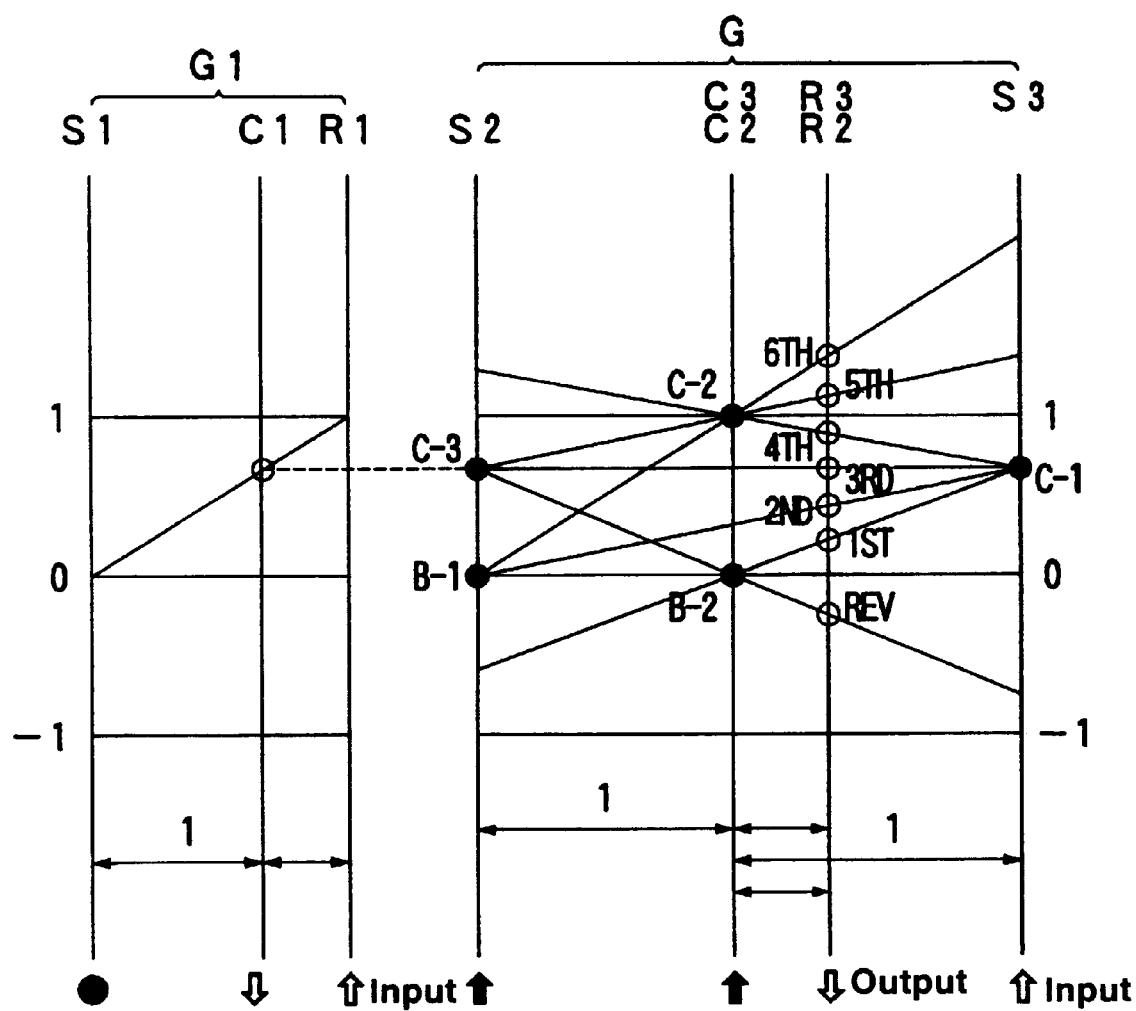
FIG. 4 is a velocity diagram for the gear train.

The automatic transmission thus structured changes the gear ratio according to a vehicle load within gear stages corresponding to a shift range selected by a driver by an electronic control system and a hydraulic control system which are not shown is the figure. FIG. 3 shows the gear stages, which are established by engagement and disengagement of each clutch and brake, with a table. In this table, a symbol ○ means engagement and a blank means disengagement. FIG. 4 shows the gear stages, which are established by engagement and disengagement of each clutch and brake, and a relationship of the rotational ratio of each shift element in each gear stage with a velocity diagram. In this diagram, a symbol ● means engagement. In the velocity diagram, the rotation of the each shift element of the reduction planetary gear G1 and the planetary gear set G is shown with an ordinate axis. A clearance in the horizontal direction between the ordinate axes corresponds to a gear ratio. Then, a rotation ratio of the each shift element is shown on the ordinate axis. In case each shift element is denoted as a first shift element through a fourth shift element in order from one end, which is the right side of the figure in a horizontal axis direction, the first shift element corresponds to the small sun gear S3 and connects to a route which is inputted the rotation, which is decelerated by the reduction planetary gear, from the first clutch C-1. The second shift element corresponds to the ring gear R2 (R3) and connects to the output member. The third shift element corresponds to the carrier C2 (C3), connects to a route on which is inputted the rotation, which is not decelerate, from the second clutch C-2, and can be stopped from rotating by the second brake B-2. The fourth shift element corresponds to the large sum gear S2, connects to a route on which is inputted the decelerated rotation, which is decelerated by the reduction planetary gear, from the third clutch C-3, and can be stopped from rotating by the first brake B-1.

As shown in FIGS. 3 and 4, a first speed ($1^{ST}$) is established by engagement of the clutch C-1 and the brake B-2. It should be noted that, in this embodiment, as shown in the operational table (FIG. 3), the automatic engagement of the one-way clutch F-1 is used instead of engagement of the brake B-2. The reason for using this engagement and the reason that this engagement is equivalent to engagement of the brake B-2 will be described later. In the first ratio, the decelerated rotation, which is decelerated from the rotation of the input shaft 11 through the reduction planetary gear G1, is inputted to the small sun gear S3 through the clutch C-1, the carrier C3, which is engaged with the transmission case 10 by engagement of the one-way clutch F-1, acts as a reaction element, and the decelerated rotation of the ring gear R3 having the largest reduction ratio is outputted to the counter drive gear 19.

Next, a second speed ($2^{ND}$) is established by engagement of the clutch C-1 and the brake B-1. In this case, the decelerated rotation, which is decelerated from the rotation of the input shaft 11 through the reduction planetary gear G1, is inputted to the small sun gear S3 through the clutch C-1, the large sun gear S2, which is engaged with the transmission case 10 by engagement of the brake B-1, acts as a reaction element, and the decelerated rotation of the ring gear R2 (R3) is outputted to the counter drive gear 19. The reduction ratio in this case is less than the reductions in the first speed ($1^{ST}$).

Further, a third speed ($3^{RD}$) is established by the concurrent engagement of clutches C-1 and C-3. In this case, the decelerated rotation, which is decelerated from the rotation of the input shaft 11 through the reduction planetary gear G1, is concurrently inputted to the large sun gear S2 and the small sun gear S3 through the clutches C-1 and C-3 so that the planetary gear set G is in the directly connected state the rotation of the ring gear R2 (R3), which is the same as the input rotation inputted to both sun gears S2, S3, is outputted to the counter drive gear 19 as the rotation decelerated from the rotation of the input shaft 11.

Further, a fourth speed ($4^{TH}$) is established by the concurrent engagement of the clutches C-1 and C-2. In this case, the decelerated rotation, which is decelerated from the rotation of the input shaft 11 through the reduction planetary gear G1, is inputted to the small sun gear S3 through the clutch C-1 on one side, the rotation, which is not decelerated and inputted from the input shaft 11 through the clutch C-2, is inputted to the carrier C2 (C3) on the other side, and the middle rotation between the two input rotations, which is the rotation of the ring gear R3 barely decelerated from the rotation of the input shaft 11, is outputted to the counter drive gear 19.

Next, a fifth speed ($5^{TH}$) is established by the concurrent engagement of the clutch C-2 and the clutch C-3. In this case, the decelerated rotation, which is decelerated from the rotation of the input shaft 11 through the reduction planetary gear G1, is inputted to the large sun gear S2 through the clutch C-3 on one side, the non-decelerated rotation, which is not decelerated and inputted from the input shaft 11 through the clutch C-2, is inputted to the carrier C2 (C3) on the other side, and the rotation of the ring gear R2, which is barely accelerated from the rotation of the i shaft 11, is outputted to the counter drive gear 19.

A sixth speed ($6^{TH}$) is established by engagement of the clutch C-2 and the brake B-1. In this case, the non-decelerated rotation from the input shaft 11, which is not reduced, is inputted to only the carrier C2 (C3) through the clutch C-2, the sun gear S2, which is engaged with the transmission case by engagement of the brake B-1, acts as a reaction element, and the rotation of the ring gear R2, which is further accelerated, is outputted to the counter drive gear 19.

A reverse speed (REV) is established by the engagements of the clutch C-3 and the brake B-2. In this case, the decelerated rotation, which is decelerated from the rotation of the input shaft 11 through the reduction planetary gear G1, is inputted to the sun gear S2 through the clutch C-3, the carrier C2 (C3), which is engaged with the transmission case 10 by engagement of the brake B-2, acts as a reaction element, and the rotation of the ring gear R2, which is a reverse rotation, is outputted to the counter drive gear 19.

The relationship between the one-way clutch (F-1) and the brake B-2 mentioned above will now be described. As shown in the relationship of engagement/disengagement of the brakes B-1, B-2 in the first speed and the second speed, one of the brakes is disengaged and the other brake is engaged concurrent the up/down shift between the gear stages. That is, the brakes are frictional elements which are changed in state between each other. In this changing of states of the frictional engagement elements, a precise concurrent control for the engagement pressure and the disengagement pressure of the hydraulic servos which control the brakes is needed. For the control, control valves and a hydraulic circuit are needed In this embodiment, the engagement direction of the one-way clutch F-1 is set to be the same as the supporting direction for the reaction torque in the first speed, then the one-way clutch F-1 substantially operates to perform the same function as the engagement of the brake B-2 by using the effects of the reaction torque received by the carrier C2 (C3) which is reversed between the first speed and the second speed. That is, in the first speed, the carrier C2 (C3) is engaged by the one-way clutch F-1 instead of the brake B-2. It should be noted that, in an engine coasting state in which the wheels drive the engine, the engagement of the brake B-2 is needed, as shown with the symbol ○ having brackets in FIG. 3, for achieving an engine brake because the direction of the reaction force received by the carrier C2 (C3) is reversed from the case of an engine drive state. Therefore, it is possible to structure the transmission such that the first speed is established by engagement of the brake B-2 without providing the one-way clutch F-1.

As shown with the clearance in the up/down direction between the symbols ○ showing the speed ratios of the ring gear R2 (R3) on the velocity diagram in FIG. 4, each gear stage thus established has a proper speed step having a relatively equivalent interval to each gear stage. This relationship is shown by the gear ratios in FIG. 3 by specifically setting values. In case a teeth number ratio $\lambda 1$ between the sun gear S1 and the ring gear R1 of the reduction planetary gear G1 equals to 44/78, a teeth number ratio $\lambda 2$ between the sun gear S2 and the ring gear R2 (R3) of the planetary gear set G equals to 36/78, and a teeth number ratio $\lambda 3$ between the sun gear S3 and the ring gear R3 of the planetary gear set G equals to 30/78, each input/output gear ratio is, in the first speed ($1^{ST}$): $(1+\lambda 1)/\lambda 3 = 4.067$, in the second speed ($2^{ND}$): $(1+\lambda 1)(\lambda 2+\lambda 3)/\lambda 3(1+\lambda 2) = 2.354$, in the third speed ($3^{RD}$): $1+\lambda 1 = 1.564$, in the fourth speed ($4^{TH}$): $(1+\lambda 1)/(1+\lambda 1-(\lambda 1*\lambda 3)) = 1.161$, in the fifth speed ($5^{TH}$): $(1+\lambda 1)/(1+\lambda 1+(\lambda 1*\lambda 2)) = 0.857$, in the sixth speed ($6^{TH}$): $1/(1+\lambda 2) = 0.684$, and in the reverse speed (REV): $-(1+\lambda 1)/\lambda 2 = 3.389$. Then, the steps between the gear ratios are between the first and second speeds: 1.73, between the second and third speeds: 1.51, between the third and fourth speeds: 1.35, between the fourth and fifth speeds: 1.35, and between the fifth and sixth speeds: 1.25.

Figure 5:
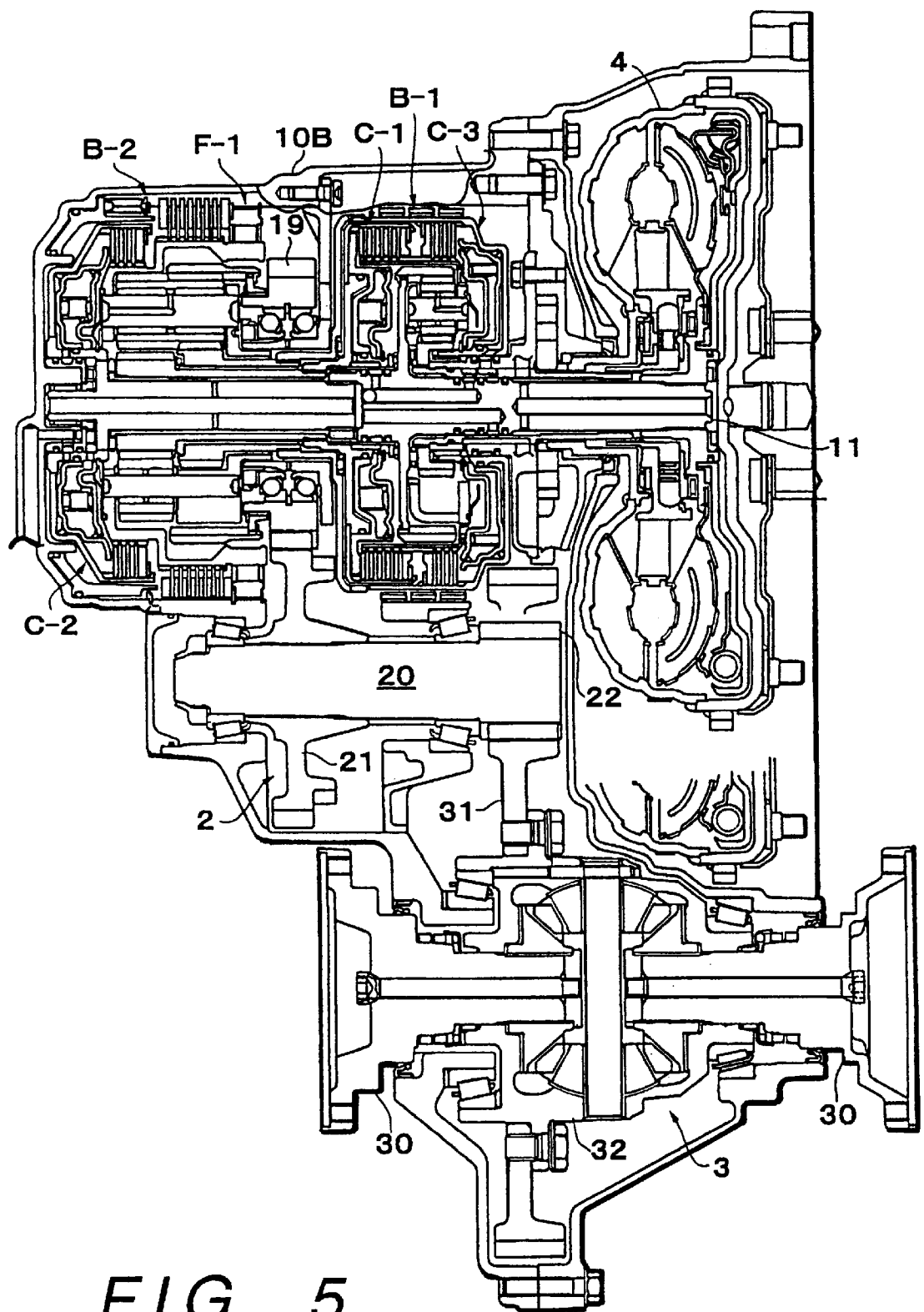
FIG. 5 is a cross sectional diagram illustrating the entire structure of the gear train.
Figure 6:
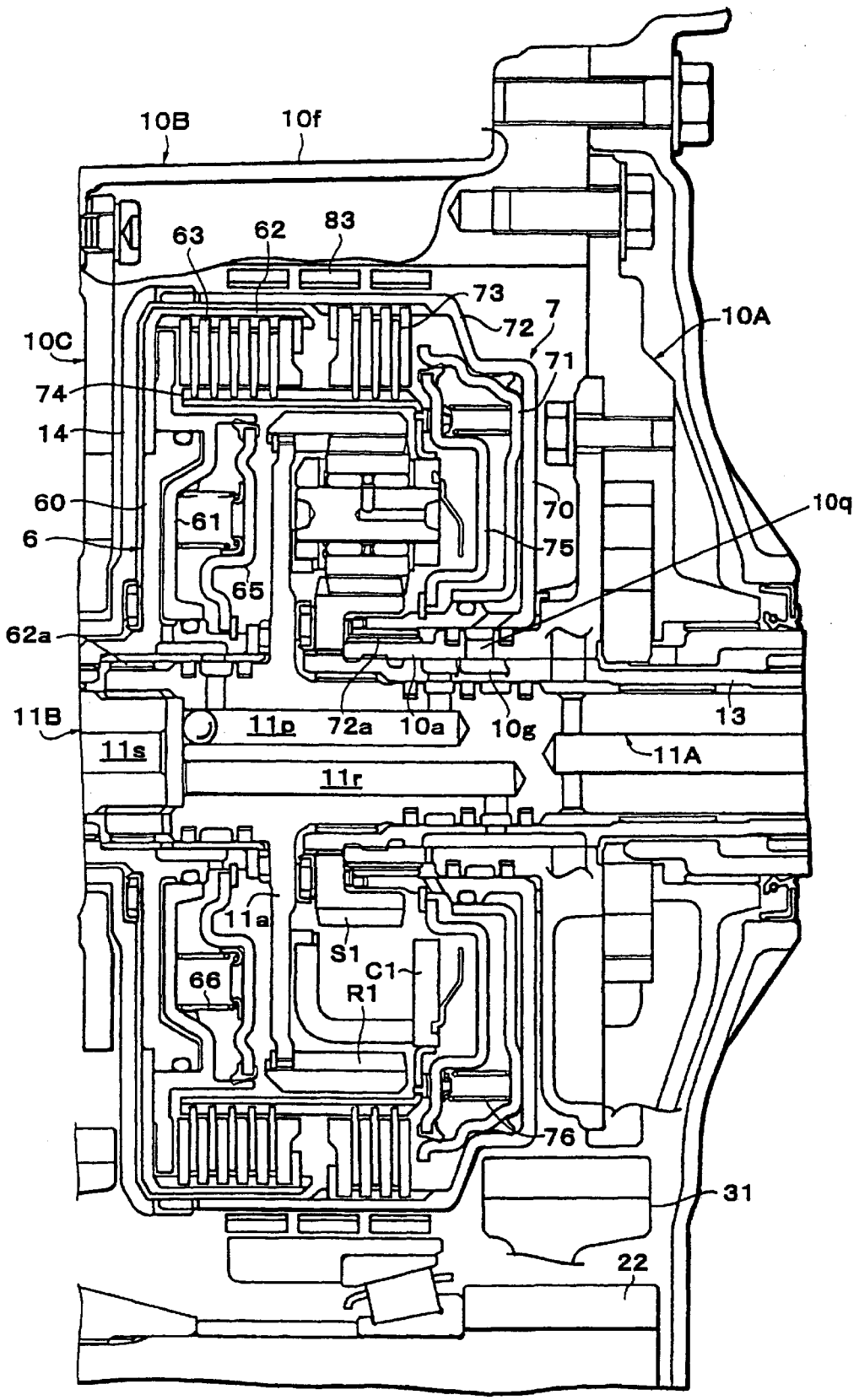
FIG. 6 is a magnified cross sectional diagram illustrating the front half portion of the main axis of the gear train.
Figure 7:
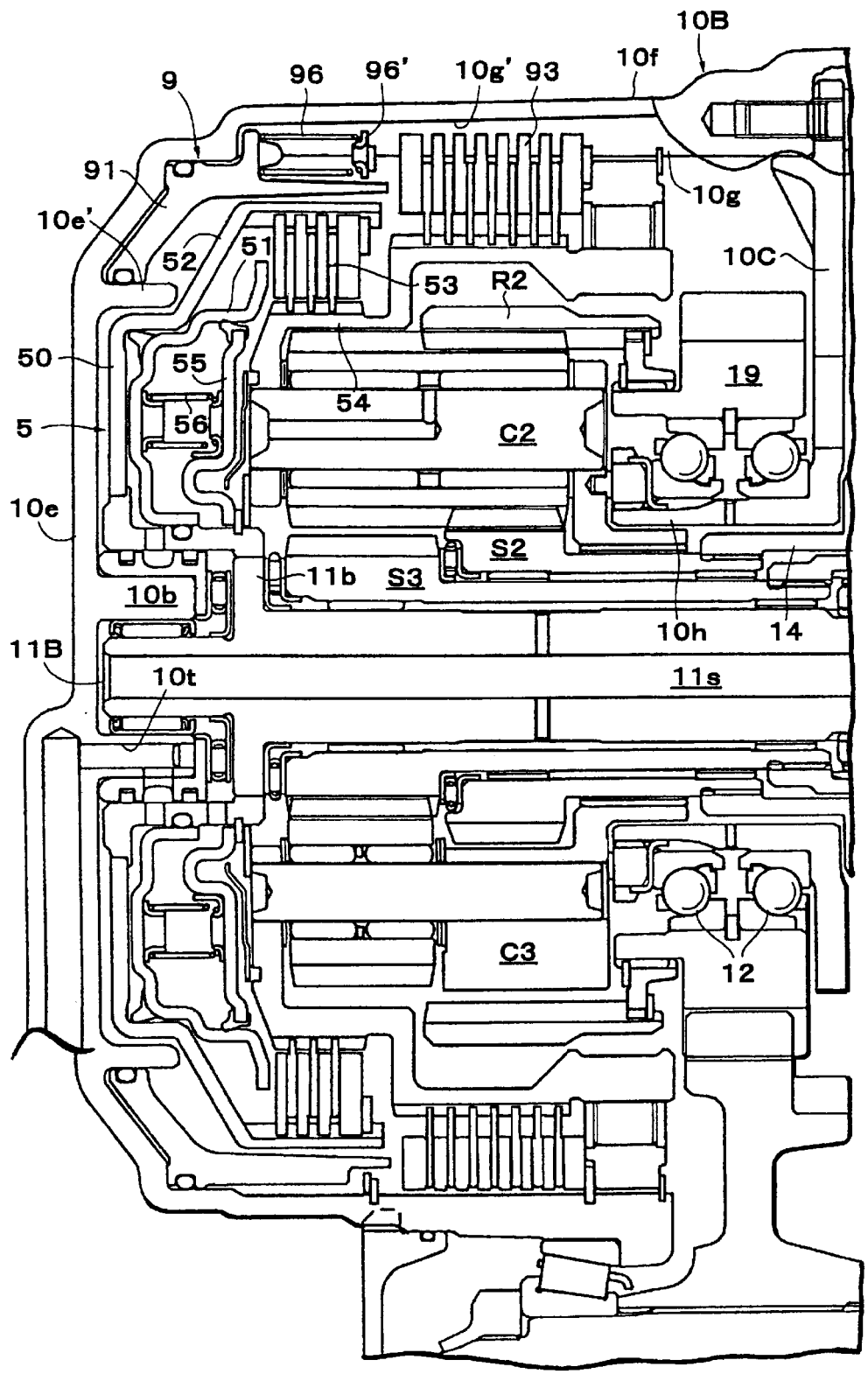
FIG. 7 is a magnified cross sectional diagram illustrating the rear half portion of the main axis of the gear train.

Next, FIG. 5 shows the detailed structure of the automatic transmission with a simplified cross sectional view. Further, FIGS. 6 and 7 are magnified partial views illustrating parts of FIG. 5. Each structural element, which was previously described with reference to the schematic diagram, is identified with the same reference numeral or notation and the description is omitted. According to the detailed portions, which are not able to be shown in the schematic diagram, the global positional relationship will be described with reference to FIG. 5 and the detail of the each portion is described with reference to FIGS. 6 and 7. It should be noted that, through this specification, the terms, which are clutch and brake, generically indicate drums and hubs as connecting members connected to the input and output elements, frictional members as engagement/disengagement members, and hydraulic servos comprising cylinders integrated with the drums as an operational mechanism. Therefore, according to each clutch and brake, the first clutch C-1 is structured from frictional member 63 and a hydraulic servo 6, in similar ways, the second clutch C-2 is structured from frictional member 53 and a hydraulic servo 5, the third clutch C-3 is structured from frictional member 73 and a hydraulic servo 7, and the brake B-2 is structured from frictional member 93 and a hydraulic servo 9. Only the brake B-1 is structured from a band brake in which the frictional member is a band 83 encircling the drum and a hydraulic servo which is not shown in the figure.

The transmission case 10 is structured from a case mainframe 10B composing a surrounding wall portion 10f having a tapered shape, in which a diameter of the front side is larger than a diameter of the rear side, a front end wall 10A structured from an oil pump body closing an opening at the front end of the case mainframe 10B and an oil pump cover fixed on that and fixed on the case mainframe 10B with a bolt, and a support wall 10C fixed on the axially center portion of the case mainframe 10B with a bolt. A spline 10g' is formed from the opening at the front end to almost a rear end wall portion 10e on the inner surface of the surrounding wall portion 10f of the mainframe 10B. A rear boss portion 10b, which is extended toward the front side from the rear end wall portion 10e, for supporting the rear end of the input shaft 11 and a cylindrical wall 10e' structuring an inner wall of a cylinder of a hydraulic servo of the brake B-2 are formed on the rear end wall portion 10e. A front boss portion 10a, which is extended toward the rear side from the oil pump cover, is formed on the front end wall 10A. Further, a center boss portion 10h is extended toward the rear side from the inner portion of the support wall 10C. The center boss portion 10h supports the counter drive gear 19.

The input shaft 11 is divided into a front portion and a rear portion which are two shafts 11A, 11B with an accommodation for processing, and the two shafts 11A, 11B are integrally connected with each other with spline engagement. A hydraulic path 11r for applying a lubrication oil and a hydraulic path 11p for applying servo pressures are formed in the input shaft front half portion 11A. A lubrication oil path 11s is formed in the input shaft rear half portion 11B. Further, a flange 11a is formed on the outer surface of the input shaft front half portion 11A at the rear end side, and a flange 11b is formed on the outer surface of the input shaft rear half portion 11B at the rear end side. Then, the input shaft front half portion 11A is supported by a sleeve shaft 13, which is inserted within the front boss portion 10a, through bushes at the inner position of an oil pump arrangement position and a position just before the flange 11a individually. The input shaft rear half portion 11B is supported in the radial direction by a spline engagement with the input shaft front half portion 11A at the front end and by the rear boss portion 11b of the case 10 through a bearing at the rear end. The input shaft front half portion 11A and the input shaft rear half portion 11B are axially supported by thrust bearings which are inserted between the front ends of the boss portions 10a, 10b and the flanges 11a, 11b adjoining with the supporting portion.

The planetary gear set G is arranged radially outward of the input shaft rear half portion 11B of the input shaft 11. Both ends of the sun gear S3 are supported by the input shaft rear half portion 11B through bushes at the gear portion and the extension shaft portion individually. The ends of the sun gear S2 are supported by the extension shaft portion of the sun gear S3 through bushes at the gear portion and the extension shaft portion individually. The carrier C2 (C3) is supported by the extension shaft portion of the sun gear S2 through a bush at the front end side. The ring gear R2 is supported by the counter drive gear 19 with a spline connection through a flange member. The extension shaft portion of the sun gear S2 of the planetary gear set G is connected to a power transmission member 14 with a spline engagement, and the power transmission member 14 is connected to a drum 72 of the third clutch C-3 with an end surface engagement. The extension shaft portion of the sun gear S3 is connected to an extension shaft portion of a cylinder 60 of a hydraulic servo of the first clutch C-1 with a spline engagement. The carrier C2 (C3) is connected to a member which is fixed on the rear end of the carrier C2 (C3) and structured by integrating a hub 54 of the second clutch C-2, a hub of the second brake B-2 and an inner race of the one-way clutch F-1. The member extends toward the frontside in the outer position of the planetary gear set. Further, the ring gear R2 is connected to the counter drive gear 19 through the connecting member as mentioned above.

In the reduction planetary gear G1, the sun gear S1, as a reaction element, is fixed with a spline engagement on the rear end portion of the sleeve shaft 13. The sleeve shaft 13 is engaged and fixed on the inner surface of the front boss portion 10a and connects a stator of a torque converter through a one-way clutch to the oil pump cover at the front end portion of the sleeve shaft 13. The ring gear R1, as the input element, is connected with a spline engagement to the outer surface of the flange 11a of the input shaft 11. Thus, the reduction planetary gear G1 is arranged in the side of the shift mechanism. Carrier C1, as the output element, is connected, at the front end side, to a common hub 74, which is mentioned later, of the first and third clutches C-1, C-3.

Next, the hydraulic servos 6, 7 of the first and third clutches (C-1, C-3) are arranged on the both sides of the reduction planetary gear G1 in order that the hydraulic servos face one another. That is, the apertures of the cylinders 60, 70 of the hydraulic servos are surfaced to the reduction planetary gear G1 individually. The hydraulic servo 6 of the first clutch C-1 is rotatably supported by a supporting portion 62a on the outer surface of the rear end portion of the front half portion 11A of the input shaft 11. The hydraulic servo 6 of the first clutch C-1 comprises the cylinder 60, a drum 62 fixed on the outer surface thereof, a piston 61 slidably inserted in the cylinder 60, a cancel plate 65 for canceling centrifugal pressure operating at the back surface of the piston 61, and a return spring 66. The servo pressure is applied to/drained from the hydraulic servo 6 through the hydraulic path 11p in the input shaft front half portion 11A.

The cylinder 60 of the first clutch C-1 is arranged at a radially inner position to the frictional member 63 of the clutch, connected to the extension shaft portion of the sun gear S3 of the planetary gear set G with a spline connection, and transmits power from the drum 62 of the first clutch C-1 to the sun gear S3 of the planetary gear set G. The cylinder 60 is supported by the input shaft front half portion 11A.

According to the structure, the cylinder 60 of the first clutch C-1 is used for transmitting power from the first clutch C-1 to the sun gear S3 of the planetary gear set G so that a particular member for power transmission need not be arranged in the axial direction. Therefore, the axias size of the transmission is reduced. Further, the supporting portion 62a, which supports the drum 62 through the hydraulic servo 6 of the first clutch C-1, is arranged in a radially inward position to the power transmission member 14 so that a large arrangement space in the axial direction is not needed. Therefore, the axial length of the hydraulic servo 6 is shortened to an axial length corresponding to a clearance between arrangement positions of seal rings which seal the hydraulic path for the servo pressure applied to the hydraulic servo at both sides in the axial direction. As a result, the axial length of the shift mechanism is shortened and the clutch drum 62 is well supported.

The hydraulic servo 7 of the third clutch C-3 is rotatably supported through a bush by a supporting portion 72a on the outer surface of the front boss portion 10*a* The hydraulic servo 7 of the third clutch C-3 comprises the cylinder 70 of which a drum 72 is formed at the radially outer side, a piston 71 is slidably inserted in the cylinder 70, a cancel plate 75 for canceling a centrifugal pressure operating at the back surface of the piston 71, and a return spring 76. The servo pressure is applied to/drained from the hydraulic servo 7 through a hydraulic path 10*q* formed in the front boss portion 10*a*.

The frictional member 63 of the first clutch C-1 and the frictional member 73 of the third clutch C-3 are axially aligned in the radially outward position of the reduction planetary gear G1. The frictional member 63 of the first clutch C-1 comprises multiple frictional elements, which are engaged with the hub 74 by a spline engagement at the radially inner surface, and separator plates, which are engaged with the drum 62 by a spline engagement at the radially outer surface. The frictional member 63 transmits a torque from the hub 74 to the drum 62 when the frictional member 63 is engaged by a backing plate fixed on an end of the drum 62 and the piston 61, which moves axially from the cylinder 60 by the application of hydraulic pressure to the hydraulic servo 6.

The frictional member 73 of the third clutch C-3 is also structured from a multiple frictional elements, which are engaged with the hub 74 by a spline engagement at the radially inner surface, and separator plates, which are engaged with the drum 72, by a spline engagement at the radially outer surface. The frictional member 73 transmits a torque from the hub 74 to the drum 72 when the frictional member 73 is engaged by a backing plate fixed on an end of the drum 72 and the piston 71, which moves axially from the cylinder 70 by applying hydraulic pressure to the hydraulic servo 7.

In this structure, the two clutches, which are the first and third clutches (C-1, C-3) transmitting the reduction torque outputted from the reduction planetary gear G1 to the planetary gear set G, are arranged in positions close to the reduction planetary gear G1. Further, the reduction planetary gear G1 is surrounded by the frictional members 63, 73 arranged in the radially outer position and the hydraulic servos 6, 7 arranged at both axial sides. Therefore, the power is transmitted from the reduction planetary gear G1 to both clutches (C-1, C-3) and the inner area surrounded by the clutches C-1, C-3, that is, the power is directly transmitted from the carrier C1 to the common hub 74 of both clutches C-1, C-3 without arranging a particular member. One of the powers delivered from the two clutches C-1, C-3 is transmitted to the planetary gear set G through the hydraulic servo 6. Therefore, the number of members, which must be supported on the shaft for transmitting power and superposed, is reduced by the direct power transmission from the reduction planetary gear G1 to both clutches C-1, C-3 and the power transmission using the hydraulic servo 6 of the first clutch. As a result, the axial length of the shift mechanism is shortened. Further, a multiple shaft structure, in which a shaft for transmitting a power is arranged in the radially inner position of the planetary gear set G and which is needed in a complicated arrangement of input routes of the reduction torque and the non-reduction torque to the planetary gear set G, is avoided by the integration of the transmission routes of the reduction torque. Therefore, the transmission is lightened and made compact.

According to the connection of the divided input shaft 11 and the connection between the first clutch C-1 and the third clutch C-3 and the planetary gear set G through the clearance between the outer surface of the input shaft 11 and the inner surface of the counter drive gear 19, the spline connecting portion between the input shaft front half portion 11A and the rear half portion 11B, the spline connecting portion between the extension shaft portion of the sun gear S3 and the extension shaft portion of the cylinder 60, and the spline connecting portion between the extension shaft portion of the sun gear S2 and the power transmission member 14 are arranged in positions which are not radially superposed relative to one another. Therefore, an enlargement, which is caused by radially superposing the three connecting portions, is prevented and the structure is compact.

The hydraulic servo 5 of the second clutch C-2 is arranged in the rear side of the planetary gear set G, that is, in the hindmost position of the shift mechanism, connected to the flange 11*b* of the input shaft rear half portion 11B at the inner surface. The hydraulic servo 5 comprises the cylinder 50 having a drum 52 formed at the outer side by increasing the diameter, a piston 51 slidably inserted in the cylinder 50, a cancel plate 55 for canceling a centrifugal pressure, and a return spring 56. The servo pressure is applied to/drained from the hydraulic servo 5 through a hydraulic path 10*t* formed in the rear boss portion 10*b*.

The frictional member 53 of the second clutch C-2 comprises multiple frictional elements, which are engaged with the hub 54 by a spline engagement at the radially inner surface, and separator plates, which are engaged with the drum 52 by a spline engagement at the radially outer surface. The frictional member 53 is engaged with the hub 54 in a position which is to the rear, radially outer position of the planetary gear set G and in which the ring gear R2 is not arranged. The frictional member 53 transmits a torque from the drum 52 to the hub 54 when the frictional member 53 is engaged by being compressed between a backing plate, fixed on an end of the drum 52, and the piston 51, which slides out from the cylinder 50 by the application of hydraulic pressure to the hydraulic servo 5.

The second clutch C-2, the frictional member 53 of which has a smaller torque capacity than the first and third clutches C-1, C-3, because the non-reduction torque is transmitted to the frictional member 53, is arranged in the radially outer position of the planetary gear set G and enlarged to have a large capacity. A hydraulic servo 9 of the second brake B-2, arranged in the radially outer position of the hydraulic servo 5, is downsized because the frictional member 53 of the second clutch C-2 having the large capacity. Therefore, both hydraulic servos are arranged by effectively using the space in the radial direction. As a result, the axial length of the transmission is further shortened.

First brake B-1 is a band brake. The brake band 83 of the band brake B-1 constricts the outer surface of the drum 72 of the third clutch C-3 as an engagement surface. Therefore, the first brake B-1 is arranged without additional axial space and the diameter of the transmission is barely increased. The hydraulic servo of the band brake B-1 is arranged with the same axial position as the brake band 83, and extends tangent the drum 72. The hydraulic servo is not illustrated in the figures. Thus, the drum 72, which supports the frictional member 73 of the third clutch C-3 arranged in the radially outer position of the reduction planetary gear G1, is the drum of the first brake B-1 and the supporting portion 72*a*, for supporting the drum 72, is arranged in a substantially radially aligned position of the sun gear S1 of the reduction planetary gear G1 so that a radial space for arranging the drum 72 and an axial space for supporting the drum 72 are reduced. Therefore, the diameter and the axial length of the transmission are reduced. Further, the drum 72, which is constricted by the band 83, is supported on the front boss portion 10a of the case 10 at the radially inner position of the constricting portion so that a steady brake performance is achieved.

The second brake B-2 is a multiple disc type, the same as each clutch. The frictional member 93 of the second brake B-2 is arranged in the front position of the radially outer position of the planetary gear set G. The hydraulic servo 9 of the second brake B-2 is arranged on the rear end wall portion 10e of the case 10 radially outwardly of the hydraulic servo 5 of the second clutch C-2. It is possible to push the frictional member 93 of the second brake B-2 by virtue of being positioned outwardly of the frictional member 53 of the second clutch C-2. The second brake B-2 is axially aligned with the one-way clutch F-1. The hydraulic servo 9 of the second brake B-2 is formed by inserting a piston 91 into the rear end wall portion 10e of the transmission case 10. Then, the cylinder is built into the case 10. The outer peripheries of the separator plates of the frictional member 93 am engaged with the surrounding wall portion 10f of the case 10 by the spline 10g. The inner peripheries of the frictional elements are engaged with a brake hub integrated with the clutch hub 54 using a spline engagement. The hydraulic servo 9 comprises the cylinder and the cylindrical piston 91 inserted into the cylinder. The cylinder comprises the surrounding wall portion 10f, rear end wall portion 10e and a cylindrical wall 10e' axially extended from the rear end wall portion 10e of the case 10. The extension portion of the piston 91 passes by the radially outer position of the drum 52 of the second clutch C-2 and is surfaced to engage the frictional member 93. A return spring 96 and the receiving member 96' are arranged in the trough portion 10g' of the spline 10g supporting the frictional member 93 of the second brake B-2.

Thus, the return spring 96 and the receiving member 96' are arranged in the trough portion 10g' of the spline 10g of the case 10 so that a substantial arrangement space for the return spring 96 is not needed. Therefore, the diameter of the transmission case is decreased.

Next, the counter drive gear 19 is supported by a bearing 12 on a center boss portion 10h extended to the rear side from the radially inner portion of the support 10C. As shown in FIG. 5, a step portion is formed on the approximately intermediate portion of the case mainframe 10B by barely increasing the diameter, and the outer side of the support 10C is fixed with bolts on the end surface of the spline formed at the step portion.

As shown in FIG. 5, a differential drive pinion gear 22, engaged with a differential ring gear 31 of a differential unit 3, is arranged on the front end portion of the counter shaft 20. The differential drive pinion gear 22 is arranged axially aligned with the front end wall 10A in which a part of the oil pump body has a notch. According to the arrangement of the differential drive pinion gear 22, the front side of the counter shaft 20 is supported through a bearing on the case mainframe 10B at a position adjoining the differential drive pinion gear 22. According to this positional relationship, the hydraulic servo 7 of the third clutch C-3 is also substantially axial aligned with the differential ring gear 31. A portion of the frictional member 73 of the third clutch C-3, which is arranged in the radially outer position of the reduction planetary gear G1, is arranged to be in an axially adjacent position and radially aligned with a portion of the differential ring gear 31.

In this arrangement, the differential drive pinion gear 22 is arranged as far to the front side as possible so that the differential ring gear 31 and the frictional member 73 of the third clutch C-3 are not superposed in the radial direction with each other. Therefore, a limitation on the diameter of the frictional member 73 is reduced so that the needed capacity is maintained. Further, even if the hydraulic servo 7 of the third clutch C-3 is downsized because of a shortening of the clearance between the axis or an interference with the differential ring gear 31 for which the diameter is increased, enough clutch capacity is maintained. As a result, in this structure, in case a constant clearance is maintained between the input shaft 10 and the differential shaft 30, a degree of freedom for setting the differential ratio is increased by increasing a degree of freedom for selecting the diameter of the differential ring gear. Further, it is easy to shorten the clearance between the axes.

Figure 8:
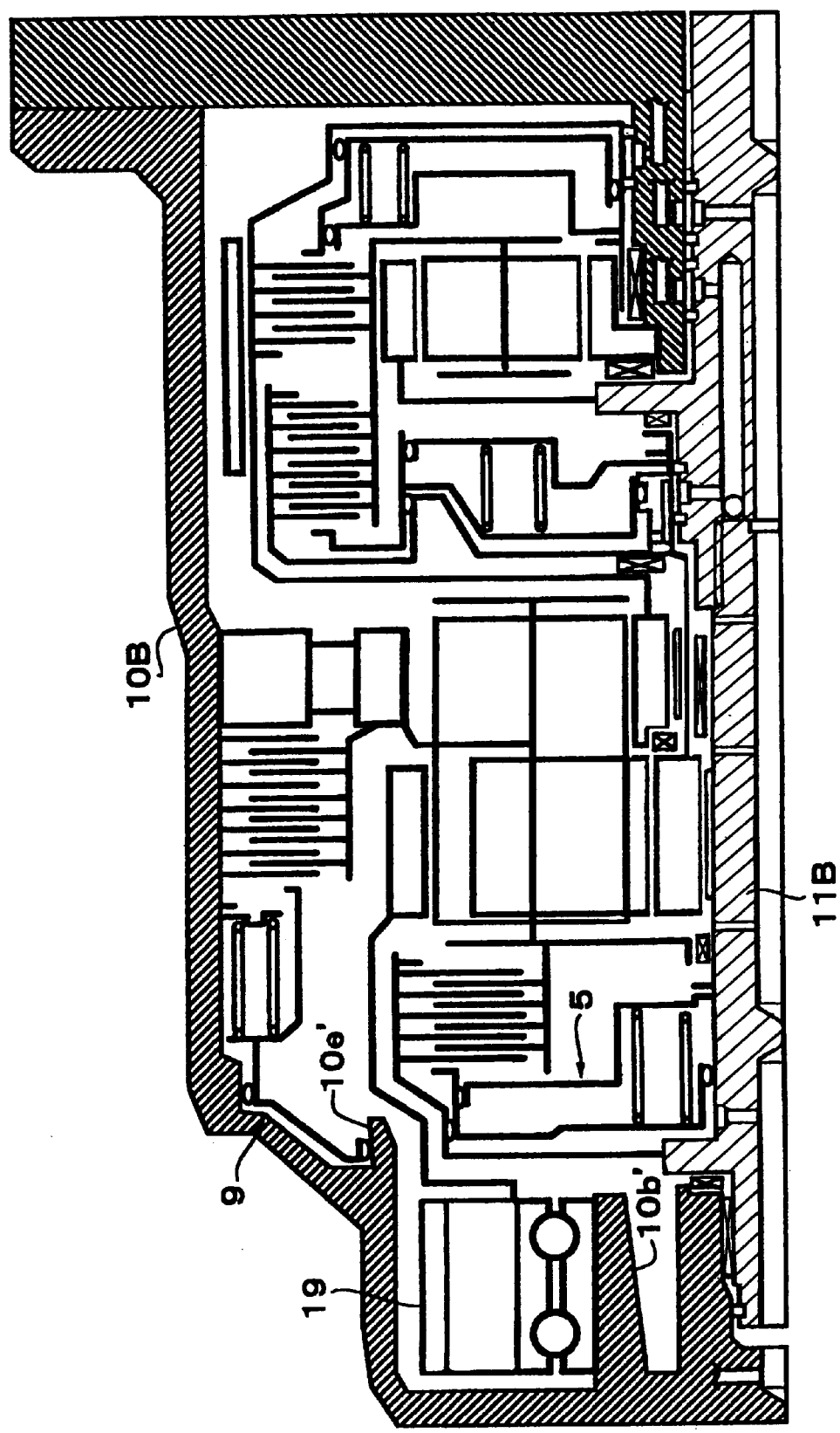
FIG. 8 is an axial cross sectional diagram illustrating the first transformed embodiment transformed from the first embodiment.

Next, FIG. 8 illustrates a first transformed embodiment, in which the each element arrangement is substantially the same as with the first embodiment and only the counter drive gear 19 is moved to the hindmost position of the transmission, with a simplified cross sectional view. In this embodiment, the hydraulic servo 5 of the second clutch is supported on the outer surface of the input shaft rear half portion 11B, and the counter drive gear 19 is supported on a second rear boss portion 10b' having a large diameter of the case mainframe 10B. Further, the cylinder of the hydraulic servo 9 of the second brake B-2 is formed on a step portion of the case mainframe 10B.

In this transformed embodiment, the diameter of the rear end portion of the case mainframe 10B decreased corresponding to the diameter of the counter drive gear 19 so that the rear end portion of the transmission is downsized. That is, the rear end portion, which would be obstructed by a vehicle side member during mounting on a vehicle, if not reduced in diameter, is downsized. The mounting characteristics of the transmission are improved.

Figure 9:
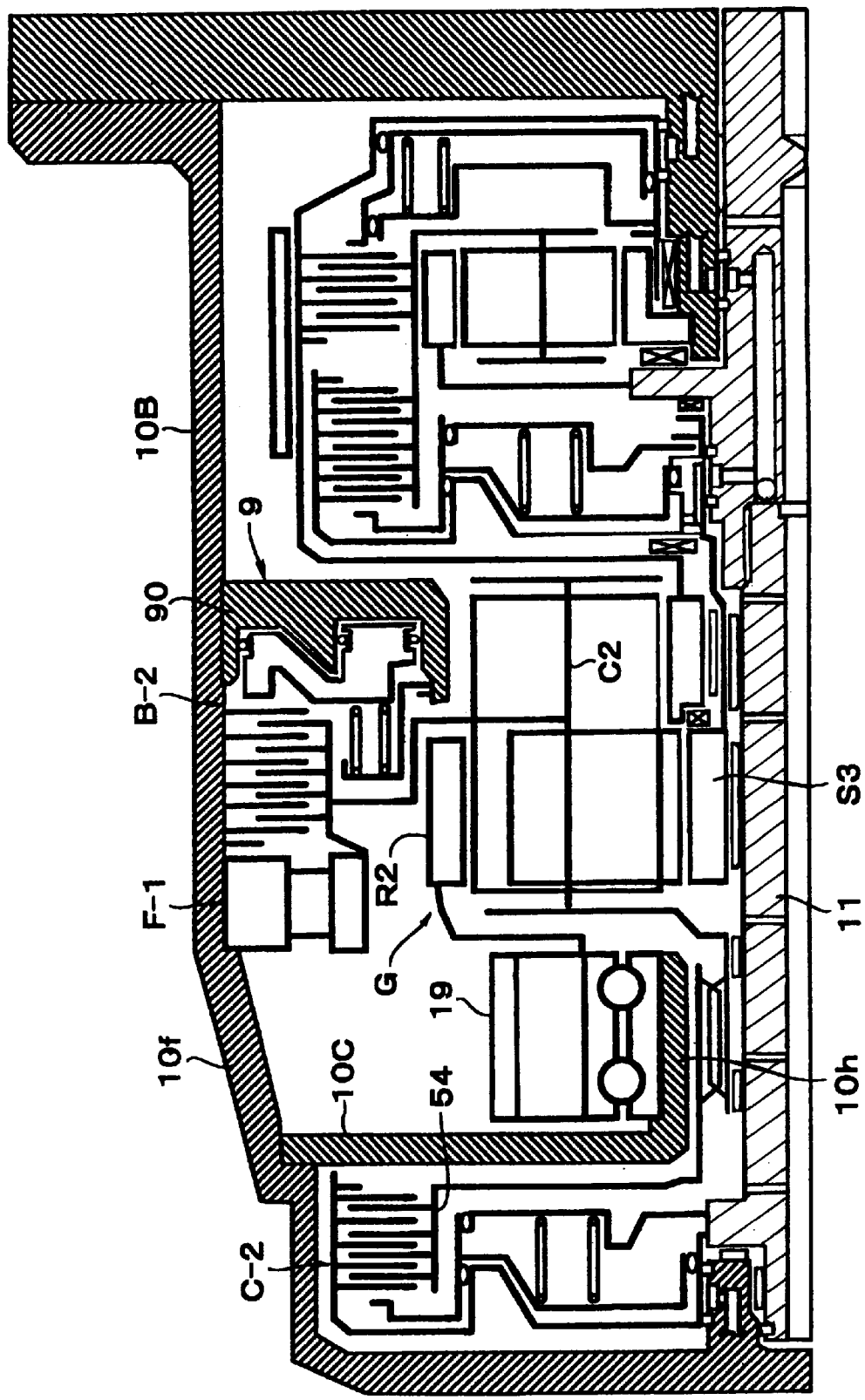
FIG. 9 is an axial cross sectional diagram illustrating the second transformed embodiment transformed from the first embodiment.

FIG. 9 illustrates a second transformed embodiment, in which each element arrangement is substantially the same as with the first embodiment and the counter drive gear 19 is arranged between the planetary gear set G and the second clutch C-2, using a simplified cross sectional view. In this embodiment, the counter drive gear 19 is supported on a boss portion 10h. The boss portion 10h is extended to the front side from a support 10C fixed on the surround wall portion 10f of the case mainframe 10B. The hub 54 of the second clutch C-2 is extended along the input shaft 11, the shaft supporting portion of the arriere C2 (C3) of the planetary gear set G is also extended in an overlapping manner along the input shaft 11, and the axial extension portions that overlap are connected with a spline engagement in the inner position of the support 10C supporting the counter drive gear 19. The hydraulic servo 9 of the brake B-2 comprises an independent cylinder 90 fixed on the surround wall 10f of the case mainframe 10B. In this case, the positions of the brake B-2 and the one-way clutch F-1 are exchanged, the ring gear R2 of the planetary gear set G is moved to an axially aligned position of the small sun gear S3, and the cylinder 90 is arranged in a radially and axially aligned position corresponding to the planetary gear set G which does not house the ring gear R2 to secure the required capacity for the hydraulic servo 9.

In the second transformed embodiment, the second clutch C-2 having small load torque is positioned in the hindmost position, and the elements having large load torque are integrally arranged relatively toward the front side. Therefore, it is easy to maintain the rigidity of the transmission. Further, the relationship of the hydraulic pressure application is the same as with the first embodiment. Therefore, a sliding resistance caused by seal rings is reduced as compared with the first transformed embodiment.

The first and third clutches C-1, C-3 and the reduction planetary gear G1, which are generically shown as a large torque transmission group, are arranged in the engine connecting side of the transmission in the aforementioned embodiments. However, they can be arranged in the rear end side of the transmission and the connection relationship are maintained.

Figure 10:
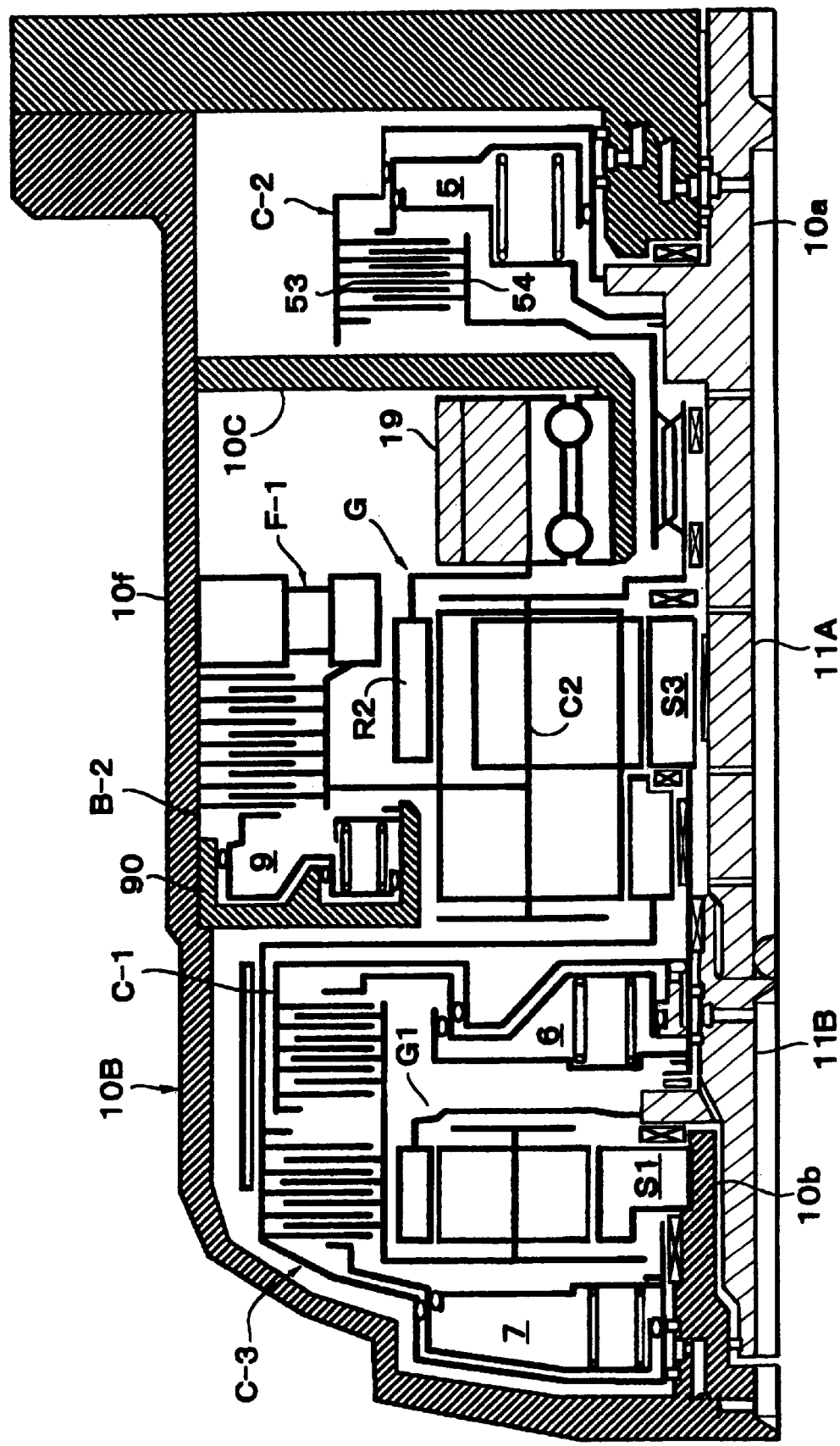
FIG. 10 is an axial cross sectional diagram illustrating the third transformed embodiment transformed from the first embodiment.

FIG. 10 illustrates a third transformed embodiment thus structured using a simplified cross sectional view. In the transformed embodiment, the order of the positions of the planetary gear set G, reduction planetary gear set G1 and the three clutches (C-1 through C-3) are reversed from the first embodiment. The counter drive gear 19 is arranged between the second clutch C-2 found in the front-most portion of the transmission and the planetary gear set G. The ring gear R2 of the planetary gear set G is arranged to be radially aligned with the small sun gear S3 to shorten the connecting route to the counter drive gear 19. The relative positional relationship between the second brake B-2 and the one-way clutch F-1 is not changed to position the hydraulic servo 9 of the second brake B-2 in the radially outer position, in which the ring gear R2 is not arranged, of the planetary gear set G for the same reason as was the case of the second transformed embodiment.

In this structure, the sun gear S1 of the reduction planetary gear G1 is fixed on the rear boss portion 10b extended from the case mainframe 10B. The hydraulic servo 6 of the first clutch C-1 is supported on the input shaft rear half portion 11B. The hydraulic servo 7 of the third clutch C-3 is supported on the rear boss portion 10b. The hydraulic servo 5 of the second clutch C-2 is supported on the front boss portion 10a. The hydraulic servo 9 of the brake B-2 comprises an independent cylinder 90 fixed on the surround wall 10f of the case mainframe. The counter drive gear 19 is arranged between the planetary gear set G and the second clutch C-2, the hub 54 of the second clutch is extended to the front side along with the input shaft front half portion 11A, the carrier C2 (C3) of the planetary gear set G is extended to the rear side along with the input shaft front half portion 11A, and the axial extension portions are connected with a spline engagement in the inner position of the support 10C supporting the counter drive gear 19.

The second clutch C-2 has small torque transmission capacity because the second clutch C-2 does not transmit the reduction torque. Therefore, the diameter of the frictional member of the second clutch C-2 can be reduced. In the third transformed example, the second clutch C-2, which was a small diameter, is positioned in the mostly front side, and the counter drive gear 19 is axially aligned. Therefore, interference between the frictional member 53 and the differential ring gear 31 is reduced and a degree of freedom for setting the clearance between the main axis X and the differential axis Z shown in FIG. 1 is increased It is noted that the clearance is affected by the differential gear ratio. Further, the counter driven gear 21 engaged with the counter drive gear 19 is arranged close to differential drive pinion gear 22 so that the counter shaft 20 is shortened and the weight of the transmission is reduced.

The further detail of this point will be described. The clutch C-2, which directly transmits the rotation of the input shaft 11 to the carrier C2 (C3), is not engage in the forward first through third speeds and the reverse speed as mentioned before Therefore, clutch C-2 does not receive a stall torque, which is amplified from the engine torque transmitted from the torque converter 4, in a vehicle stop state. Further, in comparison with the other clutches C-1, C-3 in the velocity diagram of FIG. 4, the clutch C-2 does not receive the amplification torque amplified by the deceleration. Therefore, the clutch C-2 can be structured to have a smaller torque capacity compared with the other clutches C-1, C-3. It is noted that the torque capacity is set by a diameter of the clutch and the number of frictional members. Therefore, in the axial positional relationship shown in FIG. 2, the diameter of the differential ring gear 31 can be increased by reducing the diameter of the clutch C-2.

Figure 11:
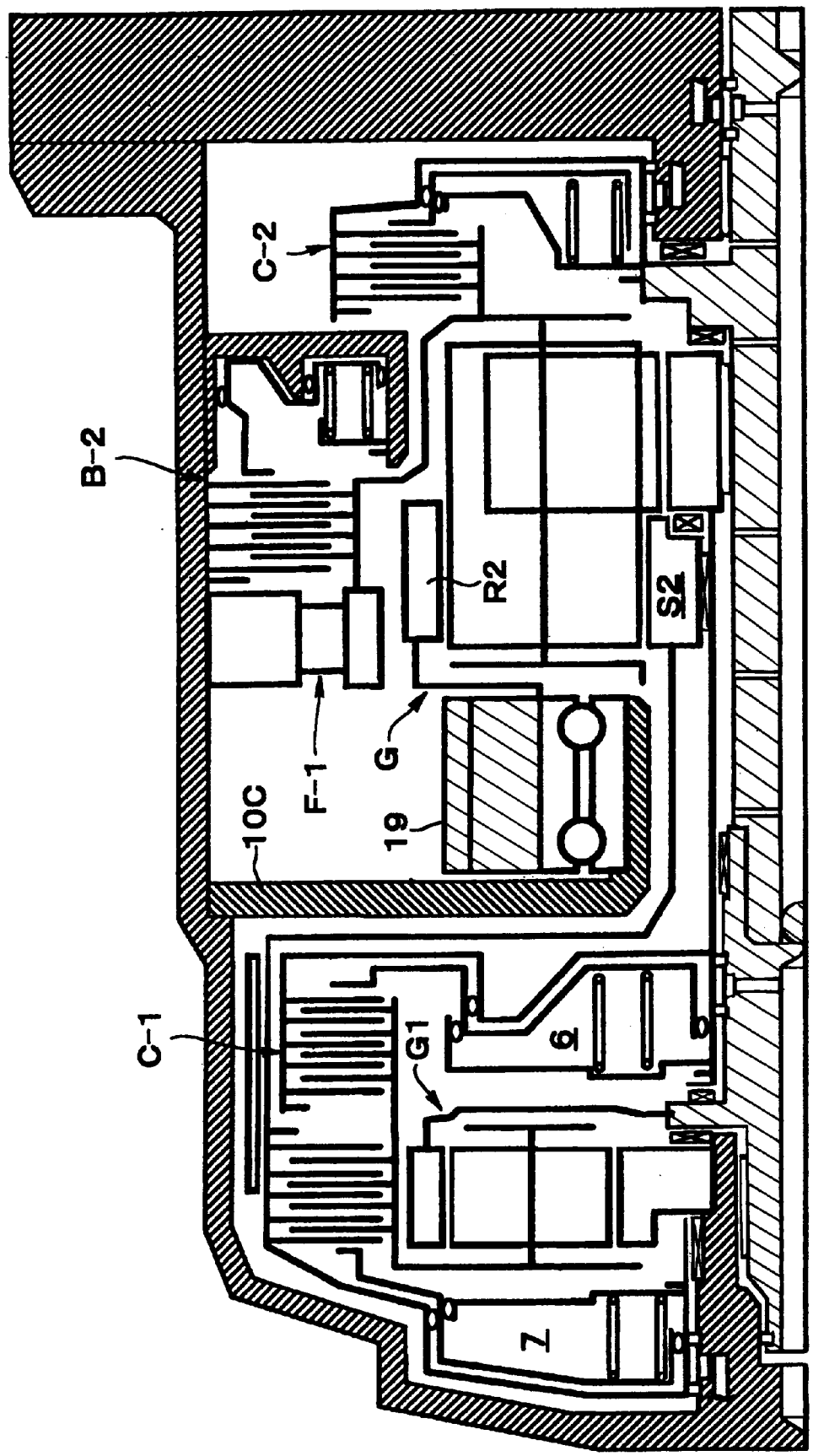
FIG. 11 is an axial cross sectional diagram illustrating the fourth transformed embodiment transformed from the first embodiment.

Next, in the structure, in which high torque transmission members are arranged at the rear end side of the transmission mentioned above, the positions of the remaining elements are able to be moved similarly with the aforementioned transformed embodiments. FIG. 11 illustrates a fourth transformed embodiment, in which the counter drive gear 19 is arranged between the planetary gear set G and the first clutch C-1, using a simplified cross sectional view. In the transformed embodiment, the counter drive gear 19 is positioned in the large sun gear S2 side Therefore, the ring gear R2 of the planetary gear set G is arranged at the large sun gear S2 side for the same reason as was the case of the third transformed embodiment. Therefore, the positional relationship between the second brake B-2 and the one-way clutch F-1 is reversed from the third transformed embodiment.

In the fourth transformed embodiment, comparing it with the third embodiment, the diameter of the transmission is increased because the transmission routes of the reduction torque go through the inner position of the support wall 10C. But, the rigidity of the transmission is increased by arranging the planetary gear set G, which is a heavy weight element, in the from position as compared wit the third transformed embodiment. Further, the connecting route between the second clutch C-2 and the planetary gear set G is shortened.

Figure 12:
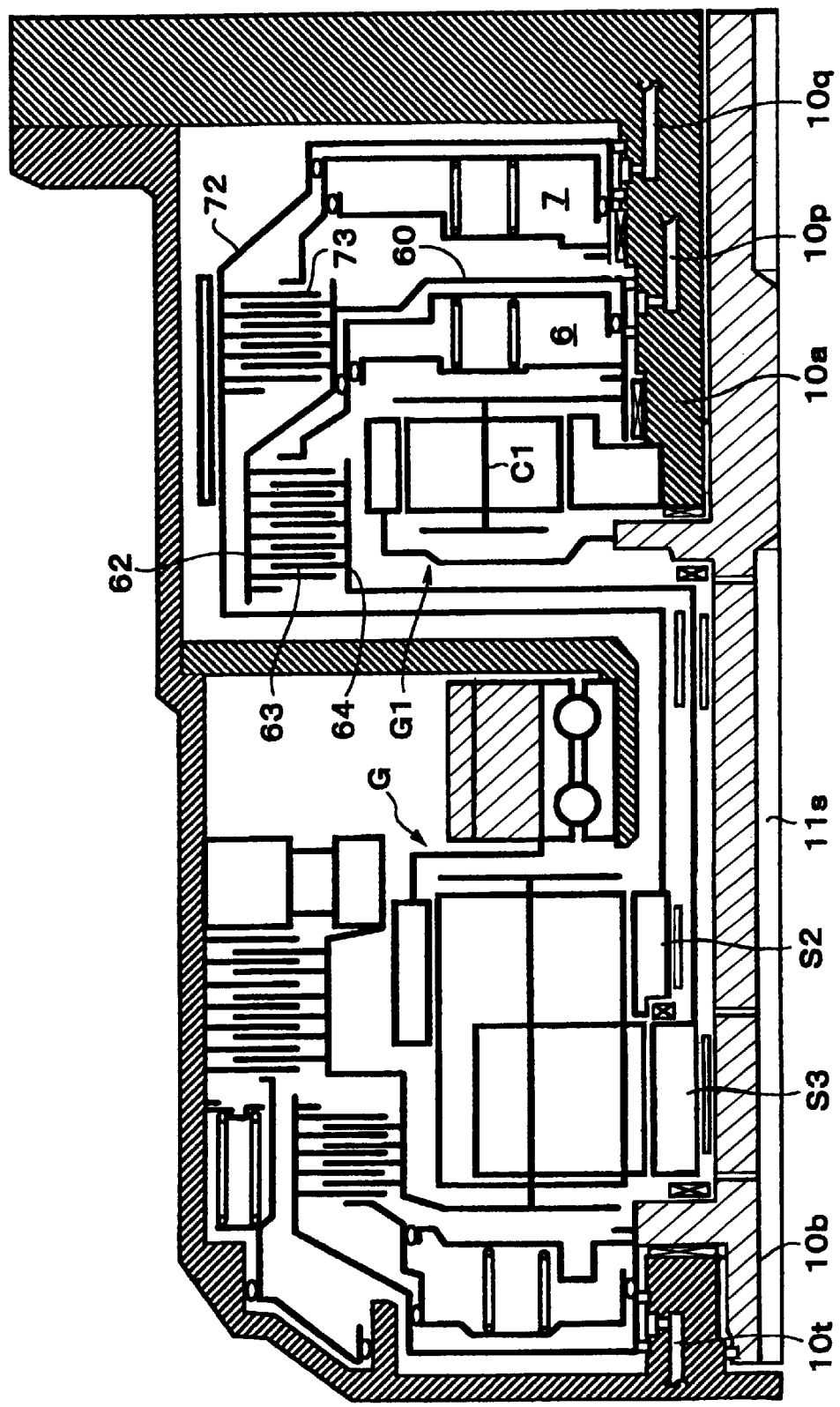
FIG. 12 is an axial cross sectional diagram illustrating a second embodiment of the invention.

Next, in each of the aforementioned embodiments, the hydraulic servos 6, 7 of the first and third clutches C-1, C-3 are arranged on both sides of the reduction planetary gear G1 individually, that is, the hydraulic servo 6 of the first clutch C-1 is arranged between the reduction planetary gear G1 and the planetary gear set G and the hydraulic servo 7 of the third clutch C-3 is arranged between the reduction planetary gear G1 and the front wall 10A or the rear end wall portion 10e. The hydraulic servo 6, 7 can be integrally arranged in one side of the reduction planetary gear G1. FIG. 12 illustrates a second embodiment having such a structure using a simplified cross sectional view.

In the embodiment, the drums 62, 72 integrated with the hydraulic servos 6, 7 of both clutches C-1, C-3 are supported on the front boss portion 10a of the transmission case 10, the radially inner portion of the cylinder 60 of the first clutch C-1 is connected to the carrier C1 of the reduction planetary gear G1, the radially outer portion of the cylinder 60 is structured as the hub of the third clutch C-3, and the increased diameter portion of the cylinder 60 is structured as the own drum 62. The frictional member 63 of the first clutch C-1 is connected through the hub 64 to the small sun gear S3 of the planetary gear set G at the radially inner side and engaged with the drum 62 at the radially outer side. The frictional member 73 of the third clutch C-3 is engaged with the outer surface of the cylinder 60 of the first clutch C-1 at the radially inner side and connected through the drum 72 to the large sun gear S2 of the planetary gear set G.

In the second embodiment, the hydraulic paths 10p, 10q, which apply hydraulic pressure to the hydraulic servo 6, 7 of the clutches C-1, C-3, are formed in the boss portion 10a. Therefore, there is one relative rotational portion traversed by each hydraulic path. As a result, it is possible to reduce a sliding resistance caused by seal rings compared with the aforementioned embodiments.

It is understood there will be a number of seal rings arranged between hydraulic paths of members, which relatively rotate, to prevent leakage of oil, the hydraulic paths formed and superposed in a shaft to feed hydraulic paths that apply hydraulic pressure to hydraulic servos of clutches and hydraulic paths that apply lubrication oil throughout the transmission. Where a number of seal rings are required in a hydraulic path, the cost is increased. Further, when the hydraulic path receives a hydraulic pressure, the seal rings receive the hydraulic pressure so that the sliding resistance increases. As a result, the power transmission efficiency is reduced. Therefore, it is better to reduce the number of seal rings. In the case where the hydraulic paths are formed and superposed in the shaft, the diameter of the shaft has to be increased to maintain the strength of the shaft. Therefore, in a case where many hydraulic paths are formed and superposed in the shaft, the diameter of the transmission increases. Therefore, it is better to reduce the number of hydraulic paths.

In this embodiment, a pair of seal rings is arranged between the hydraulic path 10$q$ formed in the front boss portion 10$a$ of the transmission case 10 and the hydraulic servo 7 of the third clutch C-3, a pair of seal rings is arranged between the hydraulic path 10$p$ formed in the front boss portion 10$a$ and the hydraulic servo 6 of the first clutch C-1, and a pair of seal rings is arranged between the hydraulic path 10$t$ formed in the rear boss portion 10$b$ of the transmission case 10 and the hydraulic servo 5 of the second clutch C-2. Further, a seal ring is arranged in the hydraulic path connecting the hydraulic path 10$t$ formed in the rear boss portion 10$b$ of the transmission case 10 to a lubrication oil path 11$s$ formed in the input shaft 11. Therefore, three pairs of seal rings and one seal ring are arranged in the transmission. The hydraulic paths formed in the shaft are not superposed. Thus, in this embodiment, the number of seal rings and the number of hydraulic paths are reduced so that the automatic transmission in which power is efficiently transmitted and having a small diameter results.

Figure 13:
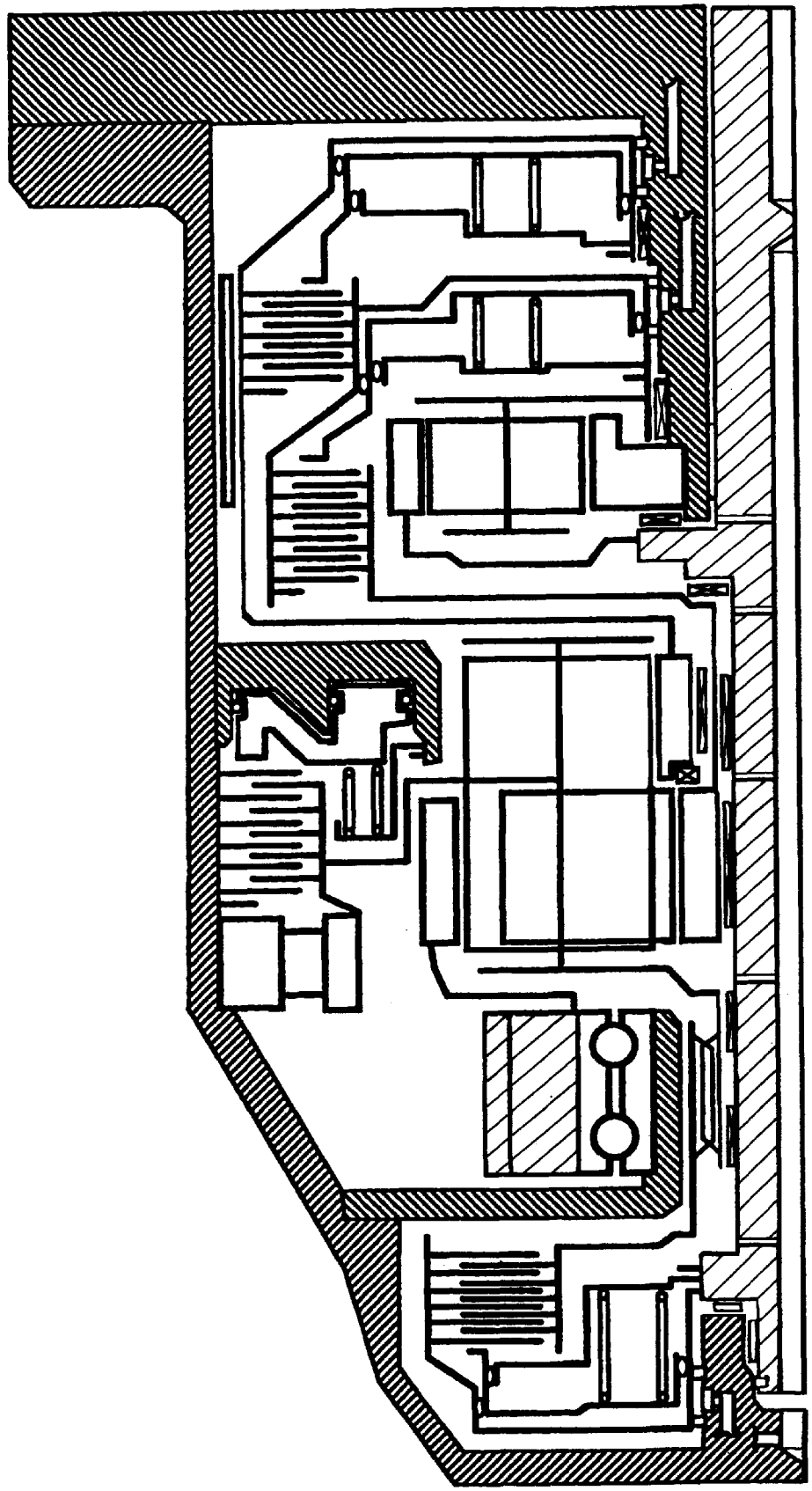
FIG. 13 is an axial cross sectional diagram illustrating the fifth transformed embodiment transformed from the second embodiment.

In the structure in which the first and third clutches C-1, C-3 are axially aligned, various transformations are possible in similar ways to that of the first embodiment FIG. 13 illustrates a fifth transformed embodiment based on the second embodiment and having the same elements arrangement with as the second transformed embodiment using a simplified cross sectional view. The effects and losses of the fifth transformed embodiment relative to the second embodiment are the same as the effects and losses of the second transformed embodiment relative to the first embodiment.

Figure 14:
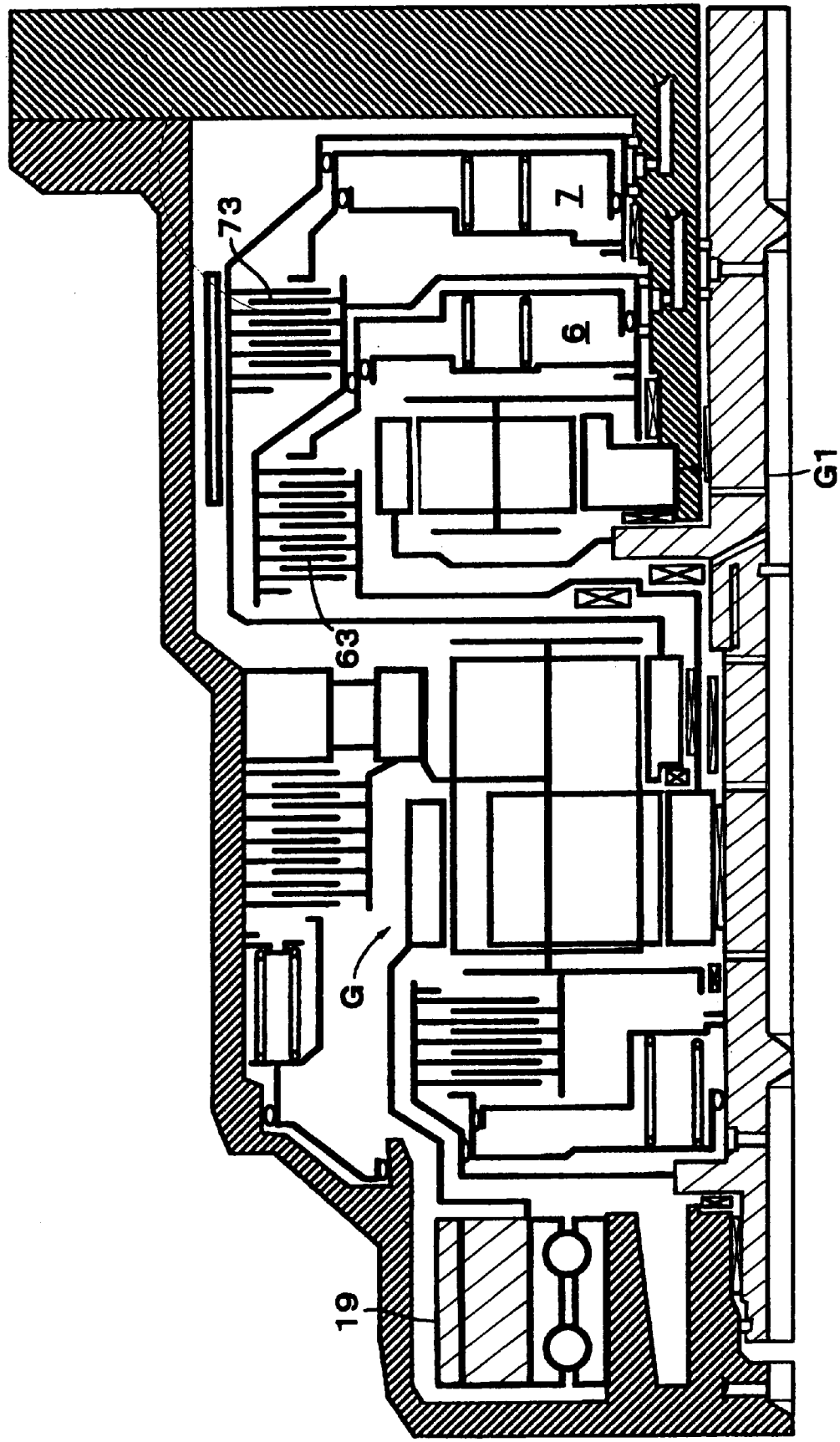
FIG. 14 is an axial cross sectional diagram illustrating the sixth transformed embodiment transformed from the second embodiment.

Next, FIG. 14 illustrates a sixth transformed embodiment having alterations, which are the same as the alterations of the first transformed embodiment relative to the first embodiment, relative to the second embodiment using a simplified cross sectional view. The effects and losses of the sixth transformed embodiment relative to the second embodiment are the same as the effects and losses of the first transformed embodiment relative to the first embodiment.

Figure 15:
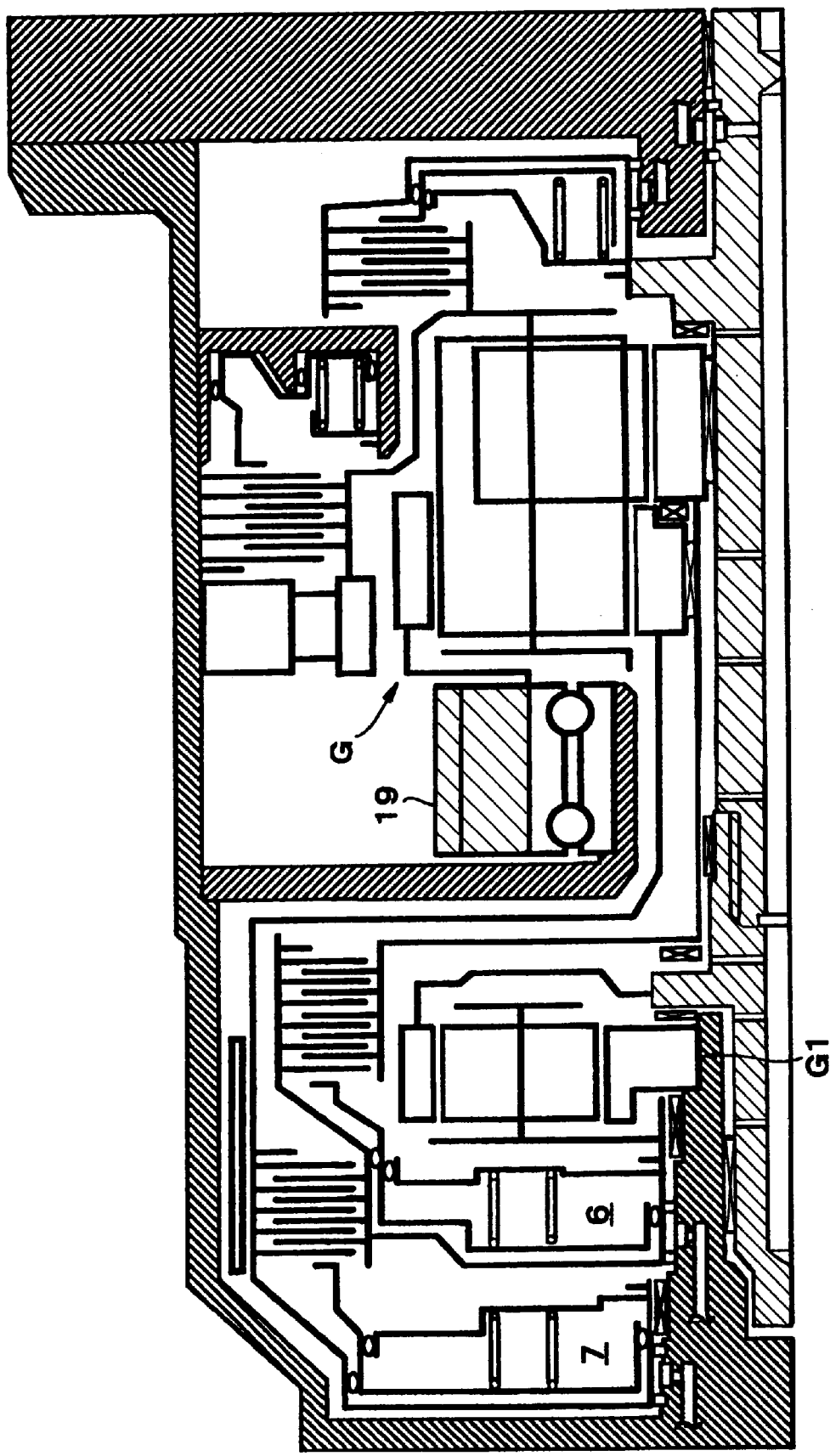
FIG. 15 is an axial cross sectional diagram illustrating the seventh transformed embodiment transformed from the second embodiment.

FIG. 15 illustrates a seventh transformed embodiment having alterations, which are the same as the alterations of the fourth transformed embodiment relative to the first embodiment, relative to the second embodiment using a simplified cross sectional view. The effects and losses of the seventh transformed embodiment relative to the second embodiment are the same as the effects and losses of the fourth transformed embodiment relative to the first embodiment.

Figure 16:
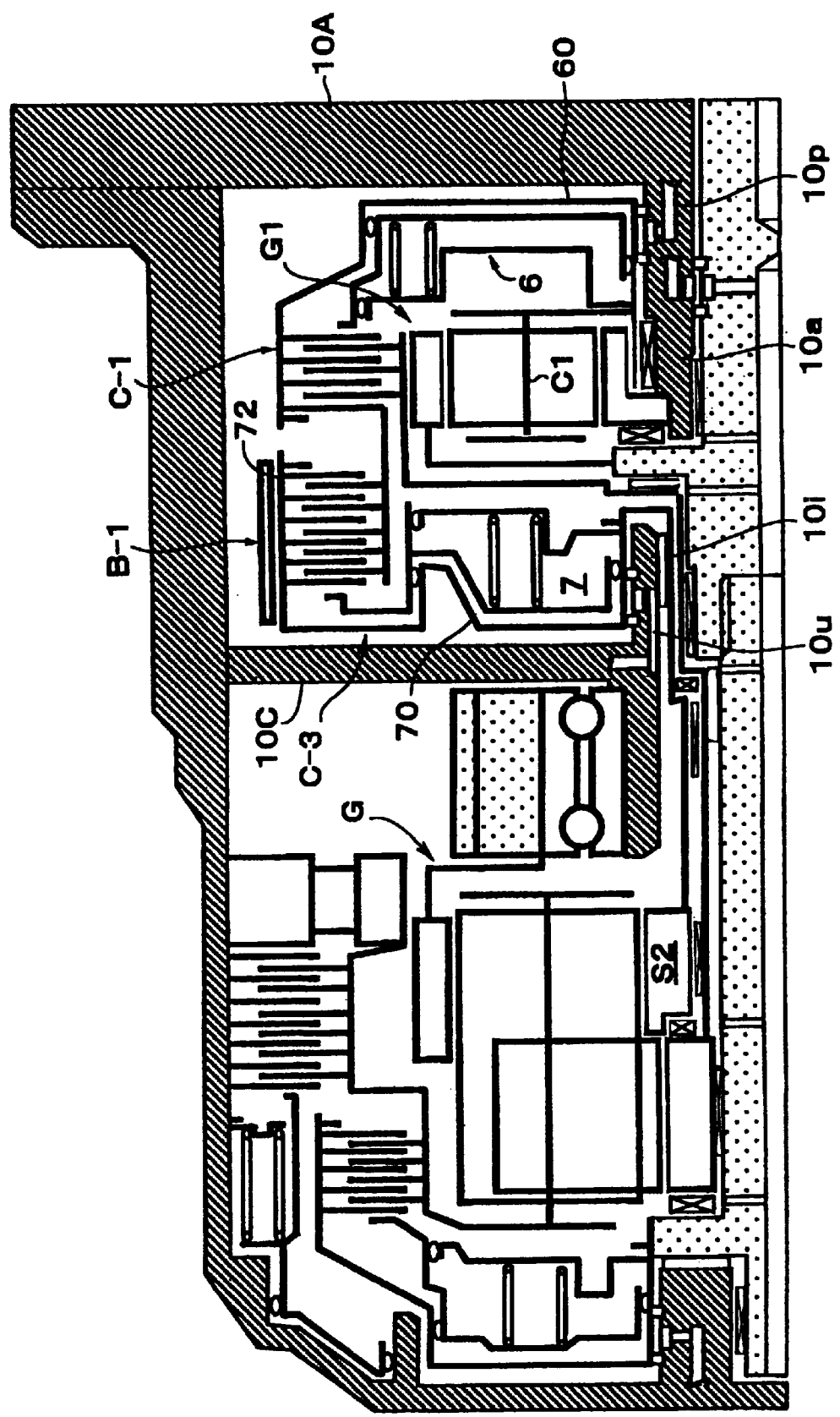
FIG. 16 is an axial cross sectional diagram illustrating a third embodiment of the invention.

FIG. 16 illustrates a third embodiment in which the positional relationship between the first and third clutches C-1, C-3 is reversed from that of the first embodiment. In the embodiment, the hydraulic servo 6 of the first clutch C-1 is arranged between the front end wall 10A and the reduction planetary gear G1, and the hydraulic servo 7 of the third clutch C-3 is arranged between the reduction planetary gear G1 and the support wall 10C. The hydraulic servo 6 of the first clutch C-1 is supported on the front boss portion 10$a$ extended from the front end wall 10A and applied with a hydraulic pressure from the hydraulic path 10$p$ formed in the front boss portion 10$a$ The hydraulic servo 7 of the third clutch C-3 is supported on a boss portion 10$i$ extended toward the front side from the support wall 10C and applied a hydraulic pressure from a hydraulic path 10$u$ formed in the boss portion 10$i$. In this case, the reduction planetary gear G1 is supported on the front boss portion 10$a$ the same as in the first embodiment, but the carrier C1, as the output element, is connected to the radially inner side of the cylinder 60 of the hydraulic servo 6 of the first clutch C-1. The cylinder 70 of the hydraulic servo 7 of the third clutch C-3 is fixed to a connecting member which is connected to the large sun gear S2 of the planetary gear set G. The connecting member is supported on the radially inner surface of the boss portion 10$i$ of the support wall 10C in the axially aligned position (i.e., substantially along a radius) of the band engaging position, in which the drum 72 of the third clutch C-3 is engaged by the band, of the band brake B-1.

In the third embodiment, the length of the high torque transmission route is longer compared with the first embodiment because the high torque is transmitted through the cylinder 60 and the drum 62 of the hydraulic servo 6 of the first clutch C-1. But a hydraulic pressure is directly applied to the hydraulic servo of each of the clutches from the boss portion. Therefore, the number of seal rings needed is the least when compared with the other embodiments. As a result, the reduction in the sliding resistance is maximized.

Figure 17:
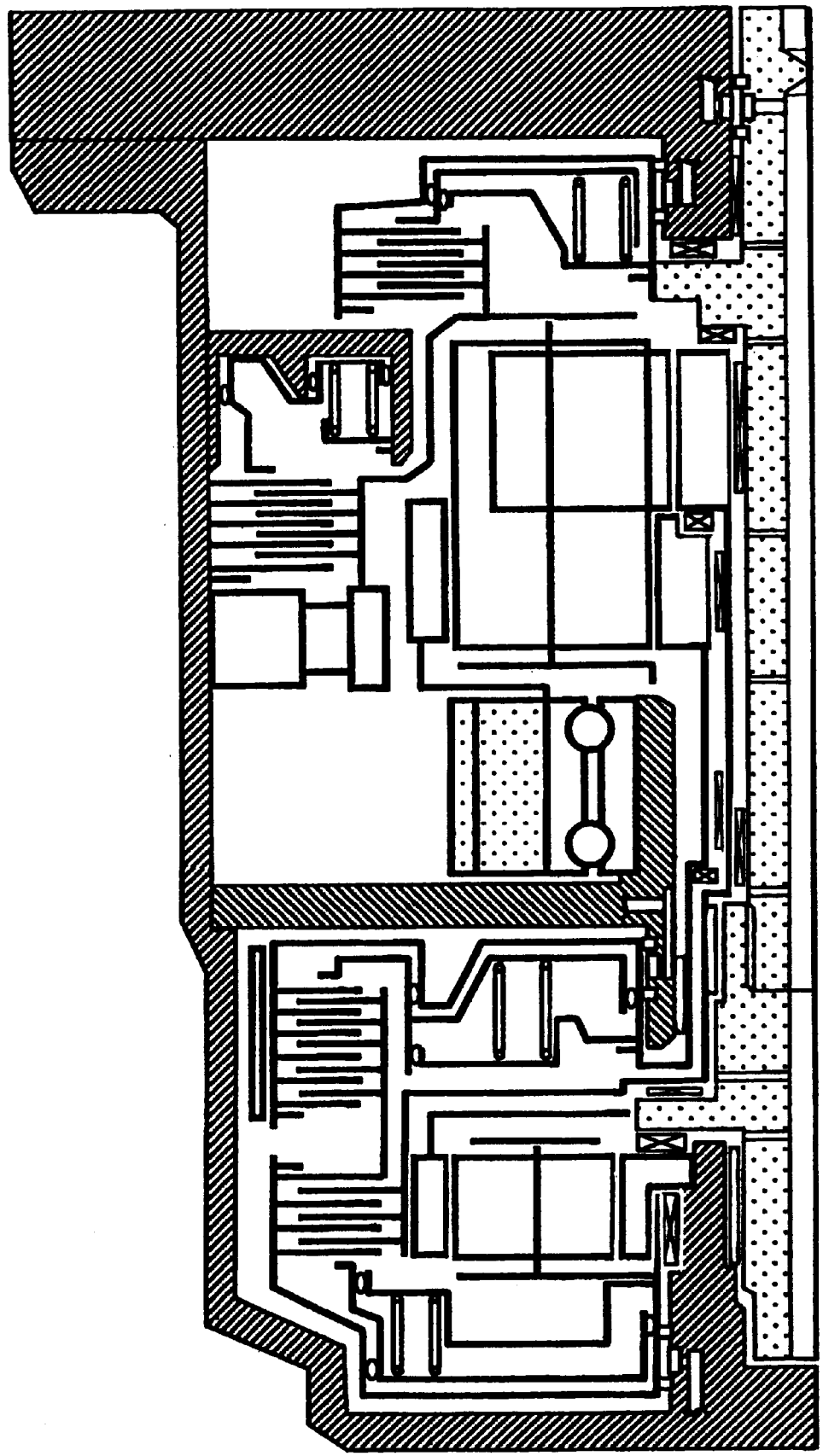
FIG. 17 is an axial cross sectional diagram illustrating the eighth transformed embodiment transformed from the third embodiment.

In the structure based on the third embodiment having such an arrangement of the clutches and alignment of the other elements can be changed in the same manner as the first embodiment. FIG. 17 illustrates an eighth transformed embodiment as one example using a similar simplified cross sectional view. In the embodiment, the alignments are reversed The effects in this case are the same as the effects of the fourth transformed embodiment discussed with reference to FIG. 11.

Figure 18:
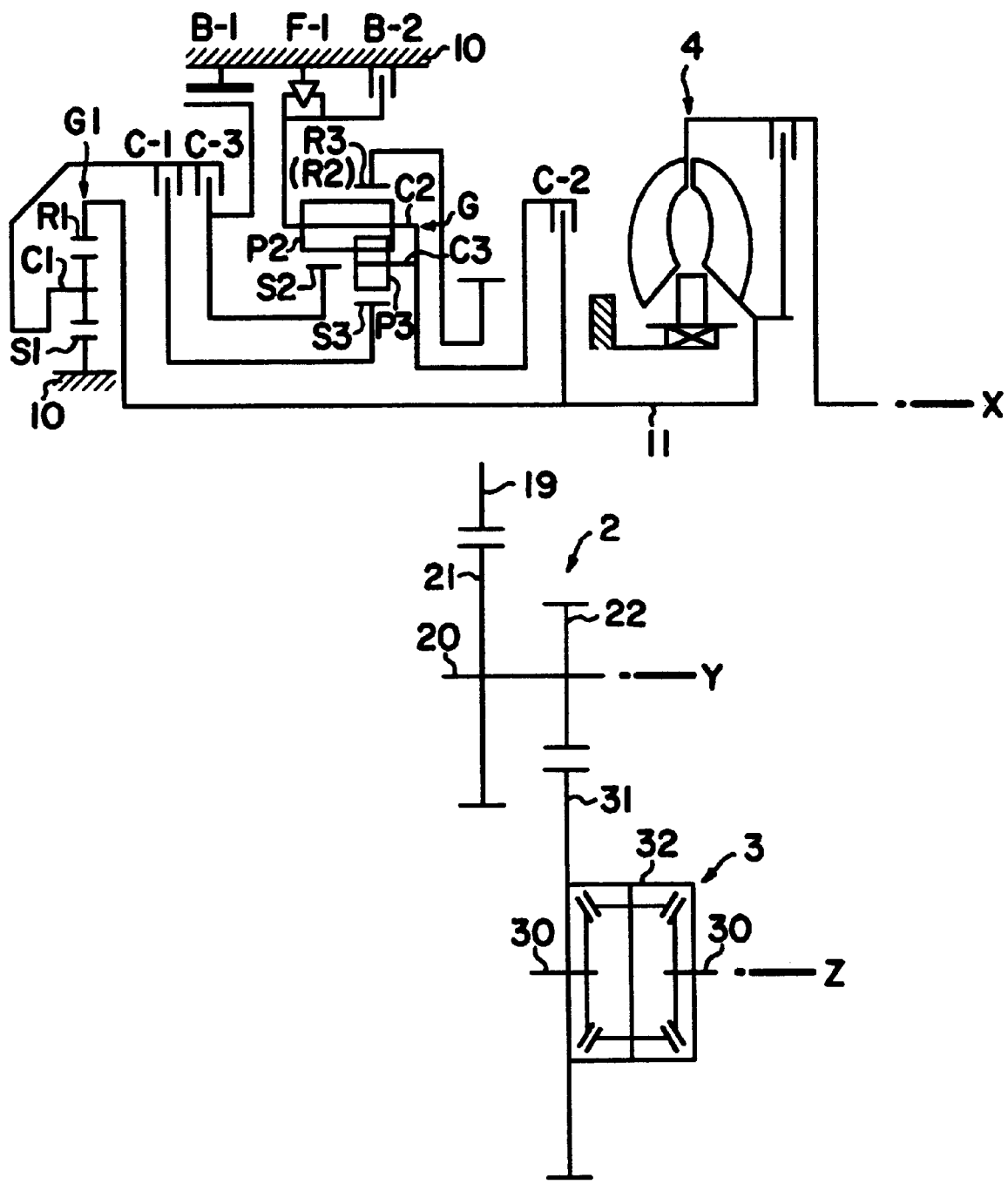
FIG. 18 is an schematic diagram illustrating a gear train of a fourth embodiment.
Figure 19:
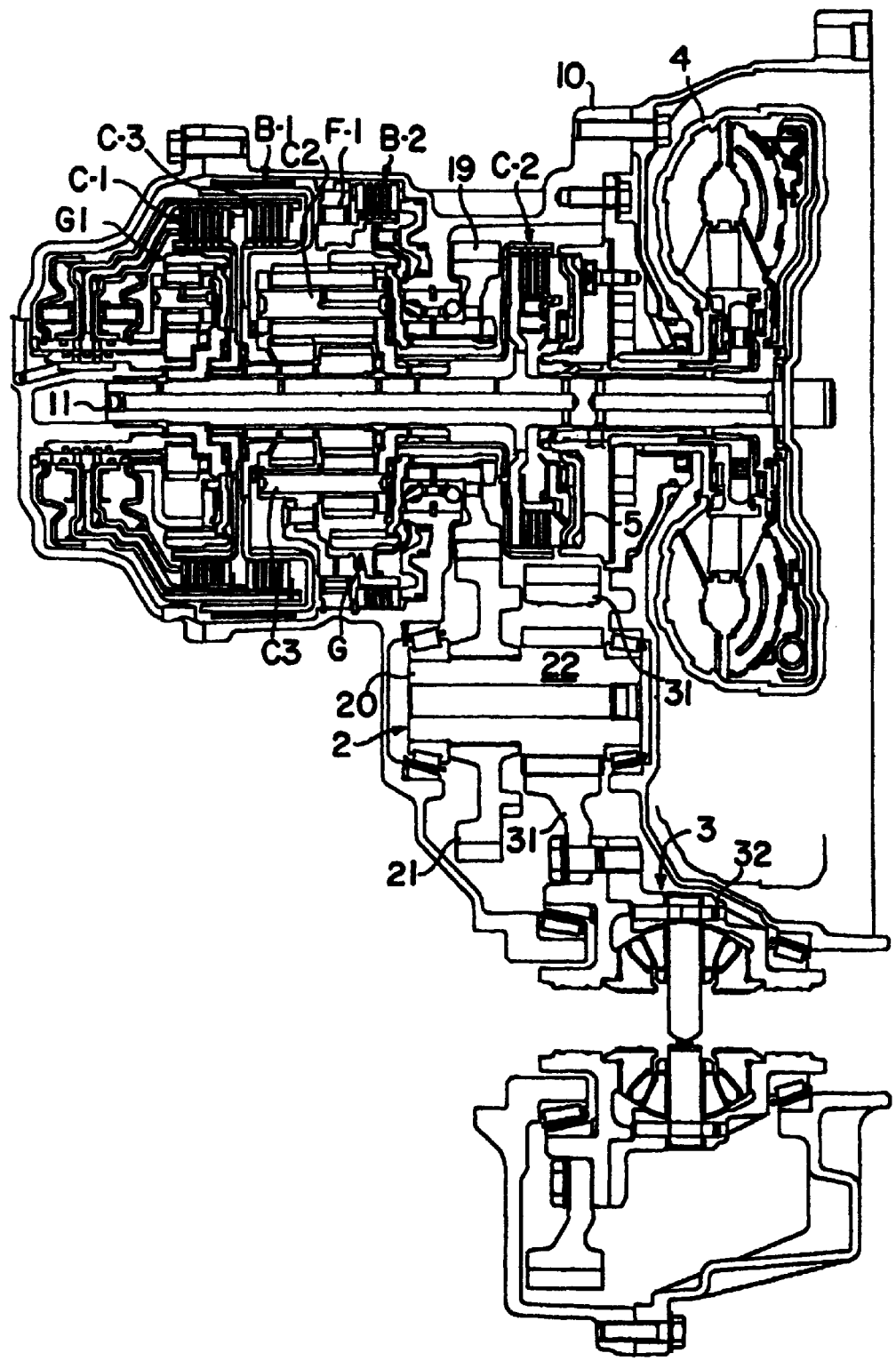
FIG. 19 is an cross sectional diagram illustrating the entire structure of the gear train of the fourth embodiment.
Figure 20:
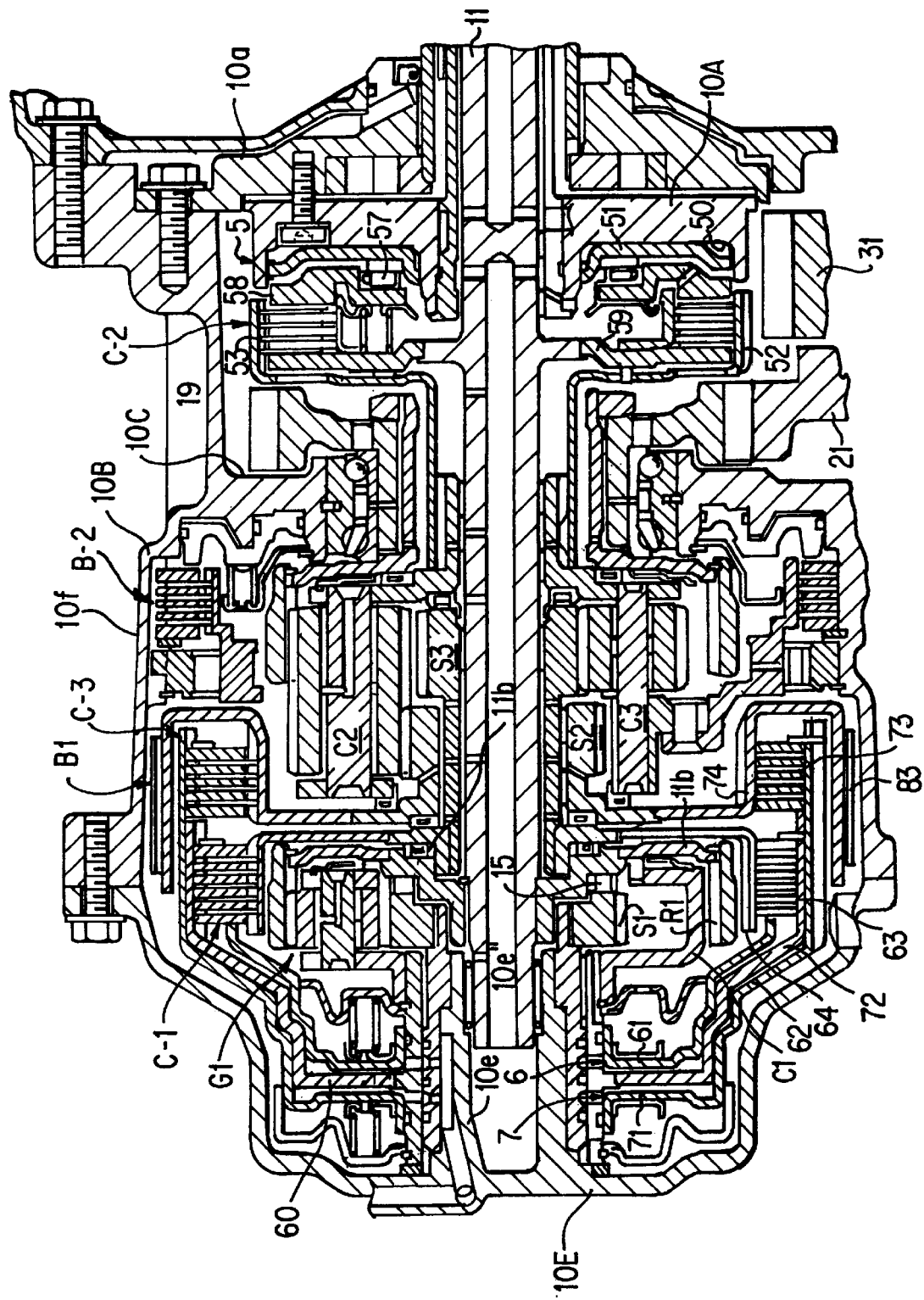
FIG. 20 is a cross sectional diagram illustrating the main shaft portion of the gear train of the fourth embodiment

Next, FIGS. 18 through 20 illustrate a fourth embodiment of the invention. FIG. 18 illustrates the gear train using a schematic diagram in which the axis are deployed in a common plane; FIG. 19 is a cross sectional view, and FIG. 20 is a magnified partial view in the fourth embodiment. The arrangement of the elements of the fourth embodiment is almost the same as the third transformed embodiment, illustrated in FIG. 10, of the first embodiment. Therefore, each common element shown in the schematic diagram of FIG. 18 and the cross sectional views of FIGS. 19 and 20 are identified with the same notations or reference numerals as the third transformed embodiment and the description is omitted. Further, the axis arrangement, the engagement table and the velocity diagram of the fourth embodiment are the same as the first embodiment. Therefore, the description of the functions is omitted.

In the embodiment, the structure of the high torque transmission members is different from the aforementioned embodiments. Further, the structure of the transmission case and the structure of the second clutch C-2 differ from the aforementioned embodiments. The different points of the gear train of the embodiment will be described below.

In the fourth embodiment, the rear end of the transmission case 10 is a cover 10E separated from the case mainframe 10B, and the support wall 10C is integrated with the case mainframe 10B. Therefore, the surrounding wall 10f of the case mainframe 10B has a tapered shape, which increases the diameter in the opposite direction from the prior embodiments, for slotting each element arranged from the rear side of the support wall 10C to the rear side of the case.

The reduction planetary gear G1, which structures the high torque transmission members, is supported on the cover 10E made of aluminum. That is, the sun gear S1 as the reaction element is fixed on a steel metal sleeve, which is engaged on the rear boss portion 10e of the cover 10E, with a spline engagement so that the sun gear S1 is fixed through the sleeve 10e" on the cover 10E. The ring gear R1 as the input element is connected through the flange 11b, which is axially movably engaged with the input shaft 11, to the input shaft 11. The carrier C1 as the output element is connected to a common cylinder 60 of the first and third clutches C-1, C-3.

The frictional member 63 of the fire clutch C-1 is a d in the radial A position of the reduction planetary gear G1. The frictional member 73 of the third clutch C-3 is arranged in the radial outer position of the planetary gear set G. That is, the frictional members 63, 73 are radially overlapped with the reduction planetary gear G1 and the planetary gear set G individually. The frictional members 63, 73 need to have a larger capacity than the clutch C-2 for transmitting the torque amplified by reducing the engine torque and receiving the aforementioned stall torque. Therefore, the structure prevents the axial size of the transmission from being increased by increasing the number of frictional members which is increased in the case where the frictional members are arranged in the axial positions of the reduction planetary gear G1 and the planetary gear set G individually and reduces the diameters.

According to the clutches C-1, C-3 thus arranged, the hydraulic servo 6 and the hydraulic servo 7 of the first clutch C-1 and the third clutch C-3, respectively, are arranged in the axial other side position of the reduction planetary gear G1. The pistons 61, 71 of the hydraulic servos 6, 7 are inserted in the inner side and the outer side of the cylinder of a respective one of the hydraulic servos 6, 7. The pistons 61, 71 are operable individually. The piston 61 is inserted in the inner side of the cylinder 60, the cylinder 60 is integrated with the drum 62, and engages with the outer side of the frictional member 63 structuring the clutch C-1, and the piston 71, which covers the outside of the cylinder 60, of the clutch C-3 is integrated with the drum 72.

In the structure thus aligned, the frictional member 63 of the first clutch C-1 is pinched between the piston 61 and the drum 62 so that the decelerated rotation of the carrier C1 is inputted through the hub 64 to the small sun gear S3. The servo force in this case is returned from the piston 61 through the frictional member 63 to the cylinder 60 and counterbalanced with the reaction pressure applied to the cylinder 60. That is, a close loop is structure The frictional member 73 of the third clutch C-3 is pinched between the piston 71 and the drum 62 so that the decelerated rotation of the carrier C1 is inputted through the hub 74 to the large sun gear S2. The servo force in this case is returned from the piston 71 through the frictional member 73 to the cylinder 60 and counterbalanced with the reaction pressure applied to the cylinder 60. That is, a close loop is structured.

Thus, the frictional members of the both clutches C-1, C-3 are positioned apart from the end of the automatic transmission, and the hydraulic servos 6, 7, which have a relatively large degree of freedom of design, for operating the clutches C-1, C-3 are arranged in the end of the transmission. Therefore, the vehicle mounting performance is improved by having degree off freedom in the shape of the transmission end portion to avoid interface with the vehicle. Further, the first and third clutches C-1, C-3 have a common cylinder, the portions 61, 71 are arranged in the axially inner and outer sides of the cylinder individually, and the pistons are operable individually. Therefore, the clutch to clutch operation between the two clutches C-1, C-3 is possible, and the space for arranging both hydraulic servos is compact. It is noted that the clutch to clutch operation is needed in a two or more step shift.

In this embodiment, the clutch C-2 is positioned in the front end portion of the gear train and there is no blockage between the frictional member and the hydraulic servo. Then, in this embodiment, the hydraulic servo 5 of the clutch C-2 is a stationary cylinder type hydraulic servo in which the cylinder and the piston are built in the transmission case 10. The cylinder 50 is formed as a cylindrical groove on the oil pump cover structuring the front end wall 10A of the transmission case 10, and the cylindrical piston 51 is axially slidably inserted in the cylinder 50. The piston 51 pushes a pressure plate 58 via a thrust bearing 57. The frictional member 53 is pinched between the piston 51 and a flange 59 integrated with the input shaft 11 so that the input rotation from the hub in the flange 59 side is inputted through the drum 52 to the carrier C2, C3.

In the stationary cylinder type hydraulic servo thus structured, the axial unbalanced force, which is counterbalanced in the aforementioned case where the hydraulic servo is integrated with the drum, is not counterbalanced because the closed loop of the servo force is not structured in the servo drum. But, in this embodiment, the sun gear S1, as the reaction element of the reduction planetary gear G1, is fixed on the transmission case 10, the ring gear R1, as the input element, is connected through the flange 11b to the input shaft 11, and a bearing 15 is arranged between the sun gear S1 and the flange 11b. Therefore, the servo force of the stationary cylinder type hydraulic servo 5 is transmitted through the input shaft 11, flange 11b and the bearing 15 to the sun gear S1 and supported by the cover 10E of the transmission case 10.

Figure 21:
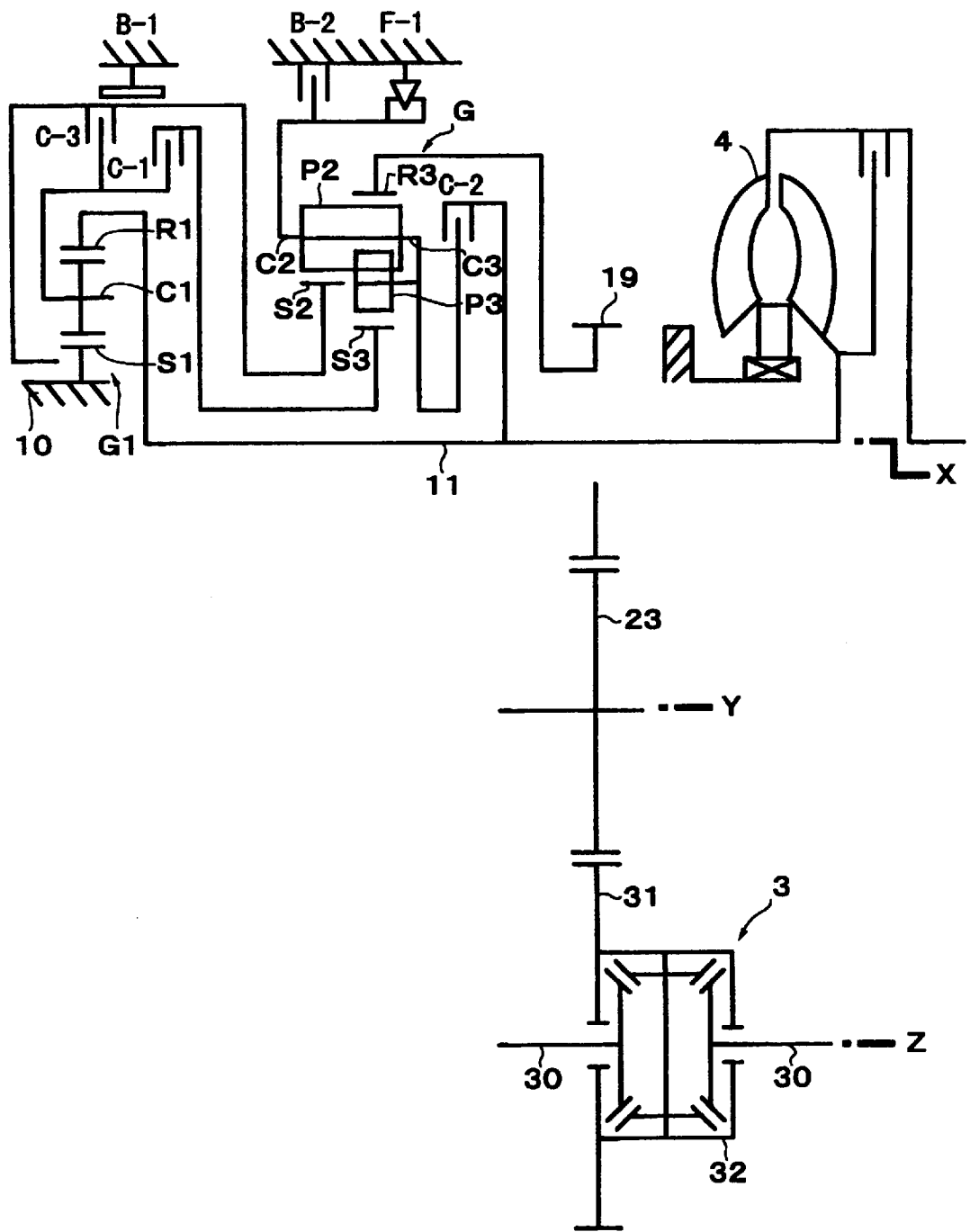
FIG. 21 is an schematic diagram of a gear train of a fifth embodiment.
Figure 22:
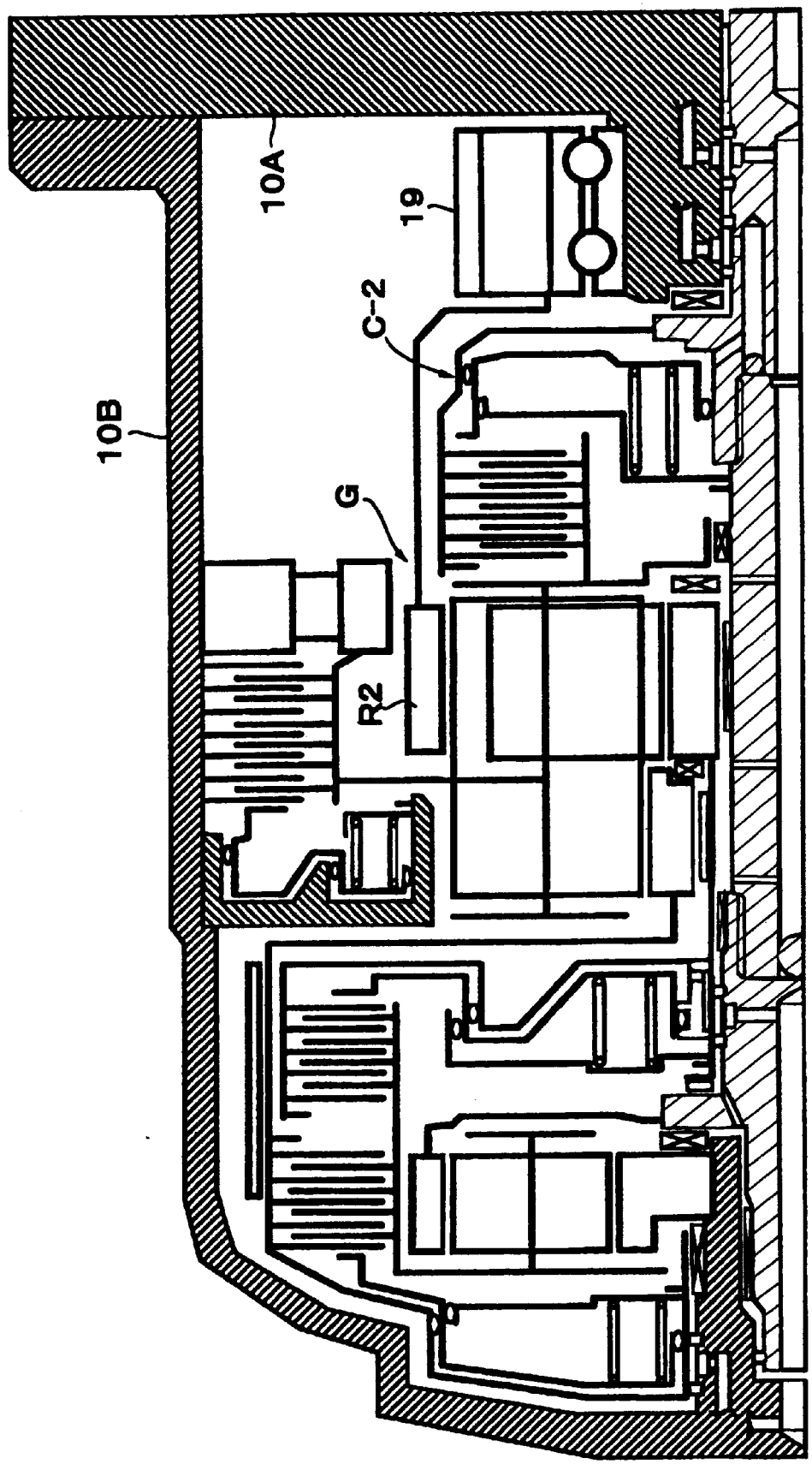
FIG. 22 is an axial cross sectional diagram illustrating a gear train of the fifth embodiment.
Figure 23:
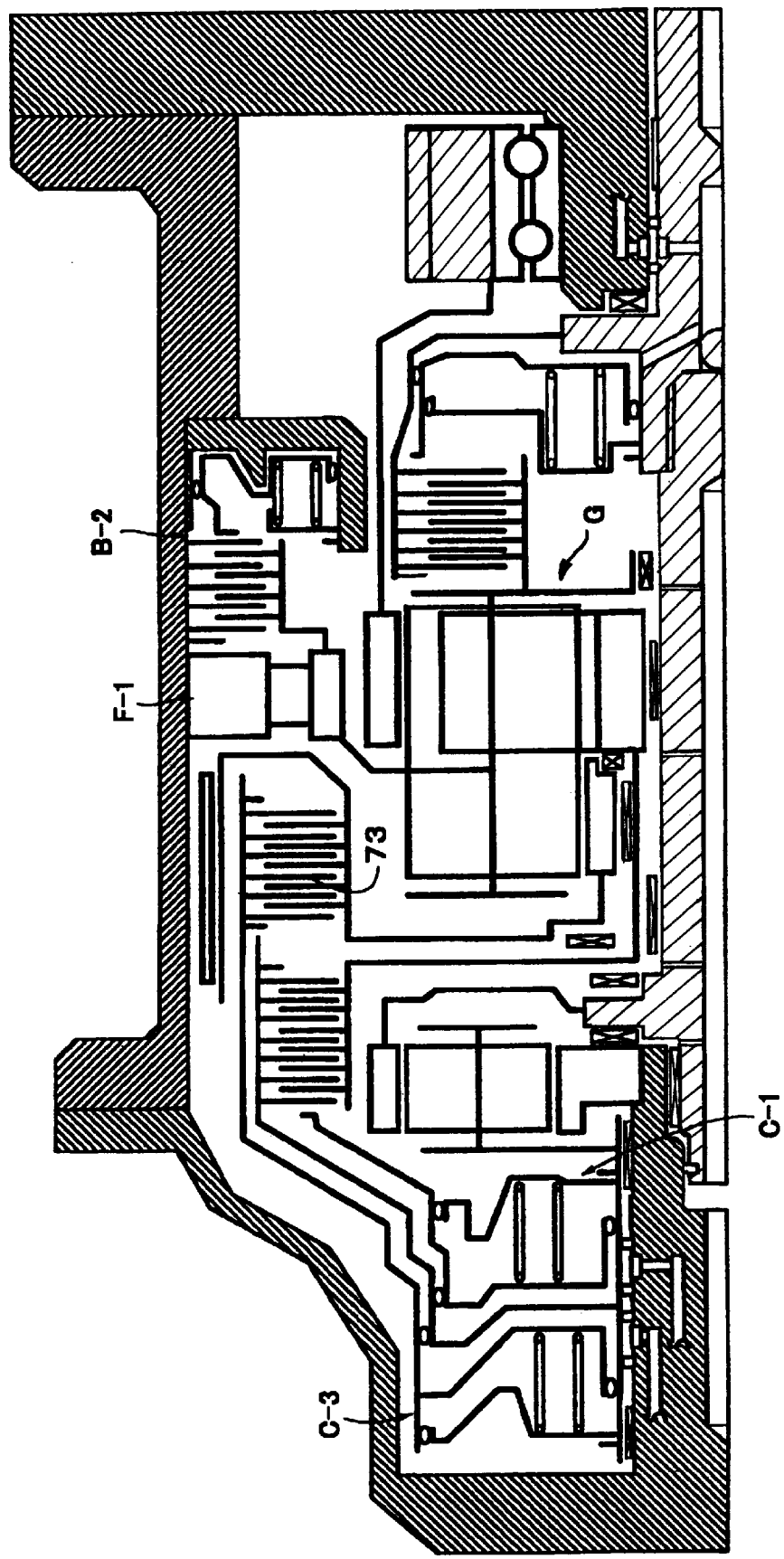
FIG. 23 is an axial cross sectional diagram illustrating the ninth transformed embodiment transformed from the fifth embodiment.

Next, FIGS. 21 through 23 illustrate a fifth embodiment and transformed embodiments of the fifth embodiment. In these embodiments, the high torque transmission member itself, which is the basic characteristic of the invention, is not changed, and the structures are applied to an automatic transmission structured as a transaxle in which the counter shaft is not a reduction shaft.

The gear train is illustrated using a schematic diagram in FIG. 21. In the embodiment, a gear arranged on the counter axis Y is an idler gear 23 for accommodating the rotational direction of the counter drive gear 19 and the rotational direction of the differential ring gear 31. Therefore, the counter drive gear 19, which is the output member on the main axis X, is arranged to be accommodated with the position of the differential ring gear 31 in the mostly front portion of the shift mechanism. The remaining elements in the embodiment are almost the same as the third transformed embodiment of the first embodiment illustrated in FIG. 10. However, according to the reverse of the arrangement of the counter drive gear 19 and the second clutch C-2, as illustrated in FIG. 22, the ring gear R2 of the planetary gear set G and the counter drive gear 19 are connected with a power transmission member shaped drum that covers the second clutch C-2.

The effects of the embodiment are similar to the third transformed embodiment having almost the same arrangement as that embodiment. A particular characteristic of the embodiment is that the counter drive gear 19 is supported by the case front end wall 10A so that it is not necessary to provide the support on the case mainframe 10B. Further, gear noise is effectively reduced by arranging the counter drive gear 19, which produces the gear noise, in the hindmost portion of the transmission, in which it is difficult for noise to occur, compared with the first transformed embodiment, in which the counter gear 19 is supported on the case 10, illustrated in FIG. 8.

Next, FIG. 23, illustrates a gear train using a simplified cross sectional view, is a ninth transformed embodiment in which the high torque transmission member is positioned the same as in the fourth and the fifth embodiments. In this case, the frictional member 73 is arranged in a radially outward position of the planetary gear set G. Therefore, the second brake B-2 and the one-way clutch F-1 are moved to the relatively front side. Further, according to the aforementioned relationship with the diameter of the planetary gear set G, the positions and the directions of the second brake B-2 and the one-way clutch F-1 are reversed to maintain the hydraulic capacity of the second brake B-2.

This embodiment has the effects related to the high torque transmission member in the fourth embodiment and the effects of the fifth embodiment.

In the aforementioned embodiments, the invention is applied to a transaxle. But the invention can be applied to a parallel type transmission for a front engine/rear drive (FR) vehicle. FIGS. 24 through 29 illustrate a sixth embodiment and a transformed embodiment of the sixth embodiment. The shift mechanism in these embodiments is substantially the same as the aforementioned embodiments. However, there are two differences because it is the parallel type transmission. The first difference is that one-way clutch F-1 is arranged in parallel with the first brake B-1 in a similar way to the arrangement of the one-way clutch F-1 in parallel with the second brake B-2 in the aforementioned embodiments, for simplifying the hydraulic control in the shift transition state, especially in the clutch to clutch shift. The second difference is that the ring gear R2 (R3) as the output element is connected to the output shaft coaxially arranged with the input shaft 11.

According to these additional structural elements, the applications of the second brake B-2 and the one-way clutch F-1 are changed from the aforementioned embodiments. Therefore, the gear train will be described to prevent any confusion.

Figure 24:
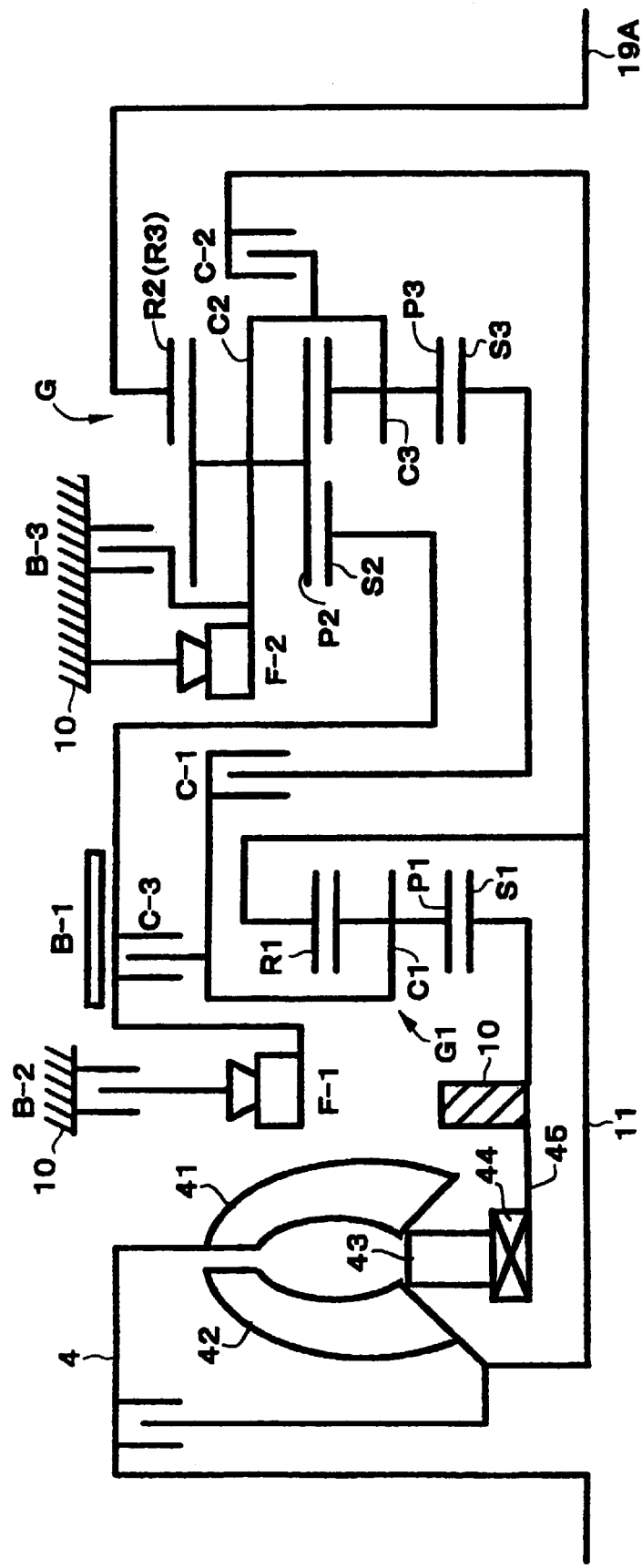
FIG. 24 is an schematic diagram of a gear train of a sixth embodiment.

FIGS. 24 through 27 illustrate the gear train of the sixth embodiment using a schematic diagram. With reference to FIG. 24, in the automatic transmission, a torque converter 4, which is connected to an engine (not shown), having a lock clutch is arranged in the mostly front portion of the mechanism, and a shift mechanism establishing six forward speeds and one reverse speed is arranged at the rear side. The torque converter comprises a pump impeller 41, a turbine runner 42, a stator 43 arranged between them, a one-way clutch 44 rotatably engaging the stator 43 in one direction with the transmission case 10, and a stator shaft 45 fixing the inner race of the one-way clutch on the transmission case 10.

A planetary gear set G mainly structuring the shift mechanism, as with the aforementioned embodiments, is structured from a ravegneaux type gear set which comprises a pair of sun gears S2, S3 having different diameters, a carrier C2 (C3) supporting a pair of pinion gears P2, P3 which are engaged with each other, of which one is engaged with the large sun gear S2 and the ring gear R3 and the other is engaged with the small sun gear S3.

A reduction planetary gear G1, similarly, is structured from a simple planetary gear in which a ring gear R1, as an input element, is connected to the input shaft 11, a carrier C1, as an output element, is connected through a first clutch C-1 to the small sun gear S3 and through a third clutch C-3 to the large sun gear S2, and a sun gear S1 as a stationary element receiving a reaction force is fixed on the transmission case 10.

Figure 26:
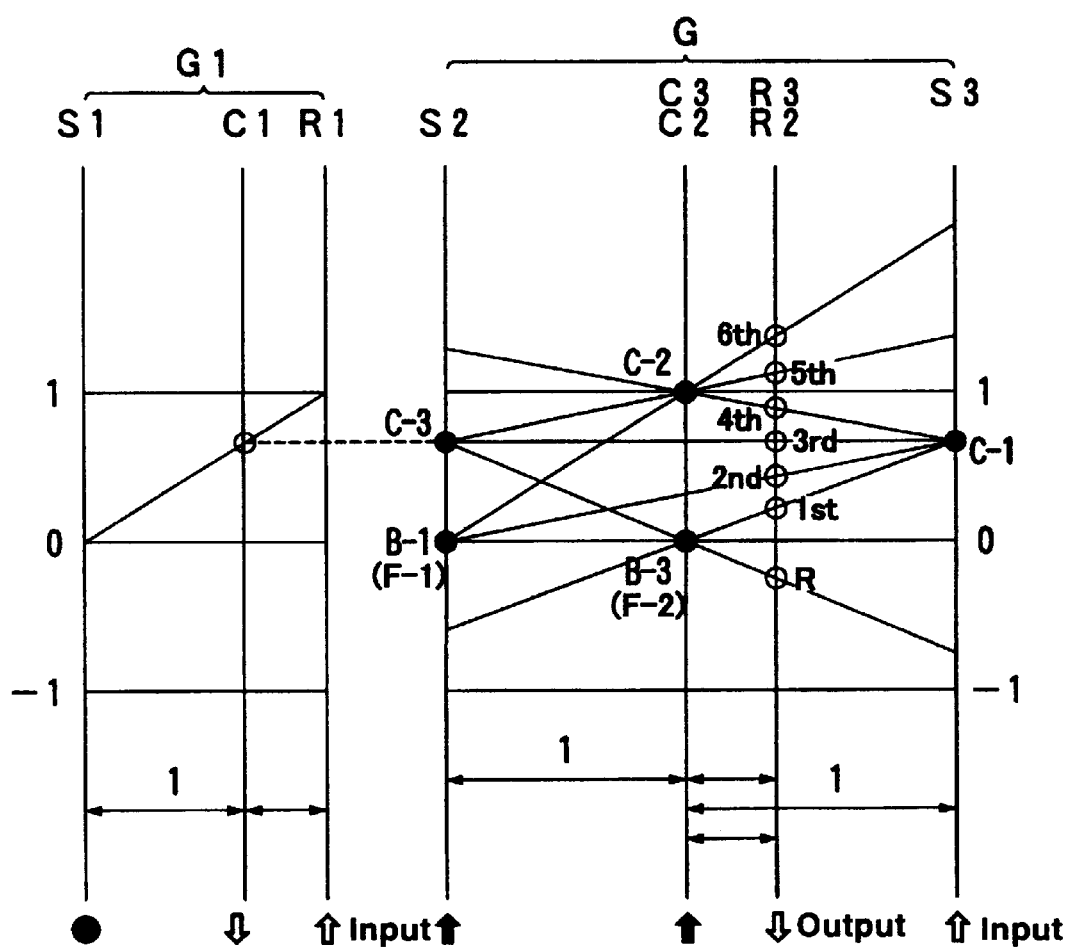
FIG. 26 is a velocity diagram for the gear train of the sixth embodiment.

An engagement table in FIG. 25 shows a relationship between the engagement/disengagement of the each clutch, brake and one way clutch and the established gear stages in the automatic transmission. In the table, a symbol ○ means engagement, a blank means disengagement, a symbol Δ means engagement for achieving engine brake, and a symbol ● means engagement which does not directly affect establishment of the gear stage. Further, FIG. 26 shows a relationship between the gear stages established by engagement of the each clutch and brake and the rotation speed ratio of the each shift element in the gear stage. It should be noted that a symbol ● means engagement in this table.

As shown in both figures, a first speed ($1^{ST}$) is established by engagement of the clutch C-1 and the brake B-3. It should be noted that, in this embodiment, as shown in the operational table, the automatic engagement of the one-way clutch F-2 is used instead of engagement of the brake B-3. A reason for using this engagement and a reason that this engagement is equivalent to engagement of the brake B-3 are the same as the reasons which had been already described with the relationship between the brake B-2 and the one-way clutch F-1 in the aforementioned embodiment. In the first ratio, the decelerated rotation, which is decelerated from the rotation of the input shaft 11 through the reduction planetary gear G1, is inputted to the small sun gear S3 through the clutch C-1, the carrier C3, which is engaged with the transmission case 10 by engagement of the one-way clutch F-2, acts as a reaction element, and the decelerated rotation of the ring gear R3 having the largest reduction ratio is outputted to the output shaft 19A.

Next, a second speed ($2^{ND}$) is established by engagement of the clutch C-1, engagements of the one-way clutch F-1 and the brake B-2, which is engaged for validating the engagement of the one-way clutch F-1, which is the equivalent of engagement of the brake B-1. It should be noted that the reason that the engagements of the one-way clutch F-1 and the brake B-2 are equivalent to the engagement of the brake B-1 will be discussed below. The decelerated rotation, which is decelerated from the rotation of the input shaft 11 through the reduction planetary gear G1, is inputted to the small sun gear S3 through the clutch C-1. The large sun gear S2, which is engaged with the transmission case 10 by the engagement of the brake B-2 and the one-way clutch F-1, acts as a reaction element, and the decelerated rotation of the ring gear R3 is outputted to the output shaft 19A. The reduction ratio in this case is less than the reduction ratio in the first speed ($1^{ST}$) as shown in FIG. 26.

Further, a third speed ($3^{RD}$) is established by concurrent engagement of the clutch C-1 and the clutch C-3. The decelerated rotation, which is decelerated from the rotation of the input shaft 11 through the reduction planetary gear G1, is concurrently inputted to the large sun gear S2 and the small sun gear S3 through the clutch C-1 and the clutch C-3 so that the planetary gear set G is in the directly connected state, the rotation of the ring gear R3, which is same as the input rotation inputted to both sun gears S2, S3, is outputted to the output shaft 19A as the rotation decelerated from the rotation of the input shaft 11.

Further, a fourth speed ($4^{TH}$) is established by the concurrent engagement of the clutch C-1 and the clutch C-2. In this case, the decelerated rotation, which is decelerated from the rotation of the input shaft 11 through the reduction planetary gear G1, is inputted to the small sun gear S3 through the clutch C-1 on one side. The rotation, which is not decelerated and inputted from the input shaft 11 through the clutch C-2, is inputted to the carrier C3 on the other side, and the middle rotation between the two input rotations, which is the rotation of the ring gear R3 little decelerated from the rotation of the input shaft 11, is outputted to the output shaft 19A.

Next, a fifth speed ($5^{TH}$) is established by the concurrent engagement of the clutch C-2 and the clutch C-3. The decelerated rotation, which is decelerated from the rotation of the input shaft 11 through the reduction planetary gear G1, is inputted to the small sun gear S2 through the clutch C-3 on one side. The non-decelerated rotation, which is not decelerated and inputted from the input shaft 11 through the clutch C-2, is inputted to the carrier C2 on the other side, and the rotation, which is little accelerated from the rotation of the input shaft 11, of the ring gear R3 is outputted to the output shaft 19A.

Then, a sixth speed ($6^{TH}$) is established by engagement of the clutch C-2 and the brake B-1. The non-decelerated rotation from the input shaft 11, which is not reduced, is inputted to only the carrier C2 through the clutch C-2. The sun gear S2, which is engaged with the transmission case by engagement of the brake B-1, acts as a reaction element, and the rotation of the ring gear R3, which is further accelerated, is outputted to the output shaft 19A.

A reverse speed (REV) is established by the engagement of the clutch C-3 and the brake B-3. The decelerated rotation, which is decelerated from the rotation of the input shaft 11 through the reduction planetary gear G1, is inputted to the sun gear S2 through the clutch C-3. The carrier C2, which is engaged with the transmission case 10 by the engagement of the brake B-3, acts as a reaction element, and the rotation of the ring gear R3, which is a reverse rotation, is outputted to the output shaft 19A.

The relationship between the one-way clutch F-1 and the brakes B-1, B-2 mentioned above will now be described. The engagement direction of the one-way clutch F-1 connected to the sun gear S2 is set as the same direction in which the sun gear S2 supports the reaction torque in the second speed so that the one-way clutch F-1 performs a substantially equivalent function as the engagement of the brake B-1. The function of the sun gear S2 is different from the function of the carrier C2 (C3). That is, the sun gear S2 is engaged with the case 10 for achieving the engine brake in the second speed and for establishing the sixth speed. Therefore, the brake B-1 is needed. Further, as shown in the velocity diagram in FIG. 26, the sun gear S2 rotates in the reverse direction against the input rotation direction in the first speed, but rotates in same direction with the input rotation direction in the gear stages higher than the third speed. Therefore, the one-way clutch F-1 is not able to directly connect to a stationary member. Therefore, the one-way clutch F-1 and the brake B-2 are arranged in series so that the engagement state of the one-way clutch F-1 is effectively operated As shown with the clearance in the up/down direction between symbols ○ which show the speed ratios of the ring gear R2, R3 on the velocity diagram in FIG. 26, each gear stage thus established has a proper speed step having a relatively equivalent interval between gear stages. This relationship is shown with gear ratios and steps between gear ratios in FIG. 25 by specifically setting values and showing quantitatively. The gear ratio in this case is a value where a teeth number ratio $\lambda 1$ between the sun gear S1 and the ring gear R1 of the reduction planetary gear G1 is equal to 0.556, a teeth number ratio $\lambda 2$ between the sun gear S2 and the ring gear R2 (R3) of the planetary gear set G is equal to 0.458, and a teeth number ratio $\lambda 3$ between the sun gear S3 and the ring gear R3 is equal to 0.375, the width of the gear ratios is equal to 6.049.

Figure 27:
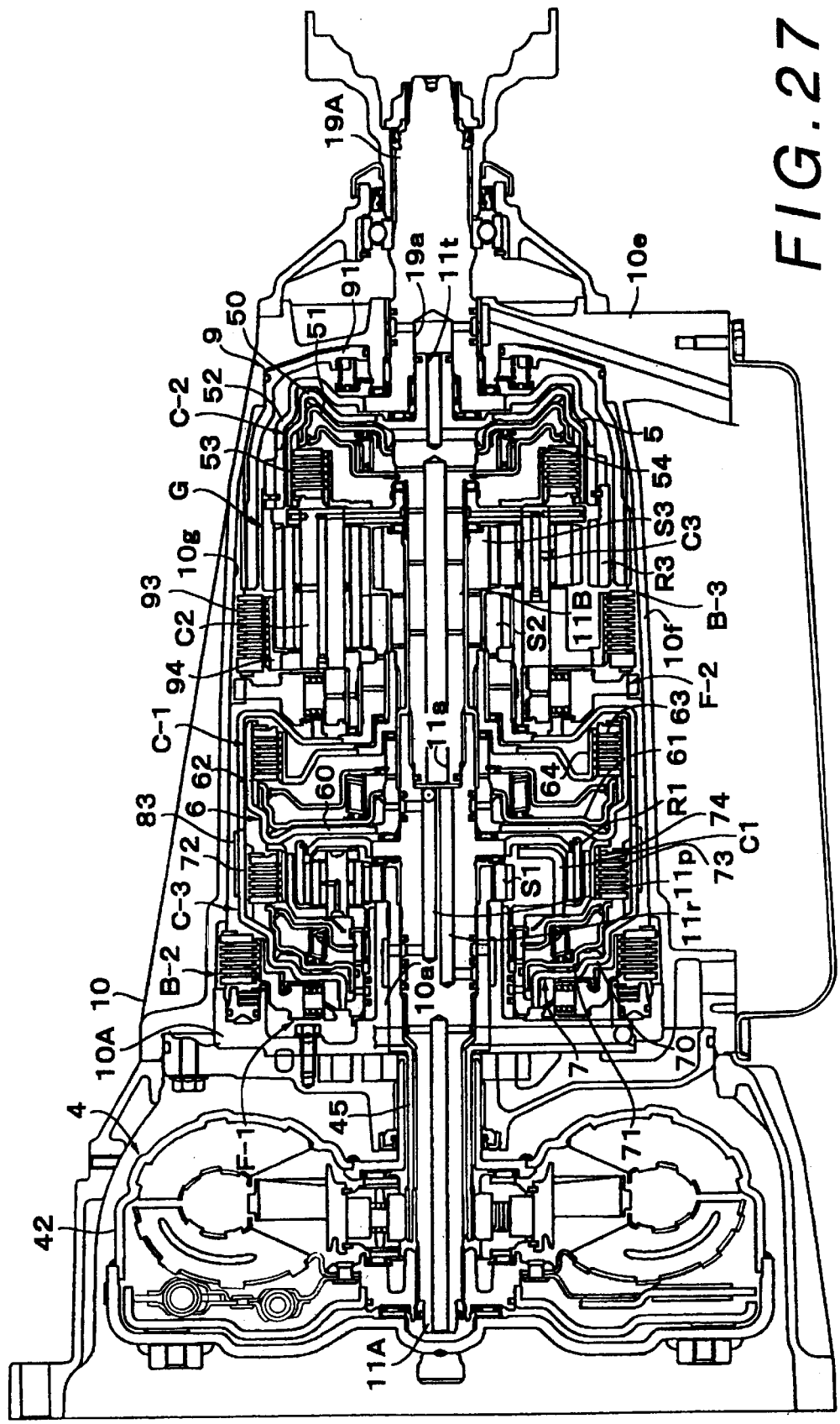
FIG. 27 is an axial cross sectional diagram of the gear train of the sixth diagram.

Next, FIG. 27 illustrates in further detail structures of the automatic transmission using a cross sectional view. Each structural element, which has been described before with reference to the schematic diagram, is identified with the same reference numeral or notation and the description is omitted. Detail portions, which could not be shown in the schematic diagram, will be described. The input shaft 11 is divided into an input shaft front half portion 11A and an input shaft rear half portion 11B to simplify manufacture. The two shafts are integrally connected with each other by closely engaging using a spline engagement. The front end of the front half portion 11A, having a small diameter, of the input shaft 11 is connected to the turbine runner 42 of the torque converter 4 and the large diameter portion of the rear end of the front half portion 11A of the input shaft 11 is rotatably supported through the stator shaft 45 by a front boss portion 10a of a front end wall 10A extended from an oil pump cover of the transmission case 10. The rear end portion of the rear half portion 11B of the input shaft 11 having small diameter is inserted in a trough portion 19a of the output shaft 19A and rotatably supported through the output shaft 19A by a rear end wall portion 10e of the transmission case 10. The input portion to the reduction planetary gear is a flange of the input shaft front half portion 11A, and the flange is connected to the ring gear R1.

A line pressure hydraulic path 11p connected to a hydraulic path formed in the front boss portion 10a and a lubrication oil path 11r are formed in the input shaft front half portion 11A. The axial end portion of the hydraulic path 10p is shut and the hydraulic path 10p is connected to the hydraulic servo of the first clutch by a radial hydraulic path. The axial end portion of the lubrication oil path 11r is opened and connected to a lubrication oil path 11s formed in the input shaft rear half portion 11B. The lubrication oil path 11s in the input shaft rear half portion 11B ends at the portion closed to the rear end portion of the shaft and separated from a line pressure hydraulic path 11t formed in the rear end side of the shaft.

Next, the output shaft 19A is rotatably supported through a roller bearing by a rear end wall portion 10e of the transmission case at the front end portion and through a ball bearing by the hindmost position of the transmission case 10 at the middle portion. A connecting portion to the output element of the planetary gear set G is a flange of the output shaft 19A, and the flange is connected through a member shaped as a drum to the ring gear R3.

A line pressure hydraulic path, which is connected to a hydraulic path formed in the rear portion of the transmission case 10, is structured from the trough portion 19a, and the hydraulic path is connected through the hydraulic path 11t formed in the rear end portion of the input shaft rear half portion 11B inserted in the trough portion 19a to the hydraulic servo 5 of the second clutch C-2.

The planetary gear set G is arranged in the axial middle portion of the input shaft rear half portion 11B. The sun gear S3 is rotatably supported on the input shaft rear half portion 11B, further, the sun gear S2 is rotatably supported on the sun gear S3. The carriers C2, C3 supporting the pinions P2, P3 are integrated. The front end portion of the carriers C2, C3 is rotatably supported on the sun gear S2, and the rear end portion is rotatably supported on the input shaft rear end portion 11B.

The reduction planetary gear G1 is arranged in the axial middle portion of the large diameter portion of the input shaft front half portion 11A. The sun gear S1 is fixed on the rear end of the stator shaft 45, which is inserted into the front boss portion 10a of the transmission case 10, with a spline engagement. The carrier C1 of the reduction planetary gear G1 is supported on the boss portion 10a at one side.

The cylinder 60 of the first clutch C-1 is rotatably supported on the input shaft front half portion 11A and connected through the hub 74 of the third clutch C-3 to the carrier C1 of the reduction planetary gear G1. The frictional member 63 of the clutch C-1 is structured from multiple frictional elements and separator plates. The separator plates are engaged and supported on the inner surface of the drum 62, and the frictional elements are engaged and supported on the outer surface of the hub 64. That is, the frictional member 63 is arranged between the drum 62 and the hub 64. The inner side of the hub 64 is connected to the sun gear S3. The hydraulic servo 6 of the clutch C-1 is formed from the cylinder 60, which is the inner side surface of the drum 62, a piston 61 axially slidable is inserted into the cylinder 60, a cancel plate is fixed in the drum 62, and a return spring is arranged between the piston 61 and the cancel plate.

The drum 72 of the third clutch C-3 is connected to the inner race of the one-way clutch F-1. The front end portion of the drum 72 is rotatably supported on the front boss portion 10a of the transmission case 10, and the rear end portion is connected to the sun gear S2. The frictional member 73 of the clutch C-3 is structured from multiple frictional elements and separator plates. The separator plates are engaged and supported on the inner surface of the drum 72, and the frictional elements are engaged and supported on the outer surface of the hub 74. That is, the frictional member 73 is arranged between the drum 72 and the hub 74. The rear end of the hub 74 is fixed to the drum 62 of the first clutch C-1. The hydraulic servo 7 of the clutch C-3 is structured from the cylinder 70 integrated with the drum 72, a piston 71 axially slidable is inserted into the cylinder 70, a cancel plate is axially fixed on the inner side of the cylinder 70, and a return spring is arranged between the piston 71 and the cancel plate.

The drum 52 of the second clutch C-2 is fixed to and supported on the flange of the input shaft rear half portion 11B at one side. The frictional member 53 of the clutch C-2 is structured from multiple frictional elements and separator plates. The separator plates are engaged and supported on the inner surface of the drum 52, and the frictional elements are engaged and supported on the outer surface of the hub 54. That is, the frictional member 53 is arranged between the drum 52 and the hub 54. The front end of the hub 54 is fixed and supported to the carrier C3 of the planetary gear set G at one side. The hydraulic servo 5 of the clutch C-2 is structured from the cylinder 50 having the outer surface of the input shaft 11 as a portion of the cylinder 50 and integrated with the drum 52, a piston 51 axially slidable is inserted in the cylinder 50, a cancel plate is axially fixed on the input shaft rear half portion 11B, and a return spring is arranged between the piston 51 and the cancel plate.

The first brake B-1 is a band brake having a band 83 engaged with the outer surface of the drum 72 of the third clutch C-3. A hydraulic servo of the brake B-1 is omitted in the figure.

The third brake B-3 is a multi-disc brake having a frictional member 93 structured from multiple frictional elements and separator plates. The separator plates are engaged and supported on the inner surface of the transmission case 10, and the frictional elements are engaged and supported on a hub 94 fixed to the carrier C2. A hydraulic servo 9 of the brake B-3 is structured from a cylinder formed in the rear end wall portion 10e of the transmission case mainframe 10B, a piston 91 is slidably inserted into the cylinder, and a return spring is axially fixed to the rear end wall portion of the transmission case and accessing the piston 91. The extending portion, which extends toward the frictional member 93 along with the surrounding wall 10f of the case, of the piston 91 is engaged with a spline 10g of the case surrounding wall 10f.

The frictional member 93 of the brake B-3 is arranged in a radially outer position to the large sun gear S2 of the planetary gear set G.

The inner race of the one-way clutch F-1 is fixed to the cylinder 70 of the third clutch C-3, the outer race is integrated with the hub of the brake B-2. The one-way clutch F-1 is arranged in the front position of the third clutch C-3, that is, in the mostly front portion of the shift mechanism. The brake B-2, which engages the outer race with the transmission case 10, is a multi-disc brake having a frictional member structured from multiple frictional elements and separator plates. The frictional elements are engaged and supported on the outer race, and the separator plates are engaged and supported with the inner spline of the transmission case 10. A hydraulic servo of the brake B-2 is structured from a cylinder formed in the front end wall 10A of the transmission case 10, a piston is slidably inserted into the cylinder, and a return spring is axially fixed to the front end wall of the transmission case 10 and accessing the piston.

The inner race of the one-way clutch F-2 is connected to the front end portion of the carrier C2 with a spline, and the outer race is engaged with a spline 10g of the inner surface of the transmission case 10. The one-way clutch F-2 is arranged between the frictional member 63 of the first clutch C-1 and the planetary gear set G.

In the sixth embodiment, the clutch C-2, which directly transmits the rotation of the input shaft 11 to the carrier C2 (C3), is not engaged in the forward first through third speeds and the reverse speed as mentioned before. Therefore, the clutch C-2 does not receive a stall torque, which is amplified from the engine torque transmitted from the torque converter 4, in a vehicle stop state. Further, in comparison with the other clutches C-1, C-3 in the velocity diagram of FIG. 26, the clutch C-2 does not receive the amplification torque amplified by the deceleration. Therefore, the clutch C-2 can be structured to have a smaller torque capacity compared with the other clutches. It should be noted that the torque capacity is set by the diameter of the clutch and a number of elements of the frictional member. Therefore, the diameter of the rear portion of the automatic transmission can be reduced by reducing the diameter of the clutch, and the space in a vehicle is reduced.

The trough portion 19a surfaced to the end portion of the input shaft 11 is formed on the output shaft 19A and the output shaft 19A is supported at the rear portion of the automatic transmission. The end portion, which surfaces at the front end portion of the output shaft 19A, of the input shaft 11 is inserted and supported in the trough portion 19a of the output shaft. The hydraulic pressure hydraulic path to the hydraulic servo 5 of the second clutch C-2 is formed from the output shaft 19A through the rear end portion of the input shaft 11. The lubrication oil path 11s for lubricating the inside of the automatic transmission is formed in the front side of the rear end portion in which the hydraulic path 11t is formed. Therefore, the diameter of the rear end portion of the input shaft 11 inserted in the trough portion 19a of the output shaft 19A is reduced compared with the case in which the hydraulic path and the lubrication oil path are arranged in parallel in the rear end portion of the input shaft. That is, the diameter of the rear portion, which is inserted in the trough portion 19a of the output shaft 19A for supporting the rear end portion of the input shaft 11, of the input shaft is reduced. As a result, in this structure, the diameter of the rear portion of the automatic transmission is reduced by reducing the diameter of the shaft, and the space in a vehicle is further reduced.

Further, in the planetary gear set G, the carriers C2, C3 are integrally structured. The one axial end of the carriers C2, C3 is connected through the sun gear S2 to the input shaft, and the other end is directly connected to the input shaft 11. The carriers C2, C3 are supported by the input shaft 11 at both sides. The planetary gear set G, which has many shift elements and a heavy weight, is supported by the same member, which is the input shaft 11, at both sides. Therefore, the concentricity of the supports is improved, and the planetary gear set G is arranged with good accuracy.

Next, the frictional member 93 of the brake B-3 is arranged in the radial position, in which the ring gear R3 is not arranged, of the planetary gear set G. That is, the radial position, which was a dead space in a conventional transmission, of the planetary gear set G is effectively used for arranging the frictional member 93 of the brake B-3. Therefore, the transmission is axially and radially shortened.

Further, the frictional member 93 of the brake B-3 is a multi-disc frictional member, and the hydraulic servo 9 for brake B-3 is arranged in the hindmost position of the transmission. Therefore, the rear end wall portion of the transmission case 10 is used as the hydraulic servo cylinder, and the transmission case does not need to have a thrust portion which is needed for arranging the hydraulic servo of the band brake. As a result, when a band brake is used, the space in the vehicle is not reduced. In case the brake is a band brake, the carrier engaged by the band brake receives a force in a certain direction, and this force causes adverse effect on the centering and the support of the planetary gear set and the centering and the support of the input shaft supporting the planetary gear set. Therefore, a bush or a bearing for supporting the input shaft or the planetary gear set or the input shaft itself must be large. However, in this embodiment, the brake B-3 is the multi-disc brake so that a compact automatic transmission results.

The third clutch C-3 is arranged in the front position of the reduction planetary gear G1. The cylinder 70 structuring the hydraulic servo 7 of the clutch is supported on the front boss portion 10a extending from the transmission front end wall 10A. The hydraulic path to the hydraulic servo 7 is formed in the front boss portion 10a. The sun gear S1 of the reduction planetary gear G1 is fixed to the front boss portion 10a, the ring gear R1 is connected to the input shaft 11 at the rear side, and the output from the carrier C1 is transmitted to the front side of the reduction planetary gear G1. Therefore, a support member for fixing the sun gear S1 is not needed because of the use of the front boss portion 10a, which is used for supporting the clutch drum 72 and applying the hydraulic pressure, as the member for fixing the sun gear S1. As a result, the compact transmission results.

Further, the stator shaft 45 is extended in the inner side of the front boss portion 10a, and the sun gear S1 of the reduction planetary gear G1 is fixed to the other end of the stator shaft. Therefore, the sun gear S1 is downsized. Thus, the entire reduction planetary gear is downsized. Further, by the downsizing, the reduction planetary gear G1 can be arranged in the inner position of the frictional member 73 of the third clutch C-3 and the axial size of the transmission is reduced.

The reduction planetary gear G1 is arranged between the hydraulic servos 6, 7 of the first and third clutches C1, C3. The cylinder 70 structuring one of the hydraulic servos is rotatably supported on the front boss portion. The cylinder 60 structuring the other hydraulic servo is rotatably supported on the input shaft 11. Therefore, compared with a case in which the hydraulic servo is supported on the front boss portion 10a of the transmission case 10, the pressure receiving area of the piston 61 can be increased because the diameter of the support portion is small. As a result, it is easy to obtain the necessary torque capacity.

Figure 28:
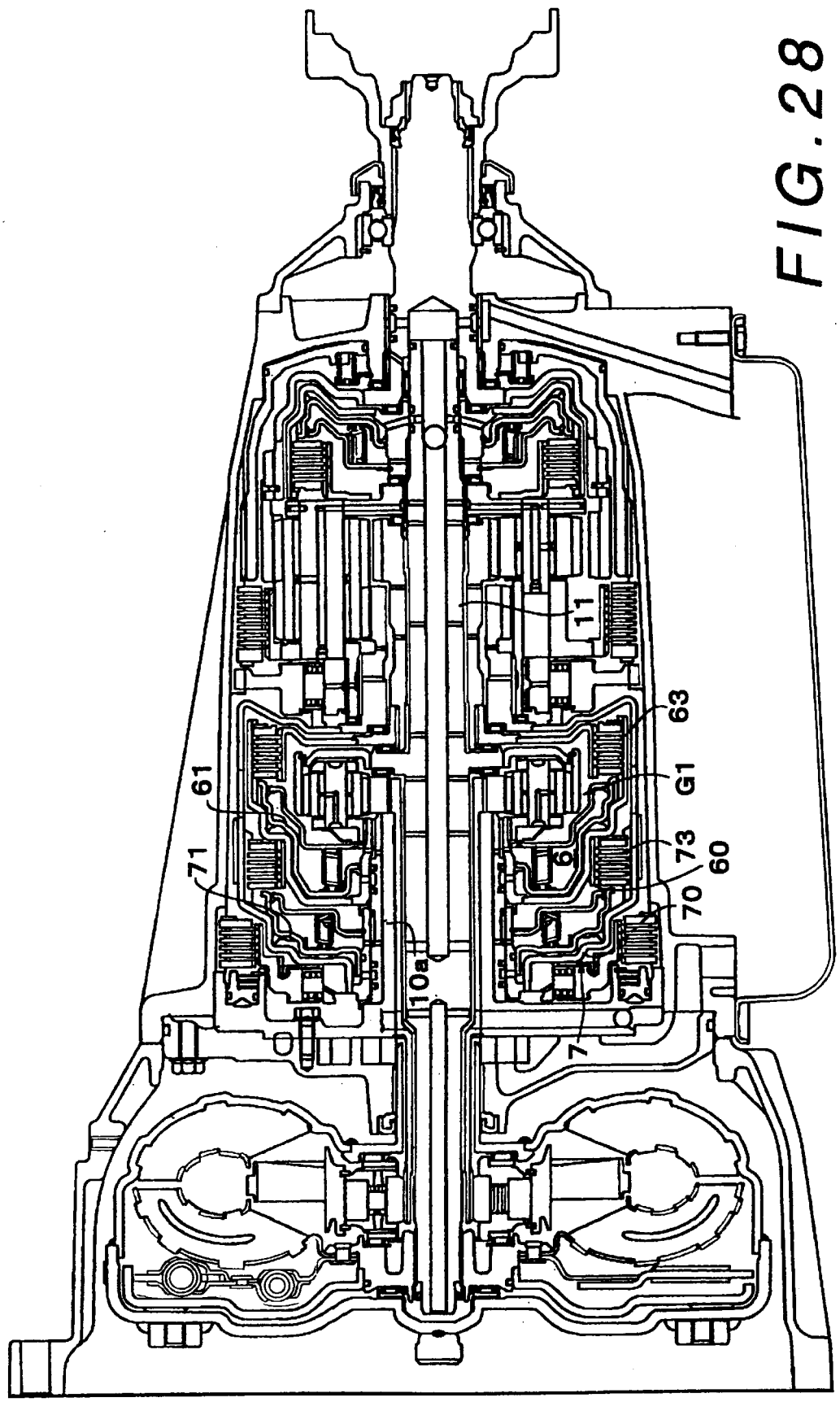
FIG. 28 is an axial cross sectional diagram of the tenth transformed embodiment transformed from the sixth embodiment.

In the sixth embodiment, the input shaft 11 is divided, but the input shaft is integrally structured for achieving the desired mechanical effects. FIG. 28 illustrates a cross sectional view of a tenth transformed embodiment. The only different points from the sixth embodiment will be described. In this embodiment, the axial positional relationship between the hydraulic servo 6 of the first clutch C-1 and the reduction planetary gear G1 is reversed from that of the sixth embodiment. According to that, the hydraulic servo 6 can be arranged on the front boss portion 10a of the transmission case the same as the hydraulic servo 7 of the third clutch C-3. Therefore, the hydraulic pressure is directly applied from the hydraulic path formed in the front boss portion 10a to the servo 6 without passing through the input shaft 11. Further, the front boss portion 10a of the transmission case is extended so that the clearance between the front and rear support portions for supporting the input shaft 11 is shortened.

Further, in the tenth embodiment, the reduction planetary gear G1 is arranged in the radial inner position of the frictional member 63 of the first clutch C-1. The hydraulic servo 6 of the first clutch C-1 is arranged in the front side of the reduction planetary gear G1. The frictional member 73 of the third clutch is arranged in the radial outer position of the hydraulic servo 6. The hydraulic servo 7 of one clutch is arranged in the front position of the hydraulic servo 6 of the other clutch. Therefore, the compact structure is achieved by the arrangement of the reduction planetary gear G1, the frictional members 63, 73 and the hydraulic servos 6, 7 of both clutches. Further, the pistons 61, 71 have to have a plurality of bent portions because of the positions of the hydraulic servos 6, 7 and the frictional member 63, 73 are offset. As a result, the rigidity of the pistons is improved.

The reduction planetary gear G1 is arranged in the rear position of the hydraulic servos 6, 7 of the first and third clutches C-1, C-3 respectfully. The two cylinders 60, 70, structuring the both hydraulic servos, are rotatably supported on the front boss portion 10a. The hydraulic paths for applying the hydraulic pressures to the hydraulic servos 6, 7 can be structured without passing through the input shaft 11. Therefore, it is easy to form the hydraulic paths. Further, the input shaft is a single shaft so that a high rigidity of the shaft is achieved. Further, the front boss portion 10a of the transmission case is extended to a further inner position of the automatic transmission so that the clearance between the support portions of the transmission case for supporting input shaft 11 and the outer shaft 19A is shortened Further, the planetary gear set G is supported on the shaft supported by the support portions of which clearance is thus shortened so that the planetary gear set G is solidly supported.

In the tenth transformed embodiment, in regard to a number of seal rings arranged between hydraulic paths, which are formed in members relatively rotated, for preventing the leakage of oil in the hydraulic paths for applying the hydraulic pressure to the hydraulic servo of the clutches and the hydraulic path for applying the lubrication oil to whole portion of the transmission, as shown in FIG. 28, two pairs of seal rings and one seal ring are arranged in an hydraulic path for applying the hydraulic pressure from the rear end portion of the transmission case 10 to the hydraulic servo of the second clutch C-2. A pair of seal rings is individually arranged in the hydraulic paths for applying the hydraulic pressures from the hydraulic path formed in the front boss portion 10a of the transmission case 10 to the hydraulic servos of the first and third clutches C-1,C-3, and a pair of seal rings, not shown, is arranged in the hydraulic path for applying the hydraulic pressure from the hydraulic path formed in the front boss portion 10a of the transmission case 10 to the lubrication oil path formed in the input shaft 11. Therefore, a total of five pair of seal rings and one seal ring are arranged in the transmission. Further, in regard to a number of hydraulic paths formed in the shaft, one hydraulic path is formed in the shaft. Thus, in this embodiment, the number of seal rings and the number of hydraulic paths in the shaft are reduced so that a loss in power transmission is reduced and the diameter of the transmission is reduced.

Figure 29:
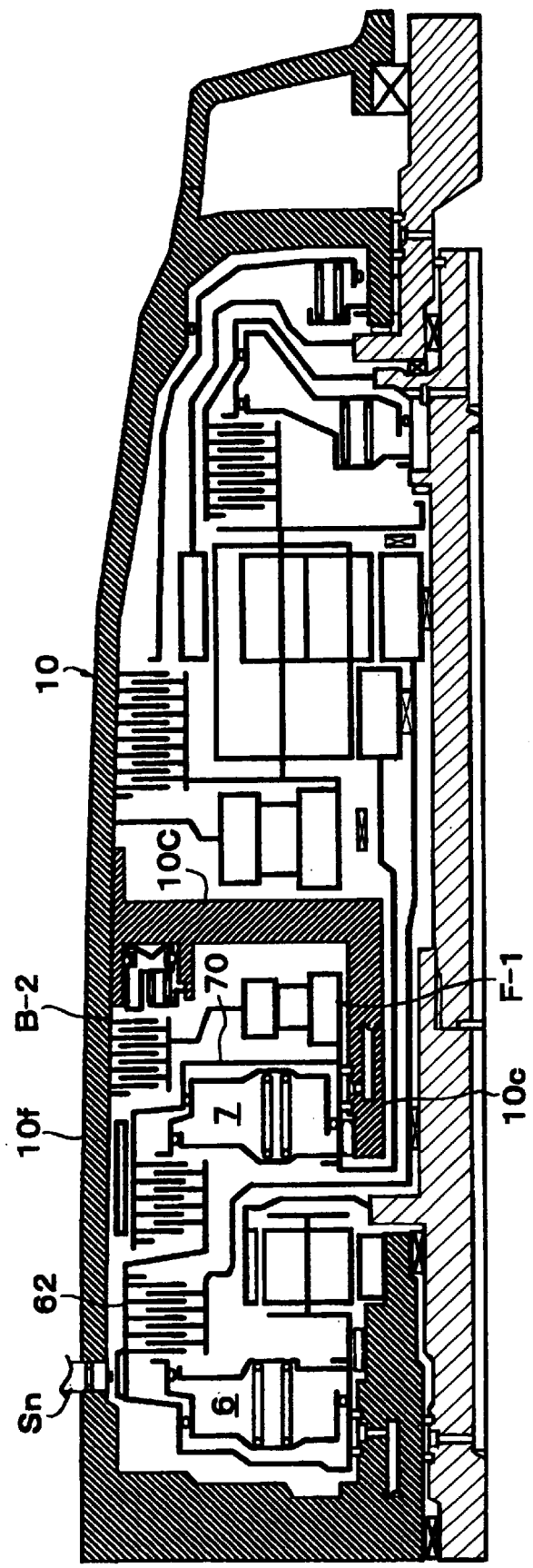
FIG. 29 is an axial cross sectional diagram of the eleventh transformed embodiment transformed from the sixth embodiment.

Finally, FIG. 29 illustrates an eleventh transformed embodiment which is mainly different from the sixth embodiment in that a support wall 10C is provided. In this embodiment, according to the arrangement of the support wall 10C, the one-way clutch F-1 and the frictional member of the second brake B-2 are moved and arranged in a position close to the support wall 10C for building the hydraulic servo of the second brake B-2 in the support wall 10C. The cylinder 70 of the hydraulic servo 7 of the third clutch C-3 is supported on a boss portion 10c extended from the support wall 10C toward the front side so that the hydraulic pressure is applied to the hydraulic servo 7 without going through the input shaft 11.

An effect of the eleventh transformed embodiment is that the drum 62, which always rotates with the decelerated rotation transmitted through the reduction planetary gear G1 irrespective of the engagement/disengagement of the clutch, of the first clutch C-1 can be positioned close to the surrounding wall 10f of the transmission case 10. Therefore, a sensor Sn, for detecting an input rotation speed needed for a transmission control, can be arranged in the surrounding wall 10f of the transmission case without having to position the sensor in a deep position of the mechanism.

The invention should not be limited to the foregoing embodiments but can be modified in various manners. Modifications are not to be excluded from the scope of the invention.

What is claimed is:

1. An automatic transmission, comprising:
    a planetary gear set inputted a decelerated rotation and a non-decelerated rotation and outputting plural shift rotation;
    a reduction planetary gear arranged at an axial one side of the planetary gear set;
    an input shaft extended through the inner side of the planetary gear set;
    first and third clutches which are able to engage/disengage for connecting the input shaft through the reduction planetary gear to two different decelerated rotation input elements of the planetary gear set individually; and
    a second clutch which is able to engage/disengage for connecting the input shaft to a non-decelerated rotation input element of the planetary gear set, wherein the first clutch, the third clutch and the reduction planetary gear are arranged together, and the second clutch is arranged at the other side of the planetary gear set.

2. The automatic transmission according to claim 1, wherein each clutch comprises a frictional element and a hydraulic servo individually, the reduction planetary gear is arranged so that one element of the reduction planetary gear is fixed on an end of a boss portion axially extended from a wall of a transmission case, the hydraulic servo of the third clutch is arranged on the boss portion and between the wall and the reduction planetary gear, and the hydraulic servo of the first clutch is arranged in the outer space of the input shaft and in the opposite side to the hydraulic servo of the third clutch against the reduction planetary gear.

3. The automatic transmission according to claim 2, wherein the first clutch comprises a drum which is integrated with the hydraulic servo, the drum is connected to the output element of the reduction planetary gear and arranged so that the cylinder of the hydraulic servo opens to the opposite side against the reduction planetary gear side.

4. The automatic transmission according to claim 2, wherein the frictional element of the third clutch and the frictional engagement of the first clutch are arranged in a radial outer side of one of the hydraulic servo of the first clutch, the hydraulic servo of the third clutch and the reduction planetary gear.

5. The automatic transmission according to claim 4, wherein the frictional element of the third clutch is arranged in the radial outer side of the reduction planetary gear, and the frictional element of the first clutch is arranged in the radial outer side of the hydraulic servo of the first clutch.

6. The automatic transmission according to claim 2, wherein the first clutch comprises a drum which is integrated with the hydraulic servo, the drum is connected to the decelerated rotation input element of the planetary gear set and arranged so that the cylinder of the hydraulic servo opens to the reduction planetary gear side, and the outer surface of the frictional element of the first clutch is engaged with the drum of the first clutch and the inner surface of the frictional element of the first clutch is connected to the output element of the reduction planetary gear.

7. The automatic transmission according to claim 6, wherein the third clutch comprises a drum which is integrated with the hydraulic servo, the drum is connected to the decelerated rotation input element of the planetary gear set and arranged so that the cylinder of the hydraulic servo opens to the reduction planetary gear side, and the outer surface of the frictional element of the third clutch is engaged with the drum of the third clutch and the inner surface of the frictional element of the third clutch is connected to the output element of the reduction planetary gear through a common hub with the frictional element of the first clutch.

8. The automatic transmission according to claim 7, wherein a brake is arranged for engaging the decelerated rotation input element of the planetary gear set with the transmission case, and the brake is structured from a band brake which has an engagement surface of the brake band on the outer surface of the drum of the third clutch.

9. The automatic transmission according to claim 1, wherein each clutch comprises a frictional element and a hydraulic servo individually, the reduction planetary gear is arranged so that one element of the reduction planetary gear is fixed on an end of a boss portion axially extended from a wall of a transmission case, the hydraulic servo of the first clutch is arranged on the boss portion, between the wall and the reduction planetary gear, and in a reduction planetary gear side, and the hydraulic servo of the third clutch is arranged on the boss portion, between the wall and the reduction planetary gear, and in a wall side.

10. The automatic transmission according to claim 9, wherein the reduction planetary gear is axially aligned with the planetary gear set, the frictional element of the first clutch is arranged in the radial outer side of the reduction planetary gear, and the frictional element of the third clutch is arranged in the radial outer side of the planetary gear set.

11. The automatic transmission according to claim 9, wherein the frictional element of the third clutch and the frictional engagement of the first clutch are arranged in the radial outer side of one of the hydraulic servo of the first clutch, the hydraulic servo of the third clutch and the reduction planetary gear.

12. The automatic transmission according to claim 11, wherein the frictional element of the first clutch is arranged in the radial outer side of the reduction planetary gear, and the frictional element of the third clutch is arranged in the radial outer side of the hydraulic servo of the first clutch.

13. The automatic transmission according to claim 9, wherein the first clutch comprises a drum which is integrated with the hydraulic servo, the drum is connected to the output element of the reduction planetary gear and arranged so that the cylinder of the hydraulic servo opens to the reduction planetary gear side, and the outer surface of the frictional element of the first clutch is engaged with the drum of the first clutch and the inner surface of the frictional element of the first clutch is connected to the decelerated rotation input element of the planetary gear set.

14. The automatic transmission according to claim 13, wherein the third clutch comprises a drum which is integrated with the hydraulic servo, the drum is connected to the decelerated rotation input element of the planetary gear set and arranged so that the cylinder of the hydraulic servo opens to the side of the hydraulic servo of the first clutch, and the outer surface of the frictional element of the third clutch is engaged with the drum of the third clutch and the inner surface of the frictional element of the third clutch is connected to the drum of the first clutch.

15. The automatic transmission according to claim 14, wherein a brake is arranged for engaging the decelerated rotation input element of the planetary gear set with the transmission case, and the brake is structured from a band brake which has an engagement surface of the brake band on the outer surface of the drum of the third clutch.

16. The automatic transmission according to claim 13, wherein the cylinder of the hydraulic servo of the third clutch is formed on the back surface of the cylinder of the hydraulic servo which is integrated with the drum of the first clutch, and the piston of the hydraulic servo of the third clutch is engaged with the drum of the first clutch to prevent rotation and inserted in the cylinder formed on the back surface.

17. The automatic transmission according to claim 16, wherein the outer surface of the frictional element of the third clutch is engaged with the drum which is the piston of the hydraulic servo of the third clutch, the inner surface of the frictional element of the third clutch is connected to the decelerated rotation input element of the planetary gear set, and the frictional element of the third clutch is able to engage/disengage by pushing/pulling against the drum of the first clutch.

18. The automatic transmission according to claim 1, wherein each clutch comprises a frictional element and a hydraulic servo individually, the reduction planetary gear is arranged so that one element of the reduction planetary gear is fixed on an end of a boss portion axially extended from a wall of a transmission case, the hydraulic servo of the first clutch is arranged on the boss portion and between the wall and the reduction planetary gear, an another wall is arranged so that the hydraulic servo of the third clutch is arranged between the another wall and the reduction planetary gear, and the first clutch and the third clutch are connected to the planetary gear set between the boss portion and the another wall.

19. The automatic transmission according to claim 18, wherein the frictional element of the third clutch and the frictional element of the first clutch are arranged in the radial outer side of one of the hydraulic servo of the first clutch, the hydraulic servo of the third clutch and the reduction planetary gear.

20. The automatic transmission according to claim 18, wherein the first clutch comprises a drum which is integrated with the hydraulic servo, the drum is connected to the output element of the reduction planetary gear and arranged so that the cylinder of the hydraulic servo opens to the reduction planetary gear side, and the outer surface of the frictional element of the first clutch is engaged with the drum of the first clutch and the inner surface of the frictional element of the first clutch is connected to the decelerated rotation input element of the planetary gear set.

21. The automatic transmission according to claim 20, wherein the drum of the third clutch is connected to the decelerated rotation input element of the planetary gear set and arranged so that the cylinder of the hydraulic servo, which is integrated with the drum of the third clutch, opens to the reduction planetary gear side, and the outer surface of the frictional element of the third clutch is engaged with the drum of the third clutch and the inner surface of the frictional element of the third clutch is connected to the drum integrated with the hydraulic servo of the first clutch.

22. The automatic transmission according to claim 21, wherein the drum of the third clutch is rotatably supported, through the hydraulic servo which is integrated with the drum of the third clutch, by a boss portion extended from the another wall, and a brake structured from a band brake, which has an engagement surface of the brake band on the outer surface of the drum of the third clutch, is arranged for engaging the decelerated rotation input element of the planetary gear set with the transmission case.

23. The automatic transmission according to claim 1, further comprising a counter drive gear connected to the output element of the planetary gear set and arranged in the outer space of the input shaft, a counter shaft which is arranged in parallel with the input shaft and on which a counter driven gear engaging with the counter drive gear is arranged, and a differential unit which is rotationally driven by the counter shaft and arranged in parallel with the counter shaft.

24. The automatic transmission according to claim 23, wherein the counter drive gear is arranged between the first clutch, the third clutch and the reduction planetary gear and the planetary gear set.

25. The automatic transmission according to claim 23, wherein the counter drive gear is arranged between the second clutch and the planetary gear set.

26. The automatic transmission according to claim 23, wherein the counter drive gear is arranged in the opposite position to the second clutch relative to the planetary gear set.

27. The automatic transmission according to claim 23, wherein the first clutch, the third clutch and reduction planetary gear are arranged at an engine connecting side of the transmission, and the second clutch is arranged at the rear end side of the transmission.

28. The automatic transmission according to claim 23, wherein the second clutch is arranged at an engine connecting side of the transmission, and the first clutch, the third clutch and reduction planetary gear are arranged at the rear end side of the transmission.

29. The automatic transmission according to claim 23, wherein the each clutch comprises a hydraulic servo individually, the hydraulic servo of the first clutch, the reduction planetary gear and the hydraulic servo of the third clutch are arranged in order relative to the planetary gear set.

30. The automatic transmission according to claim 23, wherein each clutch comprises a hydraulic servo individually, the reduction planetary gear, the hydraulic servo of the first clutch and the hydraulic servo of the third clutch are arranged in order relative to the planetary gear set.

31. The automatic transmission according to claim 23, wherein each clutch comprises a hydraulic servo individually, the hydraulic servo of the third clutch, the reduction planetary gear and the hydraulic servo of the first clutch are arranged in order relative to the planetary gear set.

32. The automatic transmission according to claim 1, wherein an output shaft connected to the output element of the planetary gear set is arranged, and the output shaft is coaxial with the input shaft.

33. The automatic transmission according to claim 32, wherein the first clutch, the third clutch and reduction planetary gear are arranged in an engine connecting side of the transmission, the second clutch is arranged in the rear end side of the transmission, and the output element of the planetary gear set is connected to the output shaft through the outer surface side of the second clutch.

34. The automatic transmission according to claim 33, wherein each clutch comprises a hydraulic servo individually, the hydraulic servo of the first clutch, the reduction planetary gear and the hydraulic servo of the third clutch are arranged in order relative to the planetary gear set.

35. The automatic transmission according to claim 33, wherein each clutch comprises a hydraulic servo individually, the reduction planetary gear, the hydraulic servo of the first clutch and the hydraulic servo of the third clutch are arranged in order relative to the planetary gear set.

36. The automatic transmission according to claim 33, wherein each clutch comprises a hydraulic servo individually, the hydraulic servo of the third clutch, the reduction planetary gear and the hydraulic servo of the first clutch are arranged in order relative to the planetary gear set.

* * * * *